(12) United States Patent
De Munck et al.

(10) Patent No.: US 8,681,372 B2
(45) Date of Patent: Mar. 25, 2014

(54) INTERACTIVE DISPLAY FOR LABEL PRINTER

(75) Inventors: Elke De Munck, Dendermonde (BE); Dirk Winne, Loppem (BE); Jeroen Leyman, Sint-Laureins (BE); Jimmy Dullaert, Stekene (BE); Jos Vleurinck, Oordegem (BE); Emely Serruys, Antwerp (BE); Julie Hibbard, Ghent (BE); Tom De Fruytier, Gijzegem (BE)

(73) Assignee: DYMO, Sint-Niklaas (BE)

( * ) Notice: Subject to any disclaimer, the term of this patent is extended or adjusted under 35 U.S.C. 154(b) by 166 days.

(21) Appl. No.: 13/121,134

(22) PCT Filed: Sep. 28, 2009

(86) PCT No.: PCT/EP2009/062540
§ 371 (c)(1),
(2), (4) Date: Aug. 10, 2011

(87) PCT Pub. No.: WO2010/034836
PCT Pub. Date: Apr. 1, 2010

(65) Prior Publication Data
US 2011/0286012 A1    Nov. 24, 2011

(30) Foreign Application Priority Data

Sep. 26, 2008 (GB) .................................. 0817702.4
Sep. 11, 2009 (GB) .................................. 0915952.6

(51) Int. Cl.
*G06K 15/02* (2006.01)
(52) U.S. Cl.
USPC ........................................ 358/1.6; 358/1.15
(58) Field of Classification Search
USPC ................................................. 358/1.6, 1.15
See application file for complete search history.

(56) References Cited

U.S. PATENT DOCUMENTS

2003/0103232 A1*  6/2003  Twede .......................... 358/1.15

FOREIGN PATENT DOCUMENTS

| EP | 1804173 A1 | 7/2007 |
| JP | H08118742 A | 5/1996 |
| JP | 2007316690 A | 12/2007 |

OTHER PUBLICATIONS

Machine translation for JP2007-316690, IDS.*
International Search Report for PCT/EP2009/062540, mailed Mar. 12, 2009 (8 pages).
Written Opinion for PCT/EP2009/062540, mailed Mar. 12, 2009 (8 pages).
Office Action for Japanese Patent Application No. 2011-528357, dated Jul. 2, 2013.

* cited by examiner

*Primary Examiner* — Qian Yang
(74) *Attorney, Agent, or Firm* — Marshall, Gerstein & Borun LLP

(57) ABSTRACT

A label printer, comprising: input means operable by a user; display means; and control means connected to the input means and the display means. The control means are configured to control the display means to first display a header and a first image representative of a label; and, in response to receiving at the control means a signal indicative of an operation of the input means by a user to select the header, to control the display to then display a second image representative of the label and a graphical control panel associated with said header. The second image representative of the label is of a size smaller than the first image representative of the label. The display means may comprise a touchscreen.

12 Claims, 29 Drawing Sheets

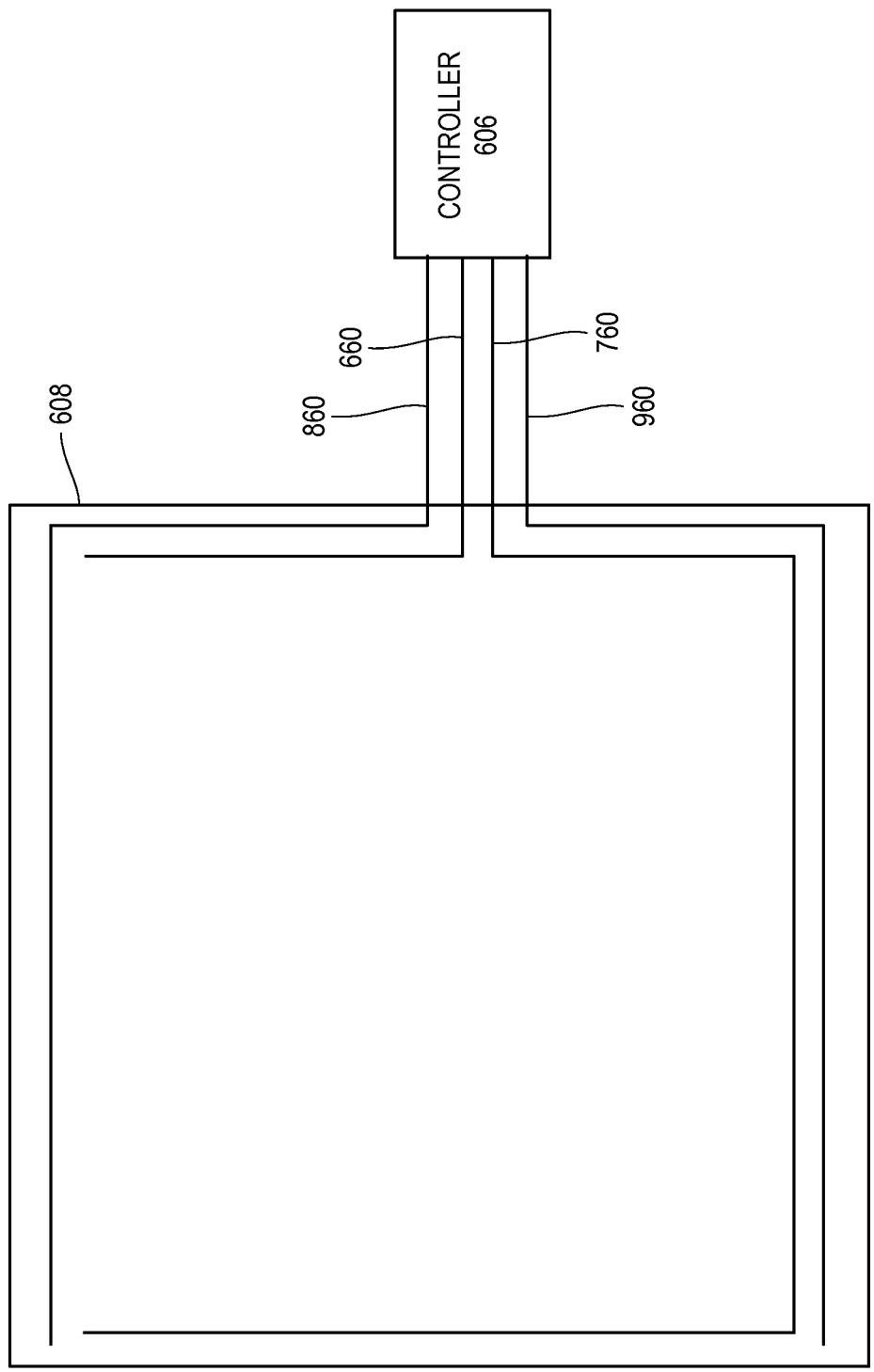

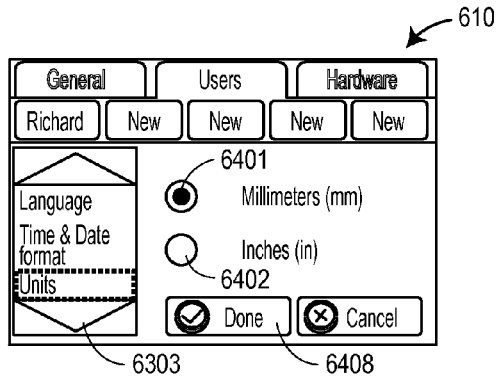
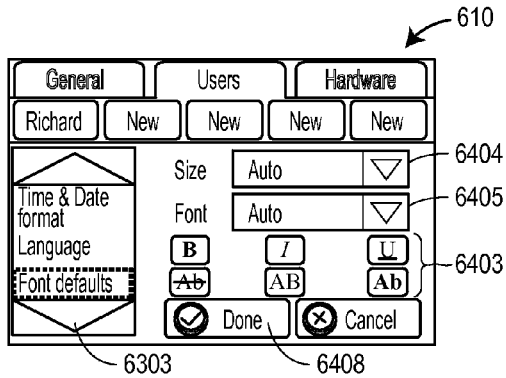
FIG. 22G          FIG. 22H
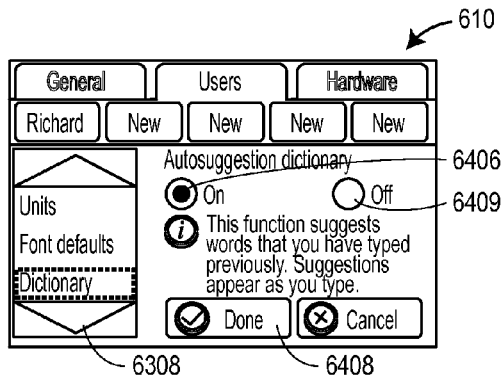
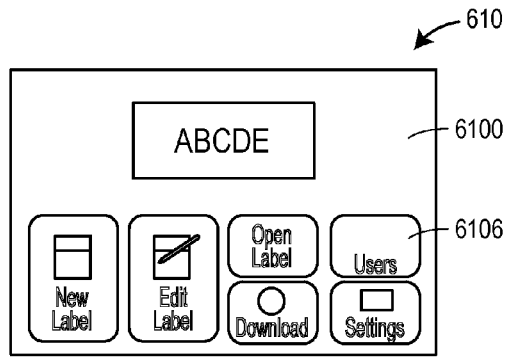
FIG. 22I          FIG. 22J
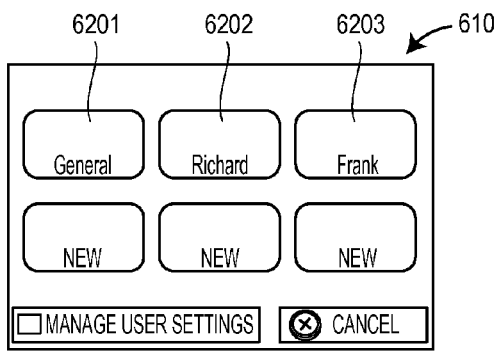
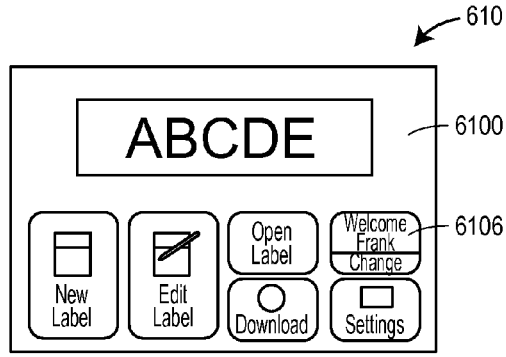
FIG. 22K          FIG. 22L

INTERACTIVE DISPLAY FOR LABEL PRINTER

REFERENCE TO RELATED APPLICATIONS

This application is the US National Phase under 35 USC 371 of international patent application PCT/EP2009/062540, having an international filing date of Sep. 28, 2009, and claims priority to United Kingdom GB 0817702.4, filed Sep. 26, 2008 and United Kingdom GB 0915952.6, filed Sep. 11, 2009.

FIELD OF THE DISCLOSURE

The present invention relates to a label printer for printing an image onto a label, and in particular a stand-alone label printer. It also relates to a method of operating control means of a label printer, and to a computer program, embodied on a computer readable medium, which is configured to control control means of a label printer.

DESCRIPTION OF THE RELATED ART

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

Such a display of a known label printer enables a user to view an image representative of a label they are creating using the printer, including label data intended to be printed onto a label medium. When using these known label printers, a user first selects the size of label medium they intend to print on (such as selecting the dimensions of a die cut label or the width of a tape medium), and then enters the text or other label data which is intended to be printed onto the label medium. A problem associated with known label printers that operate in this manner is that, when the user selects a different size of label medium for printing upon after entering label data, the entered label data is deleted from memory. The user then has to go to the trouble of re-entering the label data intended to be printed onto the new size of label medium.

Many known label printers are of a relatively compact design, and therefore have small displays, such as displays with an area of 50 cm$^2$ or less. Such displays often include an image representative of a label being created and an information region that various other information associated with the label medium and/or label data entered for printing onto the label medium. A problem associated with such displays is that one or both of the image representative of the label medium and the information region may only be permitted to occupy a small area, which can make it hard for the user to read the information included in the information region and/or to view the label being created.

A further problem associated with displays of know label printers is that, when a user is navigating around the image shown on the display, a cursor (i.e. a moving placement or pointer) is shown on the display to indicate to the user a position on the display, and the cursor can obscure some of the information presented to the user on the display. This is a particular problem for small displays, as described above, which are frequently used in stand-alone label printers, since the cursor takes up a relatively large proportion of the area of the display in order to be sufficiently visible to the user, and thus obscures a relatively large proportion of the displayed information.

Some known label printers have displays which are capable of showing a variety of different screens or menus to the user. It can often be time-consuming for the user to navigate their way around the different screens and menus in order to find a screen with a menu option or a button which, when selected by the user, causes the label printer to print a label.

Memory capacity in electronic devices is a finite resource. In stand-alone label printers in particular, the memory capacity can be very small compared with that of, say, a personal computer. After creating and/or printing a label on a label printer, a user may store data defining the appearance of the label (such as data defining the content and/or format of the label) in non-volatile memory. However, some degree of the memory becomes occupied with duplicate labels because the user often forgets which labels they have previously saved. In other words, label data defining the appearance of a certain label can be saved in the memory in more than one location, which means that the data defining the label's appearance takes up more space than is necessary. This is inefficient use of the limited memory capacity of these known label printers.

Some known label printers allow users to zoom in to a portion of a label being created such that the display of the apparatus shows only a portion of the total content of a label being created. This portion of the content may be enlarged on the display (when compared to an image of the same content when the total label being created is displayed on the display), such that the user is able to see the portion of the content in more detail. However, when only a portion of the total label is displayed on the display, the user can become disorientated. In other words, the user may not understand where in the whole label the displayed portion of the content is located, e.g. how displayed label content is positioned with respect to the label medium onto which it will be printed.

Some known label printers allow users to create vertical labels, in which a character string extends along the longitudinal length of the label, but individual characters of the string are printed such that they each extend from their leading side (or edge or end) to their tail (or trailing) side (or edge or end) across the width of the tape. The characters are viewable the correct way up when a user holds the tape in front of their eyes such that its longitudinal direction extends vertically and its width direction extends horizontally. Known printers have a display which shows the label or tape extending in its longitudinal direction across the width of a screen, with displayed characters of the string orientated such that they are shown on the screen on their sides. In other words, the characters extend from their leading side (or edge or end) to their tail (or trailing) side (or edge or end) in a direction parallel to a height direction of the display. This can make it difficult for a user to read the character string on the display, when they are editing the content of the character string.

Some known label printers enable a user to create a set of plural labels to be printed, by way of the user only needing to define the content of one label. Such printers use what is known commonly in the art as "auto fields". A user can add data which they wish to be included in each of the plural labels, and also an auto field which has a value that differs in each of the plural labels. For example, a counter auto field may be added to a series of five labels, such that the first label includes a value "001", the second label includes the value "002", etc. However, using these printers, it is difficult for a user to visualise what each of the plural labels will look like, before they commit to printing them.

Some known label printers display a homepage to a user, for example shortly after the printer has been switched on. From the homepage, the user may be able to select whether to open a stored label, edit an existing label, create a new label, adjust system settings, etc. When using these known printers, if a user wishes to add some data to a label which they wish to print, it is often necessary for the user to navigate through plural tiers of a menu structure in order to view a page at which they can then add the data to the label. This can cause some delay to a user who wishes to create a label quickly.

As discussed above, some known label printers have a relatively small screen on which to display information to a user. Many of these known devices suffer from the problem that, because there is so much information included on the display for the user to consider, each element of the information is quite small, and thus not easily read or understood by the user.

It is an aim of some embodiments of the present invention to address one or more of these problems.

SUMMARY OF THE DISCLOSURE

Accordingly, one aspect of the present invention may provide a label printer, comprising: input means operable by a user; display means; and control means connected to the input means and the display means; said control means being configured to control the display means to first display a header and a first image representative of a label; and, in response to receiving at the control means a signal indicative of an operation of the input means by a user to select the header, the control means is configured to control the display to then display a second image representative of the label and a graphical control panel associated with said header, wherein the second image representative of the label is of a size smaller than the first image representative of the label.

A further aspect of the present invention may provide a method of operating control means of a label printer, the method comprising: controlling display means of the label printer to first display a header and a first image representative of a label; and, in response to receiving at the control means a signal indicative of an operation of input means of the label printer by a user to select the header, controlling the display means to then display a second image representative of the label and a graphical control panel associated with said header, wherein the second image representative of the label is of a size smaller than the first image representative of the label.

A further aspect of the present invention may provide a computer program embodied on a computer readable medium, said computer program configured to control control means of a label printer to: control display means of the label printer to first display a header and a first image representative of a label; and, in response to receiving at the control means a signal indicative of an operation of input means of the label printer by a user to select the header, control the display means to then display a second image representative of the label and a graphical control panel associated with said header, wherein the second image representative of the label is of a size smaller than the first image representative of the label.

A further aspect of the present invention may provide a label printer, comprising: input means operable by a user; display means; and control means connected to the input means and the display means; said control means being configured to control the display means to first display a first image representative of a label medium occupying a first area and label data for printing onto a label medium occupying a second area, wherein at least part of the second area is outside the first area; and, in response to receiving at the control means a signal indicative of an operation of the input means by a user, the control means is configured to control the display means to then display a second image representative of a label medium occupying a third area, which second image replaces the first image, and said label data for printing onto a label medium occupying a fourth area, wherein the third area is larger than the first area, and the fourth area is the same size as the second area.

A further aspect of the present invention may provide a method of operating control means of a label printer, the method comprising: controlling display means of the label printer to first display a first image representative of a label medium occupying a first area and label data for printing onto a label medium occupying a second area, wherein at least part of the second area is outside the first area; and, in response to receiving at the control means a signal indicative of an operation of input means of the label printer by a user, controlling the display means to then display a second image representative of a label medium occupying a third area, which second image replaces the first image, and said label data for printing onto a label medium occupying a fourth area, wherein the third area is larger than the first area, and the fourth area is the same size as the second area.

A further aspect of the present invention may provide a computer program embodied on a computer readable medium, said computer program configured to control control means of a label printer to: control display means of the label printer to first display a first image representative of a label medium occupying a first area and label data for printing onto a label medium occupying a second area, wherein at least part of the second area is outside the first area; and, in response to receiving at the control means a signal indicative of an operation of input means of the label printer by a user, control the display means to then display a second image representative of a label medium occupying a third area, which second image replaces the first image, and said label data for printing onto a label medium occupying a fourth area, wherein the third area is larger than the first area, and the fourth area is the same size as the second area.

A further aspect of the present invention may provide a label printer, comprising: input means operable by a user; display means; and control means connected to the input means and the display means; wherein, between receiving at the control means data representative of an operation of the input means by a user to select a first area displayed by the display means and receiving at the control means data representative of an operation of the input means by the user to select a second area displayed by the display means, the control means is configured to control the display means to display an image, without displaying a cursor between the first area and the second area.

A further aspect of the present invention may provide a method of operating control means of a label printer, the method comprising: between receiving at the control means data representative of an operation of input means of the label printer by a user to select a first area displayed by display means of the label printer and receiving at the control means data representative of an operation of the input means by the user to select a second area displayed by the display means, controlling the display means to display an image, without displaying a cursor between the first area and the second area.

A further aspect of the present invention may provide a computer program embodied on a computer readable medium, said computer program configured to control control means of a label printer to: between receiving at the control means data representative of an operation of input means of the label printer by a user to select a first area displayed by display means of the label printer and receiving at the control means data representative of an operation of the input means by the user to select a second area displayed by the display means, control the display means to display an image, without displaying a cursor between the first area and the second area.

A further aspect of the present invention may provide a label printer, comprising: display means; print instructing means; and control means connected to the display means and the print instructing means; said control means being configured to control the display means to display a screen excluding data associated with a label stored in storage means; and, while the screen is displayed by the display means, the control means is configured to initiate a print routine to print the label, in response to receiving a print instructing signal representative of an operation of the print instructing means by a user.

A further aspect of the present invention may provide a method of operating control means of a label printer, the method comprising: controlling display means of the label printer to display a screen excluding data associated with a label stored in storage means; and, while the screen is displayed by the display means, initiating a print routine to print the label, in response to receiving a print instructing signal representative of an operation of print instructing means of the label printer by a user.

A further aspect of the present invention may provide a computer program embodied on a computer readable medium, said computer program configured to control control means of a label printer to: control display means of the label printer to display a screen excluding data associated with a label stored in storage means; and, while the screen is displayed by the display means, initiate a print routine to print the label, in response to receiving a print instructing signal representative of an operation of print instructing means of the label printer by a user.

A further aspect of the present invention may provide a label printer, comprising: a touchscreen; a hardware print key; and control means connected to the touchscreen and the hardware print key; said control means being configured to control a display of the touchscreen to display an image representative of a label to be printed; and, in response to receiving at the control means a signal representative of an actuation of the hardware print key by a user, said control means is configured to initiate a print routine to print the label.

A further aspect of the present invention may provide a method of operating control means of a label printer, the method comprising: controlling a display of a touchscreen of the label printer to display an image representative of a label to be printed; and, in response to receiving at the control means a signal representative of an actuation of a hardware print key of the label printer by a user, initiating a print routine to print the label.

A further aspect of the present invention may provide a computer program embodied on a computer readable medium, said computer program configured to control control means of a label printer to: control a display of a touchscreen of the label printer to display an image representative of a label to be printed; and, in response to receiving at the control means a signal representative of an actuation of a hardware print key of the label printer by a user, initiate a print routine to print the label.

A further aspect of the present invention may provide a label printer, comprising: means for comparing label data that defines the appearance of a label and that is stored in a memory region to label data stored in at least one memory location of a plurality of memory locations; and means for causing the label data stored in the memory region to be stored at one of said plurality of memory locations, when the label data stored in the memory region differs from the label data stored in said at least one memory location.

A further aspect of the present invention may provide a method of operating control means of a label printer, the method comprising: comparing label data that defines the appearance of a label and that is stored in a memory region to label data stored in at least one memory location of a plurality of memory locations; and causing the label data stored in the memory region to be stored at one of said plurality of memory locations, when the label data stored in the memory region differs from the label data stored in said at least one memory location.

A further aspect of the present invention may provide a computer program embodied on a computer readable medium, said computer program configured to control control means of a label printer to: compare label data that defines the appearance of a label and that is stored in a memory region to label data stored in at least one memory location of a plurality of memory locations; and cause the label data stored in the memory region to be stored at one of said plurality of memory locations, when the label data stored in the memory region differs from the label data stored in said at least one memory location.

A further aspect of the present invention may provide a label printer, comprising: display means; storage means for storing label data defining content for printing onto a label; and control means connected to the display means and the storage means; the control means being for controlling the display means to display a first image representative of only a first part of the content and an indication that the content comprises a second part, said indication indicating the position of the second part of the content with respect to the first part of the content.

A further aspect of the present invention may provide a method of controlling control means of a label printer, the method comprising: controlling display means of the label printer to display a first image representative of only a first part of content to be printed onto a label, the content being defined by label data stored in storage means; and controlling the display means to display an indication that the content comprises a second part, said indication indicating the position of the second part of the content with respect to the first part of the content.

A further aspect of the present invention may provide a computer program embodied on a computer readable medium, said computer program configured to control means of a label printer to: control display means of the label printer to display a first image representative of only a first part of content to be printed onto a label, the content being defined by label data stored in storage means; and control the display means to display an indication that the content comprises a second part, said indication indicating the position of the second part of the content with respect to the first part of the content.

A further aspect of the present invention may provide a label printer, comprising: input means operable by a user; display means; and control means connected to the input means and the display means; the control means being arranged to control the display means to first display, in a display format, plural characters of a character string for printing onto a tape medium in a vertical orientation whereby the plural characters are printed adjacent each other in a longitudinal direction of the tape medium and each character extends from its leading end to its trailing end in a width direction of the tape medium; and, in response to receiving at the control means a signal representative of an operation of the input means by a user to initiate editing of the character string, the control means is arranged to control the display means to then display the plural characters in an edit format; wherein, in the display format, the plural characters are displayed adjacent each other along a longitudinal path and each character of the plural characters extends from its leading end to its trailing end in a direction perpendicular to the longitudinal path; and wherein, in the edit format, the plural characters are displayed adjacent each other along the longitudinal path and each character of the plural characters extends from its leading end to its trailing end in a direction parallel to the longitudinal path.

A further aspect of the present invention may provide a method of operating control means of a label printer, the method comprising: controlling display means of the label printer to first display, in a display format, plural characters of a character string for printing onto a tape medium in a vertical orientation whereby the plural characters are printed adjacent each other in a longitudinal direction of the tape medium and each character extends from its leading end to its trailing end in a width direction of the tape medium; and, in response to receiving at the control means a signal representative of an operation of input means of the label printer by a user to initiate editing of the character string, controlling the display means to then display the plural characters in an edit format; wherein, in the display format, the plural characters are displayed adjacent each other along a longitudinal path and each character of the plural characters extends from its leading end to its trailing end in a direction perpendicular to the longitudinal path; and wherein, in the edit format, the plural characters are displayed adjacent each other along the longitudinal path and each character of the plural characters extends from its leading end to its trailing end in a direction parallel to the longitudinal path.

A further aspect of the present invention may provide a computer program embodied on a computer readable medium, said computer program configured to control means of a label printer to: control display means of the label printer to first display, in a display format, plural characters of a character string for printing onto a tape medium in a vertical orientation whereby the plural characters are printed adjacent each other in a longitudinal direction of the tape medium and each character extends from its leading end to its trailing end in a width direction of the tape medium; and, in response to receiving at the control means a signal representative of an operation of input means of the label printer by a user to initiate editing of the character string, control the display means to then display the plural characters in an edit format; wherein, in the display format, the plural characters are displayed adjacent each other along a longitudinal path and each character of the plural characters extends from its leading end to its trailing end in a direction perpendicular to the longitudinal path; and wherein, in the edit format, the plural characters are displayed adjacent each other along the longitudinal path and each character of the plural characters extends from its leading end to its trailing end in a direction parallel to the longitudinal path.

A further aspect of the present invention may provide a label printer, comprising: display means; and control means connected to the display means; the control means being arranged to control the display means to display plural images representative of respective labels of a set of plural labels to be printed.

A further aspect of the present invention may provide a method of operating control means of a label printer, the method comprising: controlling display means of the label printer to display plural images representative of respective labels of a set of plural labels to be printed.

A further aspect of the present invention may provide a computer program embodied on a computer readable medium, said computer program configured to control control means of a label printer to: control display means of the label printer to display plural images representative of respective labels of a set of plural labels to be printed.

A further aspect of the present invention may provide a label printer, comprising: input means operable by a user; display means; and control means connected to the input means and to the display means; the control means being arranged to control the display means to first display a first page, which first page comprises a link to a second page; and, in response to receiving at the control means a signal representative of an operation of the input means by a user to select a character for printing onto a label medium, the control means is arranged to control the display means to then display the second page, said second page comprising the character selected for printing.

A further aspect of the present invention may provide a method of operating control means of a label printer, the method comprising: controlling display means of the label printer to first display a first page, which first page comprises a link to a second page; and, in response to receiving at the control means a signal representative of an operation of input means of the label printer by a user to select a character for printing onto a label medium, controlling the display means to then display the second page, said second page comprising the character selected for printing.

A further aspect of the present invention may provide a computer program embodied on a computer readable medium, said computer program configured to control control means of a label printer to: control display means of the label printer to first display a first page, which first page comprises a link to a second page; and, in response to receiving at the control means a signal representative of an operation of input means of the label printer by a user to select a character for printing onto a label medium, control the display means to then display the second page, said second page comprising the character selected for printing.

A further aspect of the present invention may provide a label printer, comprising: display means comprising a touchscreen, which touchscreen comprises a display and a touch panel; and control means connected to the display means, the control means being arranged to control the display to first display: an image representative of a label, the label having a configurable attribute, only a first graphical control panel of a plurality of different graphical control panels stored in storage means, the first graphical control panel comprising a first input area associated with the configurable attribute, and a plurality of headers associated with respective graphical control panels of the plurality of different graphical control panels, which series of headers comprise a header associated with a second graphical control panel of the plurality of different graphical control panels; wherein the control means is arranged to receive, from the display means, a demand signal when a user touches a part of the touch panel associated with the header associated with the second graphical control panel, which demand signal is representative of an instruction by the user to demand that only the second graphical control panel of the plurality of different graphical control panels be displayed, in place of the first graphical control panel; and wherein, in dependence on the demand signal received at the control means, the control means is arranged to control the display to then display only the second graphical control panel of the plurality of different graphical control panels, in place of the first graphical control panel.

A further aspect of the present invention may provide a method of operating control means of a label printer, wherein the method comprises: controlling a display of a touchscreen comprised in display means of the label printer to first display: an image representative of a label, the label having a configurable attribute, only a first graphical control panel of a plurality of different graphical control panels stored in storage means, the first graphical control panel comprising a first input area associated with the configurable attribute, and a plurality of headers associated with respective graphical control panels of the plurality of different graphical control panels, which series of headers comprise a header associated with a second graphical control panel of the plurality of different graphical control panels; receiving, from the display means, a demand signal when a user touches a part of a touch panel of the touchscreen associated with the header associated with the second graphical control panel, which demand signal is representative of an instruction by the user to demand that only the second graphical control panel of the plurality of different graphical control panels be displayed, in place of the first graphical control panel; and in dependence on the demand signal received at the control means, controlling the display to then display only the second graphical control panel of the plurality of different graphical control panels, in place of the first graphical control panel.

A further aspect of the present invention may provide a computer program embodied on a computer readable medium, said computer program configured to control control means of a label printer to: control a display of a touchscreen comprised in display means of the label printer to first display: an image representative of a label, the label having a configurable attribute, only a first graphical control panel of a plurality of different graphical control panels stored in storage means, the first graphical control panel comprising a first input area associated with the configurable attribute, and a plurality of headers associated with respective graphical control panels of the plurality of different graphical control panels, which series of headers comprise a header associated with a second graphical control panel of the plurality of different graphical control panels; receive, from the display means, a demand signal when a user touches a part of a touch panel of the touchscreen associated with the header associated with the second graphical control panel, which demand signal is representative of an instruction by the user to demand that only the second graphical control panel of the plurality of different graphical control panels be displayed, in place of the first graphical control panel; and in dependence on the demand signal received at the control means, control the display to then display only the second graphical control panel of the plurality of different graphical control panels, in place of the first graphical control panel.

BRIEF DESCRIPTION OF THE SEVERAL VIEWS OF THE DRAWING

Reference will now be made by way of example to the accompanying drawings in which;

FIG. 4a is a diagram showing the wiring of the resistive touch screen of FIG. 4;

FIGS. 22a to 22l show displays of a further label printer that is an embodiment of the present invention;

DETAILED DESCRIPTION OF THE PREFERRED EMBODIMENTS

Figure 1:
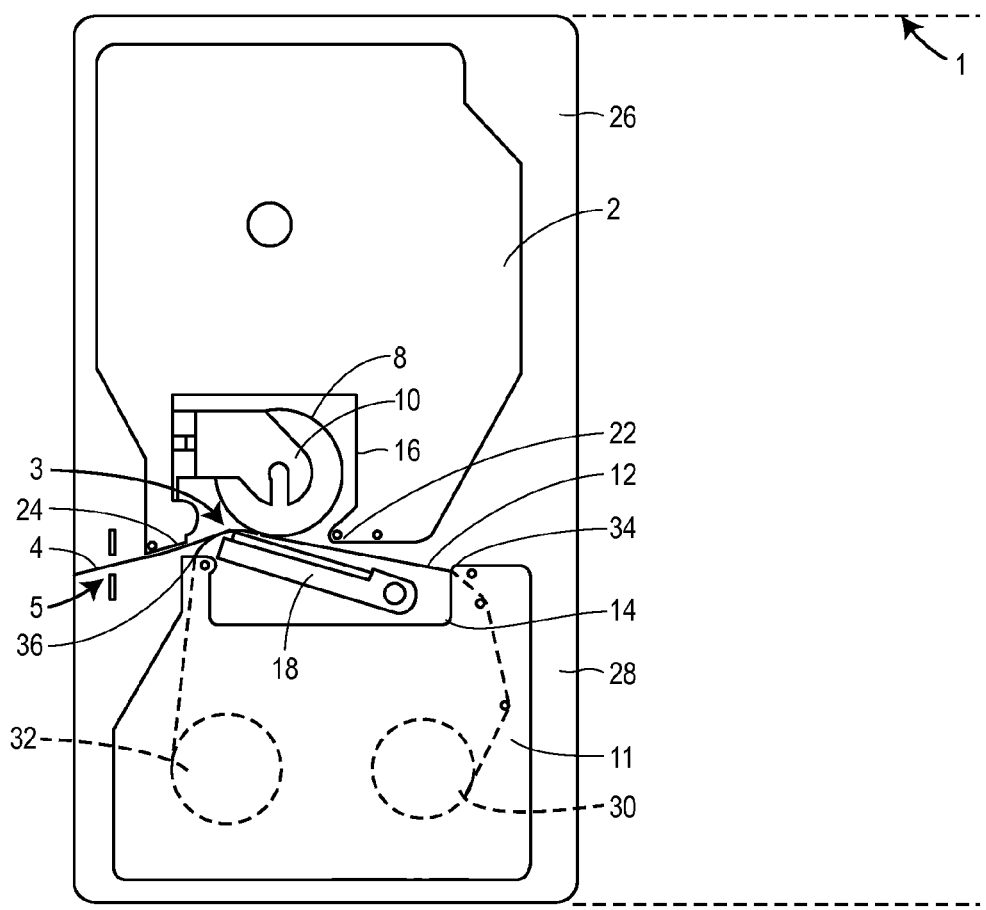
FIG. 1 is a plan view of a first label printer using a two cassette system.

Some embodiments of the present invention may provide a label printer which permits a user to alter a display size of label medium for printing upon whilst maintaining previously-entered label data for printing on the label medium. Some embodiments may provide a label printer in which this altering of the display size of the label medium causes a different sized label medium to be selected for printing upon, while the print size of the previously-entered label data is maintained. Some embodiments may provide that this altering of the display size of the label medium causes the selection of the label medium for printing upon to be maintained, while causing a print size of the label data to be adjusted.

Some embodiments of the present invention may provide a label printer with a display which shows both an image representative of a label medium and a tab (or header) associated with a graphical control panel or information pane. The graphical control panel or information pane may be hidden from view, such that more space is available on the display for showing the image representative of the label medium. When the user selects the header, the image of the label medium is reduced in size to create space for the graphical control panel or information pane to also be displayed on the screen. In some embodiments, the graphical control panel or information pane can be collapsed or hidden from view again, and the image of the label medium expanded so as to fill a larger proportion of the display again. Thus the user is able to more clearly view the content of each of the image of the label medium and the content of the graphical control panel or information pane.

Some embodiments of the present invention may provide a label printer wherein, when a user selects a first area displayed and then selects a second area displayed, no cursor is shown on the screen between the first and second areas on the display between the two selecting operations. Thus, information shown on the display between the first and second areas is not obscured. Such embodiments may achieve this advantage by providing a display which comprises a touchscreen display, which is capable of receiving inputs from the user. Thus, there is no requirement for the user to have an additional input device, such as a mouse or tracker ball which then requires a cursor to be shown on the screen.

Some embodiments of the present invention may provide a label printer with means, such as a dedicated print key, for initiating printing of a label, even when a display of the printer is not showing a representation of the label or even any data associated with the label. Some embodiments may provide a printer in which the means are operable to initiate the printing regardless of the screen being shown on the display. Some embodiments of the present invention may provide a label printer with a touchscreen display and a hardware key for instructing printing of a label. A user is able to view a label to be printed on a display of the touchscreen, and possibly enter commands to edit attributes of the label by touching parts of a touch panel of the touchscreen. The user is also able to instruct a controller of the printer to initiate a print routine for printing the label by actuating the hardware key. Thus, the user is able to instruct printing of e.g. a label currently being designed, even if they are viewing a different screen on the display, such as a screen relating to printer settings, memory settings, or other labels. This enables a user to print labels at short notice, since the printer has a simple and straightforward system by which the user can navigate quickly to a desired print option.

Some embodiments of the present invention may provide a label printer with means for avoiding storing in memory label data defining the appearance of the label which is the same as already-stored label data defining the appearance of a label. In some embodiments, storing duplicate label data is prevented. In other embodiments, the user may be provided with an indication that label data stored in volatile memory is the same as label data stored in other memory, such that the user is given the choice as to whether or not they wish to store in the other memory the label data currently present in the volatile memory. These features help to encourage efficient use of the memory capacity of the label printer, since duplicate data need not be stored. It also helps the user to find label data defining a desired label in the future, since the number of instances of label data stored in the memory is kept to a minimum.

Some embodiments of the present invention may provide a label printer with means for storing label data defining content for printing onto a label and means for displaying an image representative of only a portion of the content and an indication that the content comprises further content in addition to that displayed. Such an indication may indicate the position of the additional content relative to the displayed content, such that the user is more easily able to determine the position of the displayed content with respect to the total content of the label.

Some embodiments of the present invention may provide a label printer in which, when a user wishes to edit label data which is to be used to create a vertical label (in which a character string extends along a length direction of a label, but individual characters of the string are printed such that they each extend from their leading side (or edge or end) to their tail (or trailing) side (or edge or end) across the width of the tape), the characters of the string are rotated such that they are displayed on a display the correct way up. Thus, when the user holds the printer with an image representative of the label extending in longitudinal direction horizontally across the screen of the printer, the user is more able to read the string while they edit the content of the string.

Some embodiments of the present invention may provide a label printer which enables a user to view images representative of more than one label of a set of plural labels to be printed. Thus, in the example case where an autofield may be used to provide a value in each of the plural labels, which value is different in each of the plural labels, the user is able to preview what the plural labels will look like before the user commits to printing. The previewing may be accomplished by showing each of the labels one-at-a-time on the screen, or by scrolling labels across the screen.

Some embodiments of the present invention provide a label printer including a display which displays a first page with a link to a second page. By operating a character selection key, the user is presented with the second page displaying the character selected, without having to first instruct the printer to display the second page (by selecting the link) ready for them to then select the character to be entered. Thus, since the user needs to take fewer steps to add data to a label, the label can be created more quickly.

Some embodiments of the present invention may provide a label printer including a display which displays an image representative of a label to be printed, only one of a plurality of graphical control panels via which the user can adjust attributes of the label to be printed, and means for selecting which of the graphical control panels is shown on the display. Since the amount of information included on the display is limited, the size of each element of the information can be enlarged to a size at which it is easily viewed and understood by the user.

Label printers that embody the present invention are "stand-alone" label printers, as they are operable by a user independently of a PC or other computer to create and print a label. Although some embodiments of the stand-alone label printer of the present invention are connectable to a PC or other computer or device to receive e.g. software upgrades, label templates, print data, etc., they are nevertheless operable by a user without being so connected to edit or create a label for printing, since the label-editing software used for creating the label is stored and run on the label printer itself.

The stand-alone label printer may comprise a display formed integrally with the label printer, via which display the user can view an interface of the label-editing software to create or edit a label. The stand-alone label printer may also comprise a series of input keys, which can be software keys displayed on the integral display and operable by a user touching a touchscreen overlying the display, and/or hardware keys integral with the label printer. Such a touchscreen is preferably integrally formed with the body of the label printer, such that the touchscreen is not a separate device connected wirelessly or with wires to the label printer. Thus, data defining a label to be printed can be created and/or manipulated in the stand-alone label printer itself, based on inputs made by the user via the input keys, and the data need not be sent to the label printer from a PC or other computer or other device connected wirelessly or with wires to the label printer.

Some embodiments of the present invention may comprise a portable or handheld stand-alone label printer. Other embodiments may comprise a larger stand-alone label printer which is optimally placed on a surface, such as a desk, before being operated.

FIG. 1 shows in plan view a first label printer which has two cassettes arranged therein. Typically, this label printer is powered by batteries at least part of the time. Alternatively the label printer may be mains powered.

The upper cassette is located in a first cassette receiving portion 26 and contains a supply of image receiving tape 4 which passes through a print zone 3 of the label printer 1 to an outlet 5 of the label printer 1. The image receiving tape comprises an upper layer for receiving a printed image on its upper surface and has its other surface coated with an adhesive layer to which is secured a releasable backing layer. The upper cassette 2 has a recess for accommodating a platen 8 of the label printer 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printer 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8 in an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printer 1 has a lid (which is not shown) which is hinged along the rear of the cassette receiving portions 26 and 28 and which covers both cassettes when in place.

A DC motor 7 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
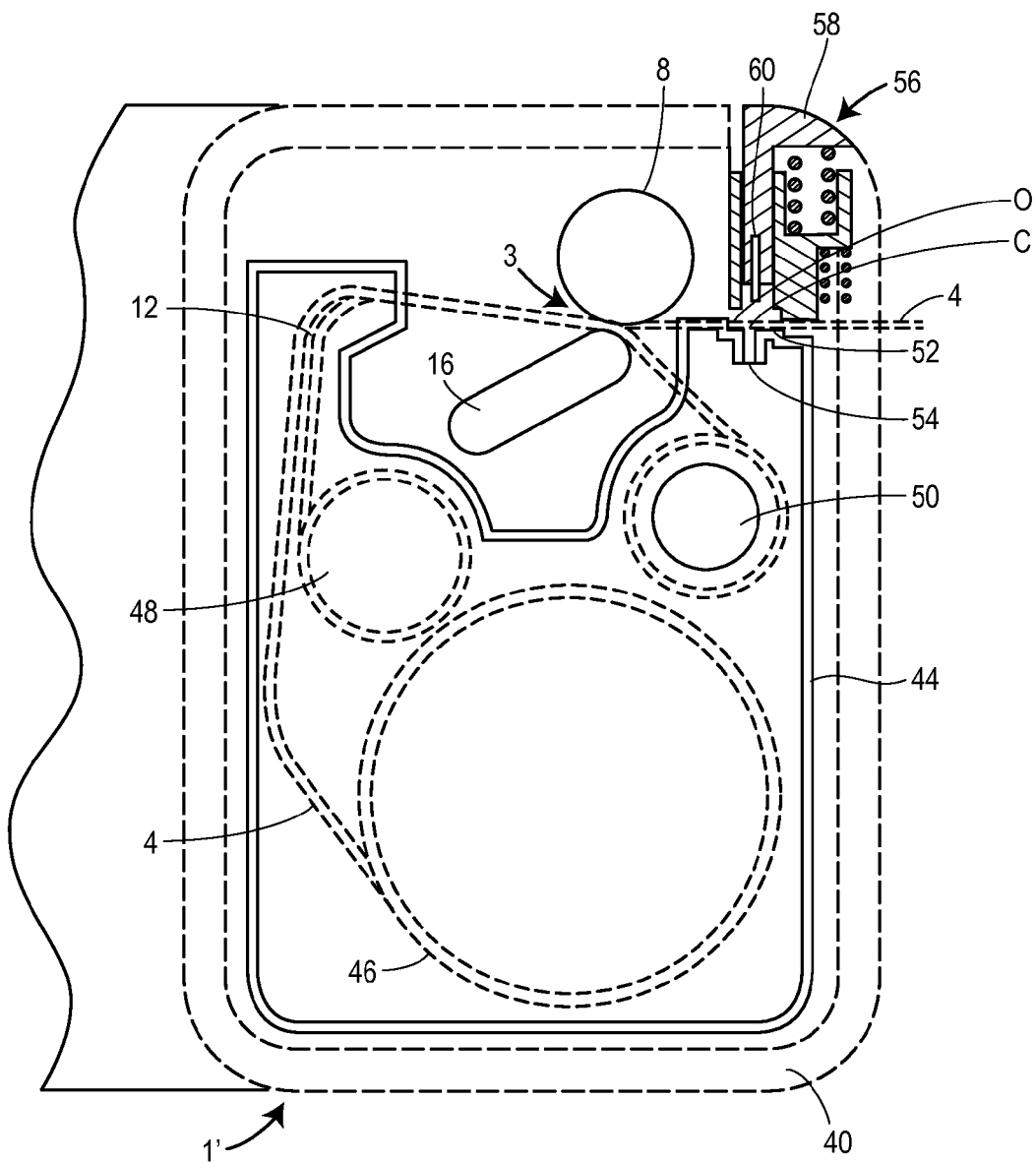
FIG. 2 is a plan view of a second label printer using a one cassette system.

FIG. 2 illustrates in plan view a cassette bay of a second label printer 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, past the print zone 3 and out of the cassette 44 through an outlet O to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the pint zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 and out of the cassette 44 through an outlet O to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

These example label printers 1 and 1' are stand-alone printing devices including a controller for receiving inputs from a user and to alter what is displayed on a display of the printing devices. This arrangement contrasts with label printing systems comprising printers that are connectable or connected to a PC, and in which it is the PC which includes the controller to receive inputs from a user and to alter what is displayed on a display of the printed or of the PC. The present invention is concerned only with stand-alone label printers.

Figure 3:
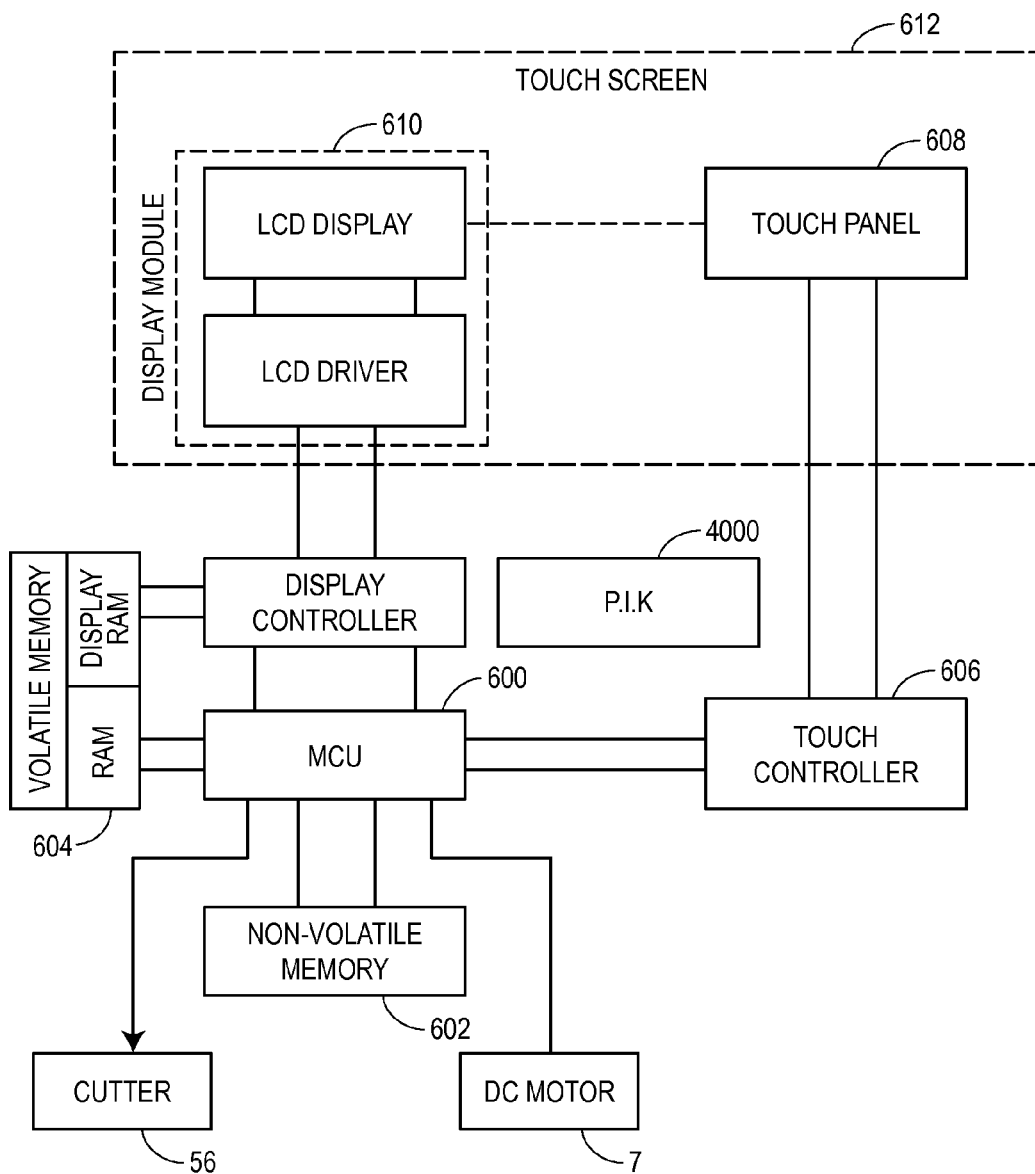
FIG. 3 is a diagrammatic sketch showing the control circuitry in an embodiment of the present invention.

Basic circuitry for controlling the stand-alone label printer 1 of FIG. 1 or the label printer 1' of FIG. 2 is shown in FIG. 3. There is a controller or "control means" (such as a micro controller unit (MCU)) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may comprises one or more of a hardware keyboard including plural keys, a mouse, a digital pen or tracker ball, or any other means for enabling a user to send commands to the controller 600. In some embodiments, the touchscreen 612 is omitted. The MCU 600 outputs data to drive the display 610 (which together with the touch panel 608 form the touchscreen 612) to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of FIG. 2 or a cutting mechanism of the device shown in FIG. 1 to allow a length of tape to be cut off. In alternative embodiments at least part of the cutting mechanism may be manually operated.

FIG. 3 also illustrates a print instructor key (PIK) 4000, which is present in some embodiments and omitted in others. This hardware key is described in more detail below. In some embodiments, the print instructor key (PIK) 4000 is omitted and instead a portion 4001 of the touch panel 608 comprises a print instructing button. Again, this is described in more detail below.

In other embodiments, the label printer does not include an ink ribbon, and the print head creates an image directly onto direct thermal tape. In those embodiments similar circuitry 200 can be provided.

FIG. 3 illustrates an embodiment where all these components shown in FIG. 3 are included in a stand-alone label printer. This contrasts with label printer systems that comprise a printer connected to a PC, as are described below with reference to FIGS. 37 and 38.

Figure 4:
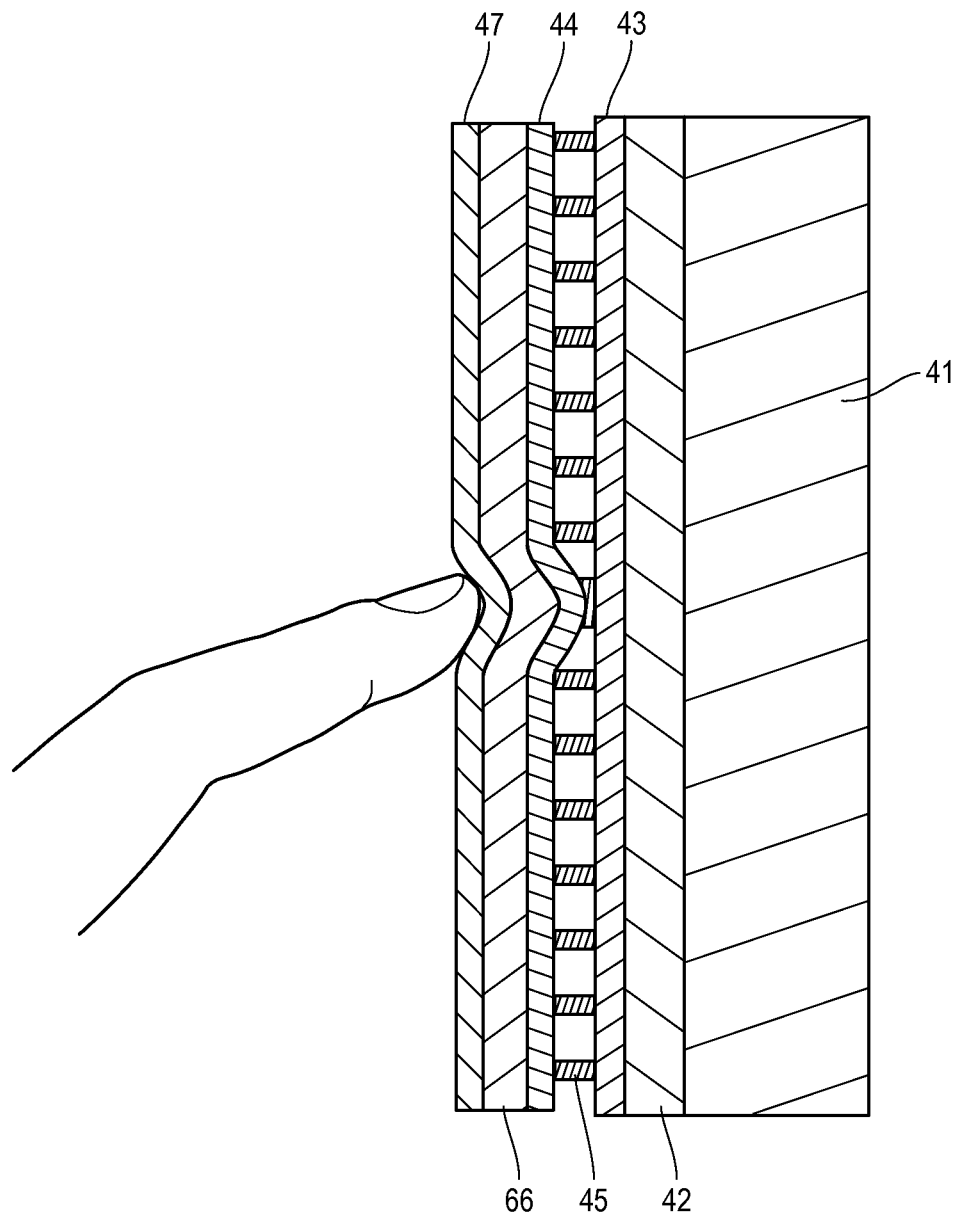
FIG. 4 is a diagram of a resistive touch screen used as an input device according to some embodiments of the present invention.

A touch panel 608 is shown in FIG. 4. FIG. 4 shows a resistive touchscreen system, which may be integrally included in the label printer of some embodiments of the present invention. There are other touchscreen systems that are used to recognise a person's touch that are well known in the art and could be used in place of the resistive system and still be within the scope of some embodiments of this invention. Such systems include the capacitive touchscreen system, in which a local change of capacitance is sensed and used to determine the point at which the screen was touched, and the surface acoustic wave touchscreen system. However reference will only be made to the resistive touchscreen system as an example of an embodiment with reference to FIG. 4.

The resistive touchscreen system consists of a glass (or other suitable material such as plastics) panel 42 overlying the LCD display or any other type of display 41. The glass panel 42 is covered in a uniform resistive coating 43. A thick polyester cover sheet 46 is suspended over the resistive coating 43, separated by small transparent insulating dots 45. The surface of the coversheet facing the glass panel 42 is covered in a conductive coating 44. The opposite outer side of the coversheet 46 is covered in a scratch resistant coating 47.

Four wires are arranged within the touch screen panel 608. Wires 660 and 760 are arranged at the respective side edges of one of the conductive surface 44 and the resistive layer 43, as shown in FIG. 4*a*. Wires 860 and 960 are arranged at the respective top and bottom edges of the other of the conductive surface 44 and the resistive layer 43. The resistive layer 43 is biased at the supply voltage (for example +5V or 3.3V) through four drive lines (not shown), and the coversheet is grounded through a high resistance. When the screen is touched the conductive coating 44 on the coversheet 46 is pushed against the resistive coating 43 on the glass panel 42, making electrical contact an electrical current runs through the conductive and resistive metallic layers. The voltage produced between the point of contact between the conductive layer 44 and resistive layer 43 and between the wires 660, 760, 860 and 960 are detected by the controller. Wires 660 and 760 detect the voltage produced by the touch along the x axis, whist wires 860 and 960 detect the voltage produced along the Y axis. The wires 660, 760, 860 and 960 are connected to analogue to digital converter (not shown) which forms part of the touch screen controller 606. The analogue to digital converter converts the voltages into a digital signal. The controller 606 translates the signal into x and y coordinates to be sent to the MCU 600.

Various example embodiments of the present invention will now be described with reference to the figures.

Figure 5:
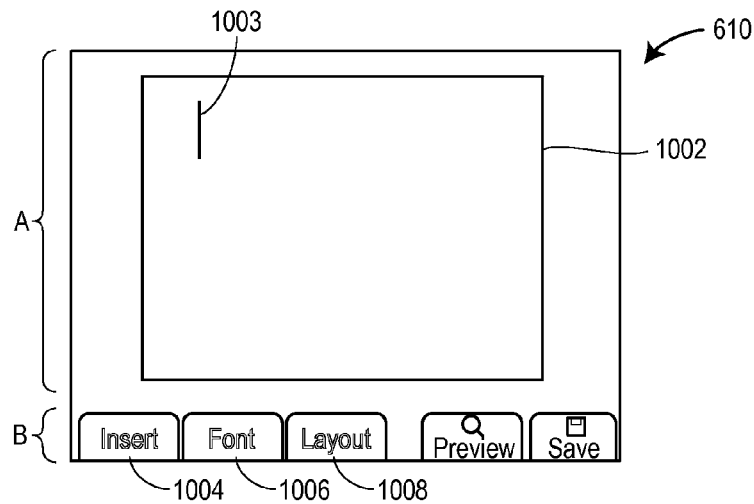
FIG. 5 shows a display of a label printer that is an embodiment of the present invention.

FIG. 5 shows a display 610 of a label printer embodying the present invention. In this embodiment the display 610 is comprised in a touch screen 612, such as that described above. In other embodiments the display 610 may not be part of a touch screen, in which case users of the label printer provide an input to the label printer by way of secondary peripherals, such as a mouse, a mousepad or a tracker ball, etc. The label printer also comprises a controller 600, as described above with reference to FIG. 3. The controller 600 is configured to control the display 610.

Figure 25:
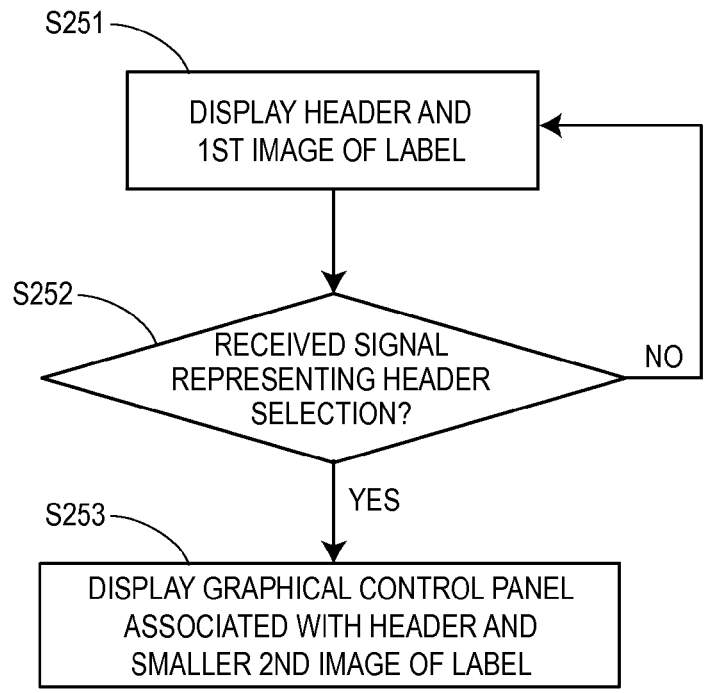
FIG. 25 shows a flow diagram illustrating another method of controlling a label printer according to an embodiment of the present invention.

The controller 600 is configured to control the display 610 to display an image 1002 representative of a label medium in a first section (labelled "A" in FIG. 5) of the display 610. Underneath the first section A of the display 610, the controller 600 is configured to control the display 610 to display a series of selectable headers 1004, 1006 and 1008 in a second section (labelled as "B" in FIG. 5) of the display 610. This is step s251 in FIG. 25. Each of these headers 1004, 1006, 1008 comprises a "tab", with which a respective graphical control panel is associated. These graphical control panels will be described in more detail below.

As can be seen in FIG. 5, the image 1002 representative of a label medium occupies the majority of the display 610. In this embodiment, the user can enter label data for printing onto a label medium by touching any part of the touch panel 608 overlying this first image 1002 representative of a label medium in the display 610. After having touched the touch panel 608 in this way, a cursor 1003 is shown overlying the first image 1002 of the label medium to indicate a label data input point. The user can then use a keyboard of the label printer, which in this embodiment is a hardware keyboard but in other embodiments may comprise a representation of a keyboard on the display 610, to enter text and other label data. Meanwhile, the headers 1004, 1006 and 1008 are shown in a "collapsed" state, i.e. only the headers are visible to a user and the associated graphical control panels are hidden from view. Due to this arrangement, the user is able to clearly see the image 1002 representative of the label medium, as it is provided in an enlarged state on the display 610.

In addition to entering text label data by way of the keyboard or touchscreen as described above, the user may which to add some other form of label data to the label being created. Examples of such label data include barcodes, images, symbols, shapes, and decorative elements such as borders and backgrounds. In order to add one of these types of label data, the user selects the header 1004 labelled "insert" by touching a portion of the touch panel 608 which overlies the header 1004. Touching this portion of the touch panel 608 causes a signal indicative of a selection of the header 1004 by the user to be sent to the controller 600 of the label printer (step s252 in FIG. 25). In response to this, the controller 600 controls the display 610 to display a revised (or second) image 1010 representative of the label medium and a graphical control panel 1012 associated with the selected header 1004, as shown in FIG. 6*a* (step s253 in FIG. 25).

Figure 6A:
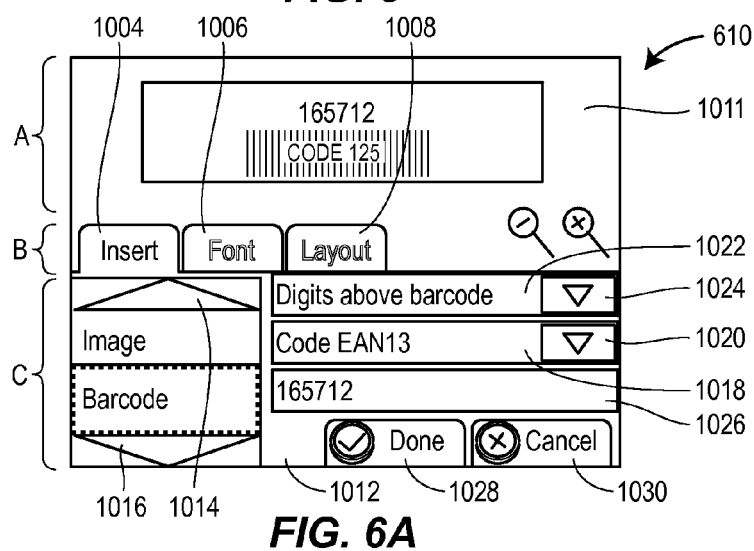
FIGS. 6a to 6c show further displays of a label printer that is an embodiment of the present invention.

As can be seen in FIG. 6*a*, the second image 1010 representative of the label medium is smaller than the first image 1012 representative of the label medium shown in FIG. 5. In other words, the first section A of the display 610 has been reduced in size. The second section B of the display 610 is of substantially the same size as it was prior to the user's selection of the header 1004, and the second section B is still present below the first section A. However, the graphical control panel 1012 associated with header 1004 occupies a third section (labelled "C" in FIG. 6*a*) beneath the second section B of the display 610. In effect, a portion of the display 610 which was previously employed in displaying some of the image 1002 representative of the label medium is now used instead to display the graphical control panel 1012.

The graphical control panel 1012 comprises a plurality of input areas which, when selected by the user, cause the controller 600 to control the display 610 to display a modified version of the image 1010 representative of the label medium in the first section A of the display 610. In FIG. 6*a*, the graphical control panel 1012 is a control panel for adding a barcode to a label being created. If a barcode is already present in a label being created, then the displayed graphical control panel 1012 can also be used to edit that existing barcode.

Graphical control panels relating to different types of label data may also be displayed by scrolling up and down the list to the left of the third section C of the display 610 by selecting the up and down scroll arrow buttons 1014, 1016 respectively, as discussed below. However, in short and in general, in this embodiment the modified version of the image 1010 representative of the label medium can comprise label data that is not comprised in the image 1010 representative of the label medium.

The barcode graphical control panel 1012 allows a user to select a format of barcode by selecting from a dropdown list reached by selecting button 1020. As can be seen in FIG. 6*a*, the currently selected type of barcode is a "Code EAN13" type of barcode. The user is able to enter the digits which define the barcode by selecting text entry box 1026 of the display 610 by touching a corresponding overlapping portion of the touch panel 608, and then operating keys of a hardware keyboard or keys displayed on the display 610 to enter the relevant digits. By accessing a dropdown list through selecting button 1024, the user is able to select how the barcode and its associated digits would be arranged with respect to each other. The selected arrangement is displayed in box 1022. As can be seen in this embodiment, the user has selected for the digits to be presented above the barcode. Alternative arrangements include presenting the digits below the barcode.

When the user is happy with the content and format of the barcode, they select the "Done" button 1028 by touching the corresponding overlapping portion of the touch panel 608, and the barcode is added to the image 1010 representative of the label medium to form a modified version of the image 1010 representative of the label medium. On the other hand, if the user decides not to add the barcode, they select the "Cancel" button 1030 present in the barcode graphical control panel 1012, and the barcode is not added to the image of the label medium. Furthermore, in some embodiments, selection of the "Cancel" button 1030 also collapses the graphical control panel 1012. In other words, the graphical control panel 1012 becomes hidden from view and the display shown in FIG. 5 is presented to the user.

Figure 6B:
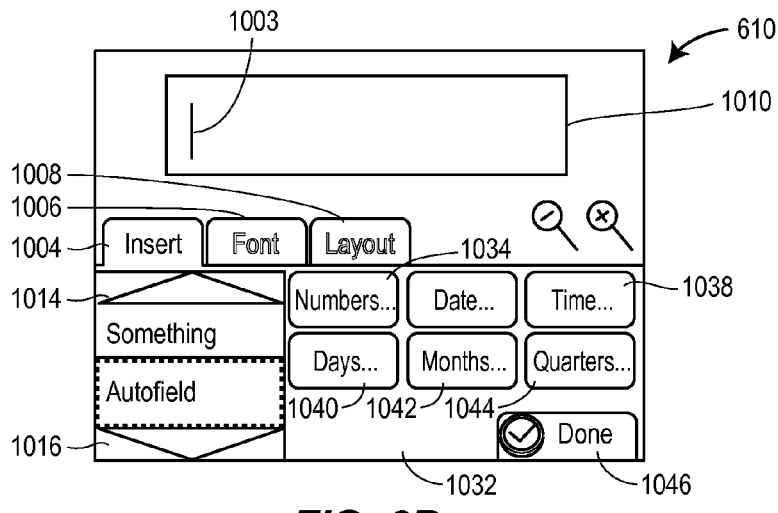
Figure 6C:
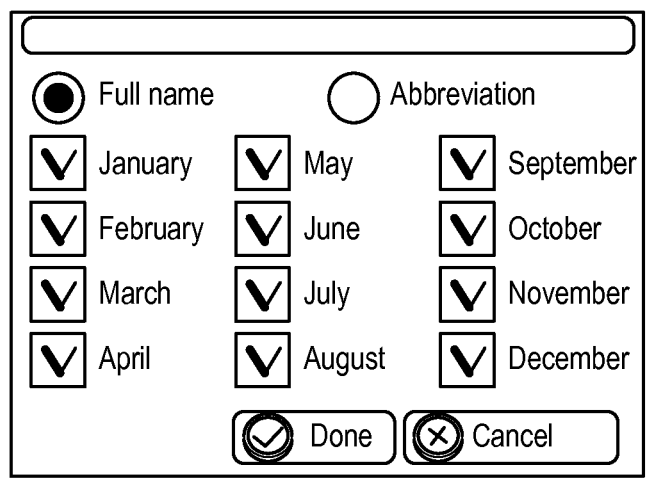

By selecting the down scroll arrow button 1016 in the graphical control panel 1012 of FIG. 6a, the graphical control panel 1012 is replaced by an autofield graphical control panel 1032, as shown in FIG. 6b. The autofield graphical control panel 1032 comprises a plurality of buttons selectable by the user for adding autofield label data to a label being created. So, for example, if the user selects "Months" button 1042 by touching a corresponding overlying portion of the touch panel 608 of the touchscreen 612, the controller 600 controls the display 610 to display a pop-up screen comprising an array of pre-determined values, as shown in FIG. 6c. These values range from a value representative of the first calendar month, "January", to the twelfth calendar month, "December". By touching a portion of the touch panel 608 overlying one of the months, and then selecting the "Done" button included in the pop-up screen, text representing that month is added to the label being created at the position of the cursor 1003 shown on the image 1010 of the label medium. The cursor 1003 can be positioned at any point within the image 1010 representative of the label medium by the user touching a point of the touch panel 608 that overlies the decided point.

By selecting a plurality of months, the user instructs the label printer to create a set of plural labels for printing, in which each of the plural labels includes data indicative of a different one of the months. For example, by selecting all of the months, as shown in FIG. 6c, the controller 600 creates a set of twelve labels to be printed. Each of the plural labels of the set may also include some common label data that is present in each of the labels. This common data is selected by the user selecting label data other than autofields.

By touching "Numbers" button 1034, a similar pop-up display (not shown) is presented on the display 610, which pop-up display includes an array of different numbers for adding to the label. The user can similarly select one or more of these numbers to be added to the label or labels being created at the position of the cursor 1003 within the image 1010 of the label medium. Similarly, by selecting "Time" button 1038, the user can add an indication of the current time to the label(s) at the cursor. Using one of "Days" button 1040 and "Quarters" button 1044, the user can similarly add the name of one of the days of the week to the label(s) being created or an indication of one of the four quarters Q1 to Q4 of a year to the label(s) being created. In this way, as described above, by the addition of label data to the image 1010 representative of the label medium, a modified version of the image 1010 representative of the label medium is displayed on the display 610.

Thus, embodiments of the present invention enable a user to create a set of plural labels to be printed, by way of the user only needing to define the content of one label (i.e. the label displayed on the display 610). In response to receiving at the controller 600 a signal representative of a first value to be included in a first label of the set (i.e. the first of the values of an autofield, such as "January"), the controller is arranged to determine a second value to be included in the second label of the set (such as "February"). In response to receiving at the controller 600 a signal representative of common label data to be included in the first label of the set (i.e. data added to the displayed label that is not part of an autofield), the controller is arranged to cause the common label data to be included in the second label of the set and any further labels of the set.

When the user is happy with the addition of one of the autofield label data to the image 1010 representative of the label medium, the user selects the "Done" button 1046 present in the autofield graphical control panel 1032 to close the autofield graphical control panel 1032 and revert to the display shown in FIG. 5 (albeit it with any additional label data just added shown in the image 1002 representative of the label medium).

In alternative embodiments, selection of one of the "Done" buttons 1028, 1046 does not collapse the graphical control panel 1012, 1032 in this way. In those embodiments, the graphical control panels 1012, 1032 may be collapsed and hidden from view by selecting by the user the header associated with the displayed graphical control panel. So, for example, in FIG. 6a the user may close the barcode graphical control panel 1012 by touching the portion of the touch panel 608 which overlies the "insert" header 1004 displayed in the second section B of the display 610.

Figure 7A:
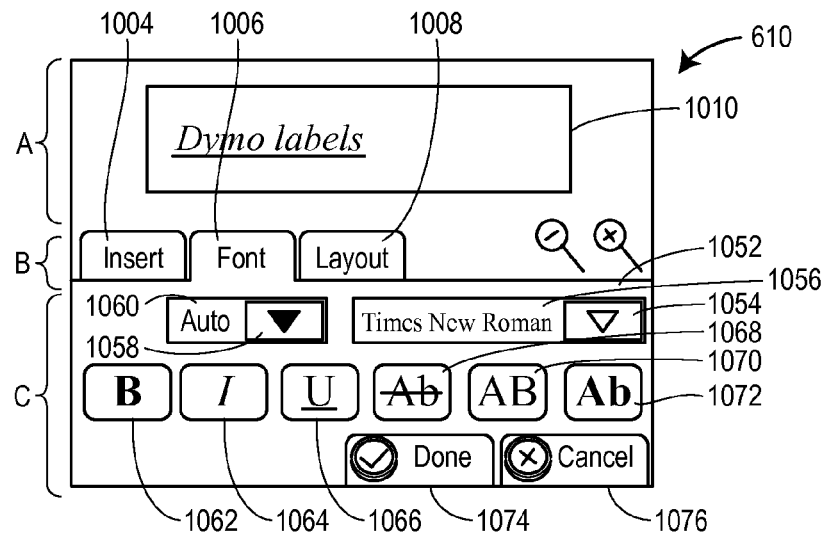
FIGS. 7a to 7c show further displays of a label printer that is an embodiment of the present invention.

If the user selects the font tab/header 1006 shown in any one of FIGS. 5, 6a and 6b, then the controller 600 receives a signal indicative of this selection by the user of that element 1006. The controller 600 then controls the display 610 to display a font graphical control panel 1052, as shown in FIG. 7a. By way of this font graphical control panel 1052, the user is able to change one or more attributes of a font of text label data included in a label being created.

When text label data is shown present in the image 1010 representative of the label medium, the user can select either a portion of the text by highlighting the desired portion (by touching the part of the touch panel 608 overlying the start of the portion and dragging along the touch panel 608 over the remainder of the desired portion), or the user can select all of the displayed text (by touching a portion of the touch panel 608 which overlies an indication e.g. of the boundary of the text label data, such as a dashed rectangular border around the text label data, or by tapping twice in quick succession on any part of the touch panel 608 that overlies a part of the text label data). In any case, once at least a portion of the text label data has been selected, the user can alter the attributes of the text, such as the size, font or decoration of the text.

Figure 7B:
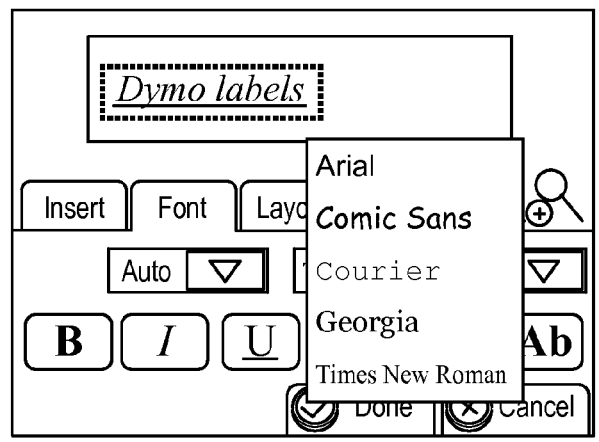

By selecting dropdown box arrow 1054 in FIG. 7a, the controller 600 controls the display 610 to display a list of available fonts (type faces) which may be applied to the selected text (see FIG. 7b). Once one of the type faces of the list has been selected (by the user touching the portion of the touch panel 608 which overlies the name of the desired type face), the type face or font is applied to the selected text and the list disappears. An indication in box 1056 then indicates the current font of the selected text. As can be seen in FIG. 7a, the selected text has the "Times New Roman" font applied to it.

Figure 7C:
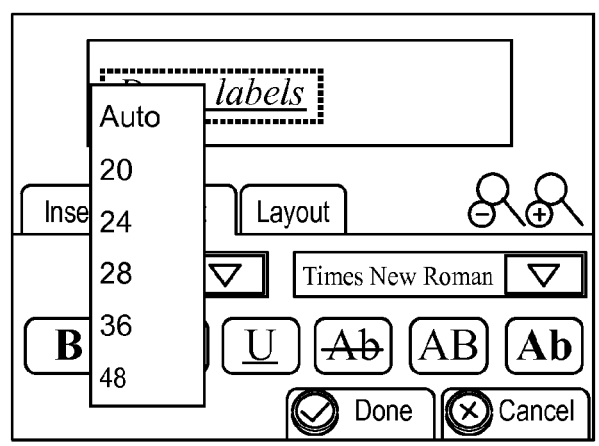

In response to the user selecting the portion of the touch panel 608 overlying the dropdown button 1058, the controller 600 controls the display 610 to display a list of font sizes which may be applied to the selected text, as shown in FIG. 7c. On selecting one of the listed available font sizes, the font size is applied to the selected text and the list disappears from view. An indication of the current font size is provided in the box 1060. In FIG. 7a, it can be seen that the font size is set to "automatic", meaning that the text is given the largest size of font which will still enable the text to fit within the bounds of the image 1010 representative of the label medium.

Similarly, with at least a portion of the text label data selected, the user is able to apply a decorative effect to the selected text by selecting one of buttons 1062-1072. Selecting button 1062 emboldens the selected text; selecting button 1064 puts the selected text into italic format; by selecting button 1066 the selected text is underlined; by selecting button 1068 a strikethrough is provided through the selected text; by selecting button 1070 a contour is provided to the selected text; and by selecting button 1072 a shadow is provided to the selected text. Each of these different decorative effects is considered herein as an attribute of the text.

By changing the decorative effect, type face, or font size of text shown in the image 1010 representative of the label medium, the controller 600 controls the display 610 to display a modified version of the image 1010 representative of the label medium comprising the selected text with a modified attribute (or modified attributes).

When the user is happy with the changes they have made to the attributes of the selected text, the user can touch a portion of the touch panel 608 overlying the "Done" button 1074, and the font graphical control panel 1052 is collapsed and hidden, and the user is presented with the screen shown in FIG. 5 (albeit with the label data added to the label displayed within the image 1002 of the label medium). In alternative embodiments, selecting the "Done" button 1074 does not collapse the font graphical control panel 1052, but instead applies the attributes illustrated in the font graphical control panel 1052 to the selected text. In that embodiment, changes to the attributes of the text shown in the image 1010 representative of the label medium are not made until the "Done" button 1074 is selected by the user. As discussed above, by selecting "Cancel" button 1076, no changes are made to the label data included in the image 1010 representative of the label medium. By selecting the "Cancel" button 1076, in some embodiments the font graphical control panel 1052 is also collapsed and the user is presented with the screen shown in FIG. 5 (again with any label data added to the label displayed within the image 1002 of the label medium).

When the screen illustrated in FIG. 5 is displayed on the display 610, the use can alter the layout of aspects of the label being created by selecting layout header 1008 in the second section B of the display 610. In response to receiving at the controller 600 a signal indicative of this selection of the layout element 1008 by the user, the controller 600 is configured to control the display 610 to display the screen shown in FIG. 8a.

Similarly to FIG. 6a, the screen of 8a includes a second image 1010 representative of the label medium in an uppermost first section A of the display 610, the selectable tabs or headers 1004, 1006, 1008 in the middle second section B of the display 610, and a layout graphical control panel 1082 in the bottom-most third section C of the display 610.

Figure 8A:
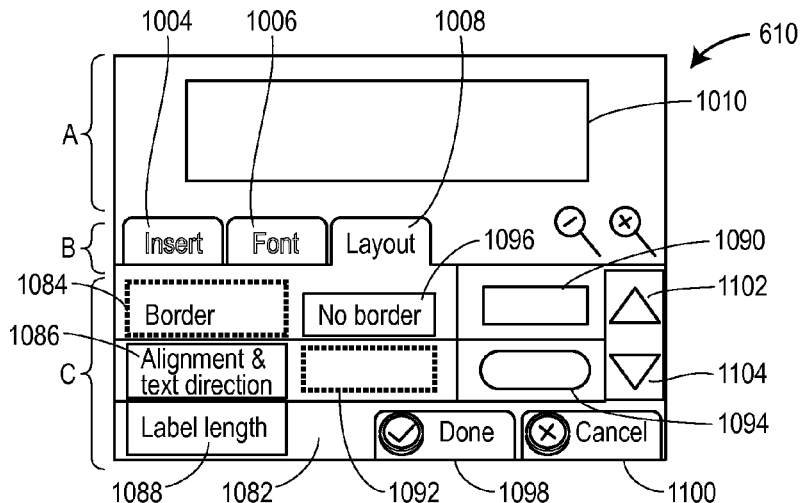
FIGS. 8a to 8c show further displays of a label printer that is an embodiment of the present invention.
Figure 8B:
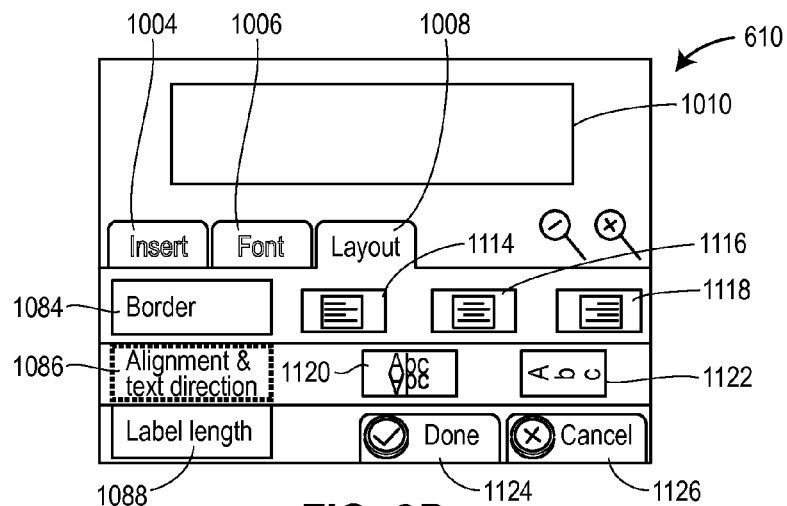
Figure 8C:
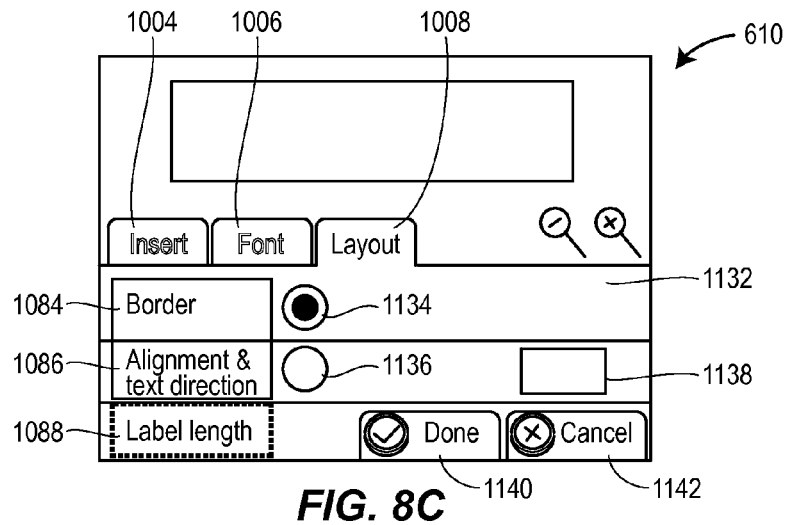

The layout graphical control panel 1082 comprises three sub control panels, the first of which (relating to borders for a label being created) is displayed in FIG. 8a. The user can view a second layout sub control panel (as shown in FIG. 8b) relating to alignment and text direction by selecting the button 1086 as shown in FIG. 8a. Similarly, the user can view a third layout sub control panel (as shown in FIG. 8c) relating to label length, by selecting button 1088 shown in FIG. 8a. These second and third sub control panels will be discussed in more detail below.

With reference to FIG. 8a, a border an be applied to a label being created by the user selecting one of regions 1090 (which adds a rectangular border formed of a solid line to the label), 1092 (which adds a rectangular border of a dotted line to the label), and 1094 (which adds a border with curved ends and a solid line to the label). Further selectable regions, and thus further selectable borders for applying to the label, are visible and selectable by the user scrolling up or down the list of available borders by selecting one of the up arrow 1102 and the down arrow 1104, respectively, at the right hand side of the layout graphical control panel 1082. If the user prefers not to add a border to the label, or to remove a border already applied to the label being created, the user can select the region labelled 1096 shown in FIG. 8a.

In some embodiments, the selected border or the selection of region 1096 to provide no border to the label, is effected by the user selecting the "Done" button 1098 in the layout graphical control panel 1082, substantially as described above. On the other hand, in some embodiments the addition or removal of a border is effected when the user selects one of the regions 1090, 1092, 1094, and 1096, and thus before the user selects the "Done" button 1098. In that scenario, selection of the "Done" button 1098 then may collapse the layout graphical control panel 1082 to return the user to the screen displayed in FIG. 5 (albeit with any added or edited label data of the label displayed within the image 1002 of the label medium). In some embodiments, the user's selection of the "Cancel" button 1100 in FIG. 8a acts as an "Undo" button, such that any selection made in the layout graphical control panel 1082 shown in FIG. 8a is reversed. In that scenario, the user may also be again shown the screen shown in FIG. 5 (again with any label data of the label displayed within the image 1002 of the label medium).

In response to receiving at the controller 600 a signal indicative of a selection of the region 1086 in FIG. 8a, the controller 600 is configured to control the display 610 to display the graphical control panel 1112 illustrated in FIG. 8b. By way of this graphical control panel 1112, the user is able to change, relative to the label medium, the alignment and/or direction of text to be included in the label being created. Having selected at least a portion of text label data (not shown) included within the image 1010 representative of a label medium, the user can then select whether to left-align, centre-align, or right-align that text relative to the label medium by selecting one of respective buttons 1114, 1116, and 1118 included in the graphical control panel 1112. Similarly, by selecting button 1120 the user can add a mirror effect to the selected text label data (i.e. an image mirrored about a horizontal axis below the selected text, which image is a mirrored version of the text, is added below the selected text).

By selecting button 1122 included in the graphical control panel 1112, the user is able to create a vertical label, rather than a horizontal label. In a horizontal label, text characters are arranged such that they are viewable the correct way up when a label is held with its longitudinal direction extending horizontally, and the width of the label extending vertically. In contrast, in a vertically-aligned label, the text string still extends along the longitudinal length of a label or tape, but individual character(s) of the text of the label are rotated through 90 degrees such that they are viewable the correct way up when a user holds the tape such that its longitudinal direction extends vertically and its width extends in a horizontal direction.

The effect of selecting one of the buttons 1114, 1116, 1118, 1120, and 1122 may be applied to selected text directly in response to selecting one of those buttons, or alternatively the effect may only be applied once the "Done" button 1124 has been selected by the user. Once the "Done" button 1124 has been selected, the controller 600 may be configured to control the display 610 to display the screen shown in FIG. 5 (albeit with any added or edited label data of the label displayed within the image 1002 of the label medium). Alternatively, in some embodiments the screen shown in FIG. 8b is maintained. In some embodiments, the user's selection of the "Cancel" button 1126 acts as an "Undo" feature, such that any alignment and text direction operations made through selection of one of the buttons shown in the graphical control panel 1112 are undone. The user may also be shown the screen shown in FIG. 5 (again with any label data of the label displayed within the image 1002 of the label medium), in response to selecting the "Cancel" button 1126.

By selecting the region 1088 shown in either of FIG. 8a or 8b, the controller 600 receives a signal indicative of the selection of this region 1088 by the user, and in response controls the display 610 to display the screen shown in FIG. 8c.

In FIG. 8c, the controller 600 controls the display 610 to display a graphical control panel 1132 in which the user can select how the length of a label being created is determined. By selecting radio 1134, the length of the tape (i.e. the dimension of the tape in its longitudinal direction) is determined in dependence on the position and size of label data included in the label. Thus, as further label data is added to a label in its longitudinal direction, the length of the label is automatically extended to accommodate that label data. Alternatively, the user can select radio 1136, which ensures that the resultant label, when printed, will have a certain fixed length. In different embodiments the user can enter the fixed length required in text-entry box 1138, by way of operation of hardware keys on a keyboard of the label printer or software keys displayed on the display 610 of the label printer.

In some embodiments, any label data which extends outside of the image 1010 representative of the label medium to be printed upon will not be printed on the resultant label. In other embodiments, label data which extends outside of the image 1010 representative of the label medium may be compressed so as to fit within the image 1010, and thus printed on the resultant label. In further embodiments, the controller 600 may receive a signal indicative of the fact that at least a portion of the label data extends outside of the image 1010 representative of the label medium, and the controller 600 is configured to provide to the user an alert indicating that at least a part of the label data is outside of the image 1010. The user can then take corrective action, either by shrinking the size of the label data or expanding the size of the label medium.

Similarly to the graphical control panels described above, the effects of the selections made in graphical control panel 1132 may either be performed when the user selects one of radio 1134 and 1136, or alternatively may only be performed once the user has selected the "Done" button 1140. Selection of the "Done" button 1140 may in some embodiments cause the controller 600 to control the display 610 to display the screen shown in FIG. 5 (albeit with any label data of the label displayed within the image 1002 of the label medium). The user may select the "Cancel" button 1142 in the graphical control panel 1132, to undo any changes made to the label medium using the graphical control panel 1132. Again, the user may be shown the screen illustrated in FIG. 5 (again with any label data of the label displayed within the image 1002 of the label medium) in response to selecting the "Cancel" button 1142.

Figure 9A:
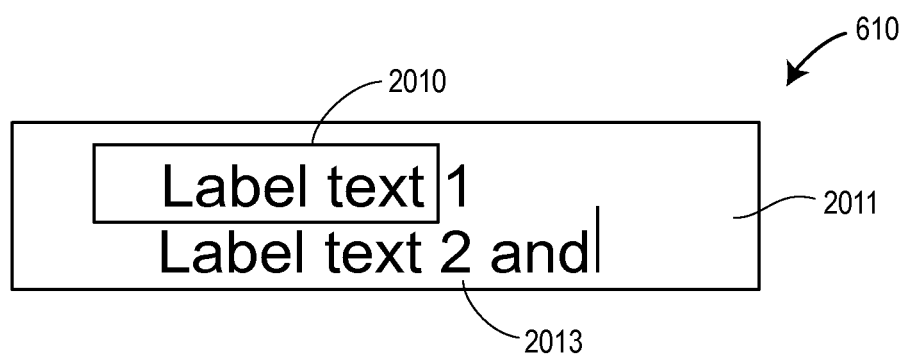
FIGS. 9a to 9b show further displays of a label printer that is an embodiment of the present invention.
Figure 9B:
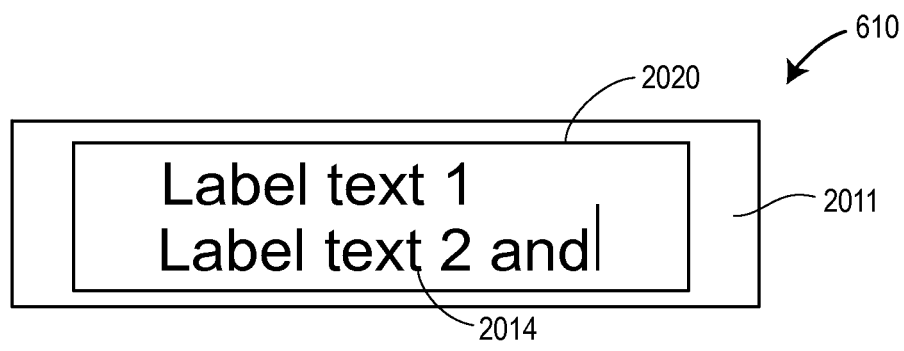

With reference to FIGS. 9a and 9b, another feature of some embodiments of the present invention will be described.

Figure 26:
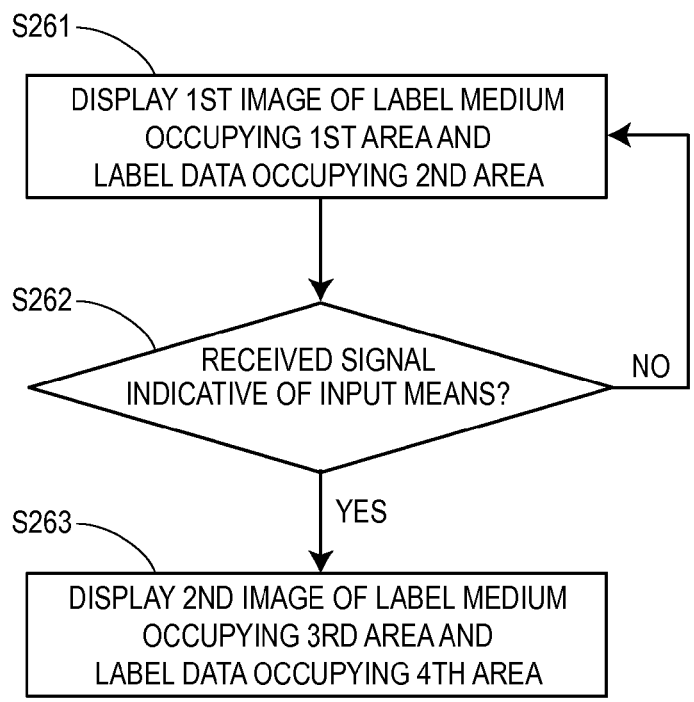
FIG. 26 shows a flow diagram illustrating a further method of controlling a label printer according to an embodiment of the present invention.

FIG. 9a shows a background region 2011 of a display 610 of a label printer embodying the present invention. A controller 600 of this label printer is configured to control the display 610 to display a first image 2010 representative of a label medium occupying a first area of the display 610. The controller 600 is also configured to control the display 610 to display label data 2013 for printing onto the label medium, which label data occupies a second area of the display 610 (step s261 in FIG. 26). As can be seen in FIG. 9a, part of the label data 2013 is outside of the first image 2010 representative of the label medium. Thus, it can be considered that at least part of the second area is outside of the first area. In other embodiments, all of the label data 2013 may be displayed outside of the first image 2010 representative of the label medium, and thus outside of the first area.

If the user was to instruct the label printer to print the label being created in the display 610, in some embodiments the printhead of the label printer may be instructed only to print the portion of the label data 2013 which falls within the bounds of the first image 2010 representative of the label medium, and thus within the bounds of the first area. In other embodiments, the controller 600 may be configured to provide the user with an alert indicating that at least part of the second area falls outside of the first area. This alert may be visual (such as a message displayed on the display 610), and/or an audible alert, and/or an alert which the user can feel, such as causing an element in the label printer to vibrate.

In the user wants to ensure that all of the label data 2013 is printed onto a label, the user can re-size the image representative of the label medium 2010 such that it encompasses the label data 2013. In some embodiments of the present invention in which the display 610 is comprised in a touchscreen 612, the user can re-size the image representative of the label medium by touching e.g. a corner of the first image 2010, and then "dragging" that corner to stretch the image 2010. By "dragging" it is meant that the user moves their finger along the surface of the touch panel 608 of the touchscreen 612. In embodiments in which the display 610 is not part of a touchscreen 612, the user may stretch the image 2010 by using another input device (such as a mouse, or mousepad) to select e.g. a corner of the image 2010 and then "drag" it to stretch the image 2010. Either of these two operations may be considered a selection by the user to re-size the image representative of the label medium (step s262 in FIG. 26).

In still further embodiments, the user may instruct the label printer to re-size the image representative of the label medium by pressing a hardware key of a hardware keyboard, or selecting a region of a touch screen panel 608 which is indicated as being selectable to perform this operation. For example, a hardware key or region of the display 610 may be labelled or otherwise indicated to have the effect, when selected, to re-size the image 2010 representative of the label medium. This re-sizing may be by a certain percentage. Again, any of these operations may also be considered a selection by the user to re-size the image 2010 representative of the label medium (step s262 in FIG. 26).

In response to receiving a signal (such as a signal representative of one of these selections by the user) at the controller 600, the controller 600 is configured to control the display 610 to display a second image 2020 representative of the label medium in place of the first image 2010, as shown in FIG. 9b. As can be seen in FIG. 9b, the second image 2020 occupies what will be termed as a third area that is larger than the first area discussed above with reference to FIG. 9a. The label data is still displayed on the display 610, and is labelled in FIG. 9b as 2014. The label data can be considered to occupy a fourth area, which is the same size as the second area discussed above with reference to FIG. 9a (step s263 in FIG. 26).

It will be appreciated that, in this embodiment, the fourth area is within the third area, and thus the label data 2014 is included within the bounds of the second image 2020 representative of the label medium. In other embodiments, the image representative of the label medium may not be re-sized sufficiently such that the label data 2014 falls within the bounds of the second image 2020. In that case, the image 2020 may be further re-sized such that it encompasses more, or all, of the label data 2014.

In some embodiments of the present invention, the first image 2010 representative of the label medium is representative of a first label medium, and the second image 2020 representative of a label medium is representative of a second label medium that is different from the first label medium. In that case, a dimension (such as the width and/or the length) of the second label medium may be greater that the corresponding dimension of the first label medium. In other words, increasing the size of the image which represents a label medium causes the label data to be printed on a real-life label medium that has a correspondingly greater size. Thus, it can be considered that, in some embodiments, the user's selection of the size of the image representative of a label medium determines the size of the label medium onto which label data will be printed.

In some such embodiments, the printable size of the label data shown on the display 610 is the same both before and after the image representative of the label medium has been re-sized. Thus, for example, in FIG. 9a the text label data has a font size of 14 points, and the text label data shown in FIG. 9b also has a font size of 14 points. The same is applicable to other types of label data. For example, if an image to be printed onto a label medium is displayed as image label data on the display 610 in 9a, then the printable size of that image may be maintained when the image representative of the label medium is re-sized. In other words, regardless of whether the label data is printed on the smaller size of label medium or the larger size of label medium, it has the same overall real-life dimensions.

In other embodiments, the user's re-sizing of the image representative of the label medium does not determine the size of the label medium onto which label data will be printed. For example, the first image 2010 representative of a label medium shown in FIG. 9a is representative of a label medium with a width of 9 millimeters. The second image 2020 representative of a label medium shown in FIG. 9b may also be representative of a label medium with a width of 9 millimeters. Therefore, in some embodiments, the user's re-sizing of the image representative of a label medium determines the size of label data to be printed onto the label medium. Thus, while each of the first and second images 2010, 2020 representative of a label medium represent a label medium with a width of 9 millimeters, in FIG. 9a the text label data 2013 has a font size of 14 points, whereas the text label data 2014 shown in FIG. 9b has a font size of 8 points, even though it occupies the same-sized space on the display 610.

In order to indicate clearly to the user of the label printer the bounds of the images representative of the label medium, the first and third areas each have an appearance different from the appearance of the background 2011 displayed outside of the first and third areas. A border is also displayed around the perimeter of the first and third areas.

With reference to FIGS. 5-9b, the user's selection of any of the displayed buttons, regions, text entry boxes, scroll arrow buttons, label data, or image representative of a label medium can be considered to be a selection by the user of a part or of an area displayed on the display 610. So, for example, with reference to FIG. 7a, the user's selection of part of the text label data may be considered as selection by the user of a first area displayed on the display 610, and the selection by the user of button 1066 to apply an underlining attribute to the selected text label data may be considered to be a selection by the user of a second area displayed on the display 610.

Selection of area displayed on the display 610 by the user may comprise touching a portion of a touch panel 608 overlying the area of the display 610 (in embodiments where the display 610 is comprised in a touch screen 612). In response to the user's selection of an area, the controller 600 receives data representative of the selection by the user of that area displayed on the display 610.

Figure 27:
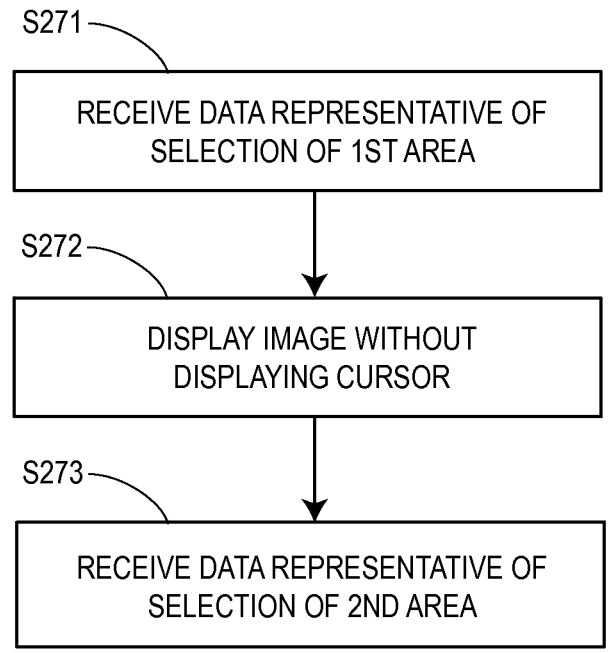
FIG. 27 shows a flow diagram illustrating a further method of controlling a label printer according to an embodiment of the present invention.

Between receiving at the controller 600 data representative of a selection by the user of a first area displayed on the display 610 (step s271 in FIG. 27) and receiving at the controller 600 data representative of a selection by the user of a second area displayed on the display 610 (step s273 in FIG. 27), the controller 600 is configured to control the display 610 to display a user interface or image without displaying a cursor between the first area displayed on the display 610 and the second area displayed on the display 610 (step s272 in FIG. 27).

Cursors displayed on conventional displays of label printers can take many forms, such as a crosshair, an arrow, or an image of a pointing hand. In order to ensure that the cursor is visible by a user of these conventional label printers, the cursor displayed has to be sufficiently large and/or contrasting against a background image. So, the smaller the display of a label printer, a greater proportion of the display that is taken up by the cursor. For known printers with small displays, the cursor can significantly obscure the rest of the image displayed on the display.

In embodiments of the present invention, by not displaying a cursor on the display 610 between the first and second areas displayed on the display selected by a user (step s272 in FIG. 27), then the portion of the user interface of other image displayed on the display 610 between the first and second areas can be clearly visible by a user. This image may comprise an image representative of a label medium, label data, or a message presented to the user. Thus, embodiments of the present invention allow the user to more clearly visualise the label medium/label data/message.

Some embodiments of the present invention may comprise displays with an area of 50 square centimeters or less.

In some embodiments of the present invention, in which a cursor is not so displayed, then the controller 600 may be configured to control the display 610 to display an indication of one or both of the selections of the first area and the second area. For example, with reference to FIG. 7a, button 1066 is shown with a highlighted surround to indicate that the user has selected that button 1066. If the selection of a part of the display 610 comprises a selection of a label medium, then the image representative of the label medium may be highlighted or otherwise modified from its pre-selected state. Similarly, if selection of part of the display 610 comprises selection by the user of label data displayed on the display 610, then the image representative of this label data may be modified in response to the selection. So, for example, a box may be displayed around the selected label data, or a colour of the displayed label data may be changed, or the label data may be displayed in reversed colours such as white on black when, in its preselected state, it was illustrated as black on white (such as can be seen when comparing FIGS. 7*b* and 7*a*).

As discussed above, selections by a user of a part of the touch panel 608 may cause the controller 600 to control the display 610 to display a modified version of an image representative of a label medium. The modified version may include label data (such as text, an image, a barcode, a symbol, a shape, or a decorative element) which was not comprised in the image representative of the label medium before the step of selection.

In some embodiments, the modified version of the image of the label medium may comprise text with an attribute which has been modified from an attribute that corresponding text in the image representative of the label medium displayed before the step of selection had. In some embodiments, the modified version of the image representative of a label medium may have at least one dimension (e.g. a width) that is different from a corresponding dimension of the image representative of the label medium displayed on the display 610 prior to the step of selection.

Further features of some embodiments of the present invention will now be described with reference to FIGS. 10*a*-12.

Figure 10A:
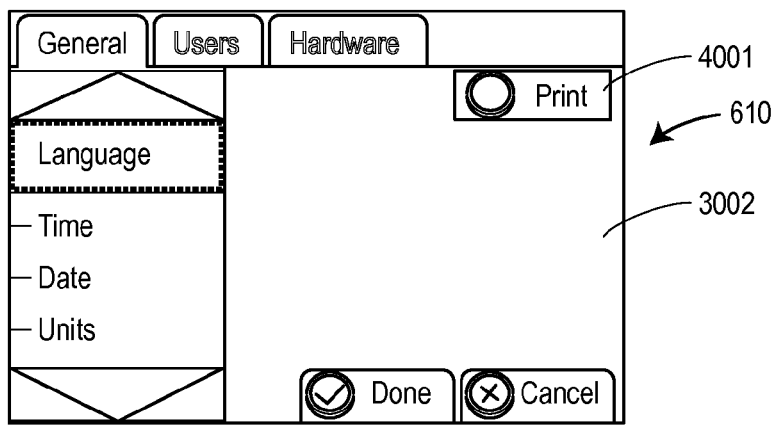
FIGS. 10a to 10c show further displays of a label printer that is an embodiment of the present invention.
Figure 10B:
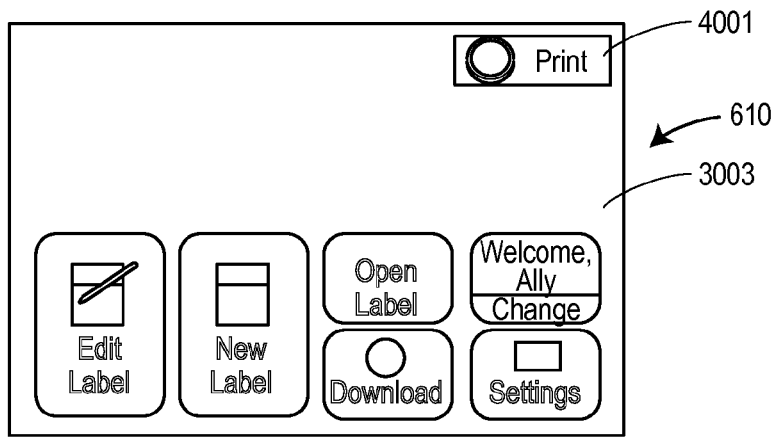
Figure 10C:
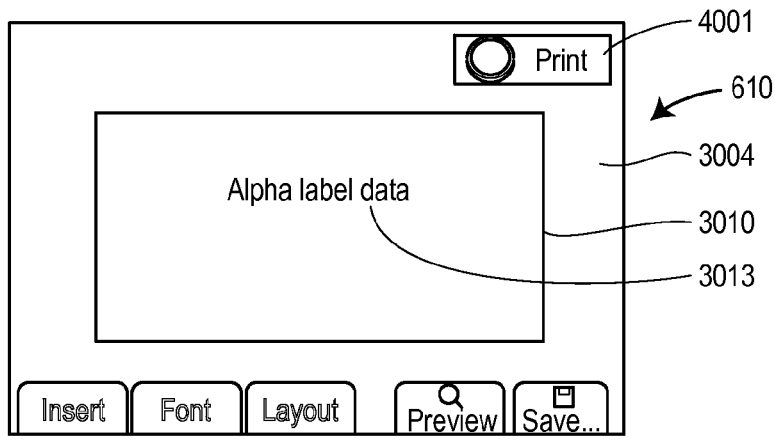

FIGS. 10*a*-10*c* illustrate features of a label printer that comprises a controller 600 (see FIG. 3), a memory, a display 610 and touch panel 608 of a touchscreen 612, and a section of the display 610 that is designated as a "print instructor" or "print instructing means" 4001.

The memory referred to in this discussion of the embodiment shown in FIGS. 10*a*-12 can be any one of the non-volatile memory or volatile memory 602, 604 illustrated in FIG. 3, or can comprise memory which is not part of the label printer as such, but is accessible via an interface of the label printer. The memory may comprise a buffer.

Figure 28:
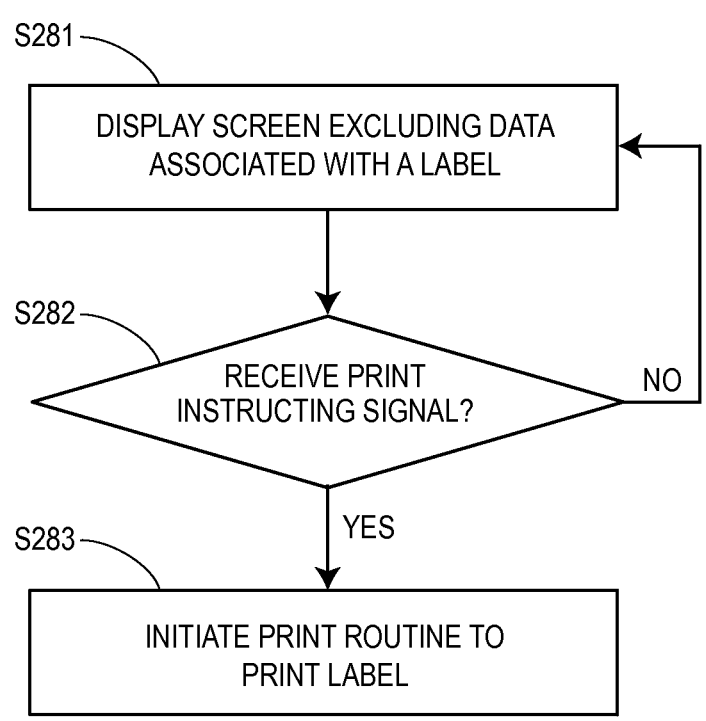
FIG. 28 shows a flow diagram illustrating a further method of controlling a label printer according to an embodiment of the present invention.

In FIG. 10*a*, the controller 600 is controlling the display 610 to display a screen 3002 relating to general settings of the label printer and excluding data associated with labels stored in the memory of the label printer (step s281 in FIG. 28). Similarly, in FIG. 10*b* the controller 600 is controlling the display 610 to display a screen 3003 which is a home screen presented to the user shortly after the label printer is switched on. The user can select different portions of the home screen 303 in order to instruct the label printer to enter different modes. For example, if the user selects the "edit label" region at the bottom left at the screen 3003, then a label editing work space is presented to the user (see FIG. 10*c*), via which the user can design a label for printing. Moreover, if the user selects the "settings" region of the display at the bottom right corner of the screen 3003, the user is presented with the screen shown in FIG. 10*a*. The home screen 3003 excludes data associated with any label stored in the memory (step s281 in FIG. 28).

While either of the screens 3002, 3003 are displayed on the display 610, the controller 600 is configured to initiate a print routine (step s283 in FIG. 28) in response to receiving a signal representative of an operation of the print instructor 4001 by the user (step s282 in FIG. 28). In the embodiment shown in FIGS. 10*a*-10*c*, operation of the print instructor 4001 comprises the user touching a portion of the touch panel 608 overlying the print button 4001.

FIG. 10*c* shows the label editing workspace screen 3004 that is displayed when the user selects the "edit label" region of the home screen 3003 shown in FIG. 10*b*. Screen 3004 includes an image 3010 representative of a label medium, including label data 3013 arranged on the label medium. The arrangement and dimensions of the label medium, and the label data 3013 included on the label medium, are examples of data associated with a label stored in the memory. The screen 3004 shown in FIG. 10*c* comprises a print instructor button 4001 which operates in the same way as the print instructor button 4001 shown in each of FIGS. 10*a* and 10*b*. Thus, when the user selects the print instructor button 4001 shown in any of FIGS. 10*a*-10*c* as described above (step s282 in FIG. 28), the controller 600 is configured to initiate the print routine (step s283 in FIG. 28).

In one embodiment of the present invention, the print routine comprises the controller 600 controlling the display 610 to display a screen 3005 via which the user is able to view attributes relating to how the label stored in the memory is to be printed. For example, in FIG. 12 the screen 3005 displayed on the display 610 includes an indication of the dimensions of the label to be printed, and also an indication of the number of copies of the label to be printed. The user can increase or decrease the number of copies of the label to be printed by selecting respective buttons 3006, 3007.

If the user does not currently wish to print the label or labels, selecting the "Cancel" button 4003 causes the controller 600 to control the display 610 to display the previously displayed screen (i.e. one of the screens 3002, 3003, and 3004). Alternatively, the user is able to instruct the controller 600 to control the printhead of the label printer to print the label displayed on screen 3005 onto a label medium by selecting the print button 4002 shown on the screen 3005 in FIG. 12. In other embodiments, the label is not shown on the screen 3005, but information (such as a file name, or part of text of the label data of the label) relating to the label is instead shown on the screen 3005.

In alternative embodiments, the user's selecting of the print instructor button 4001 shown in any of FIGS. 10*a*-10*c* leads to the controller 600 initiating a print routine which excludes displaying a screen via which the user is able to view attributes relating to how a label is to be printed and/or which excludes displaying a screen via which the user is able to instruct the controller 600 to control the printhead. In other words, the user's selecting the print instructor button 4001 shown in any of FIGS. 10*a*-10*c* may directly cause the controller 600 to control the printhead of the label printer to print the label stored in the memory onto a label medium.

Figure 11A:
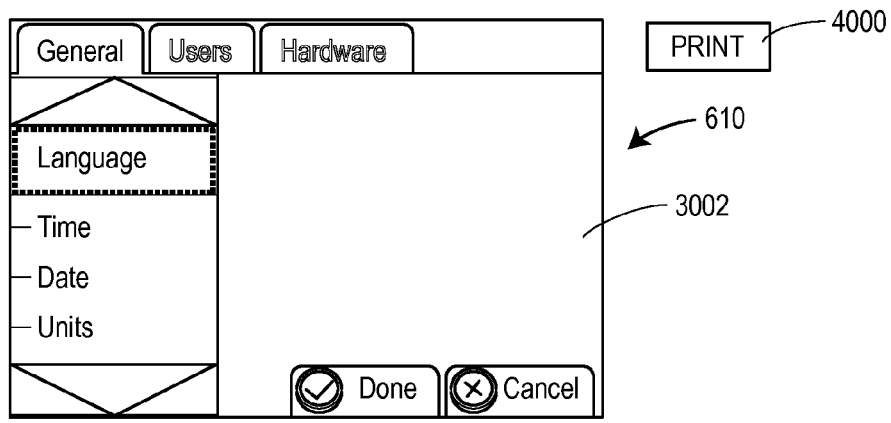
FIGS. 11a to 11c show further displays of a label printer that is an embodiment of the present invention.
Figure 11B:
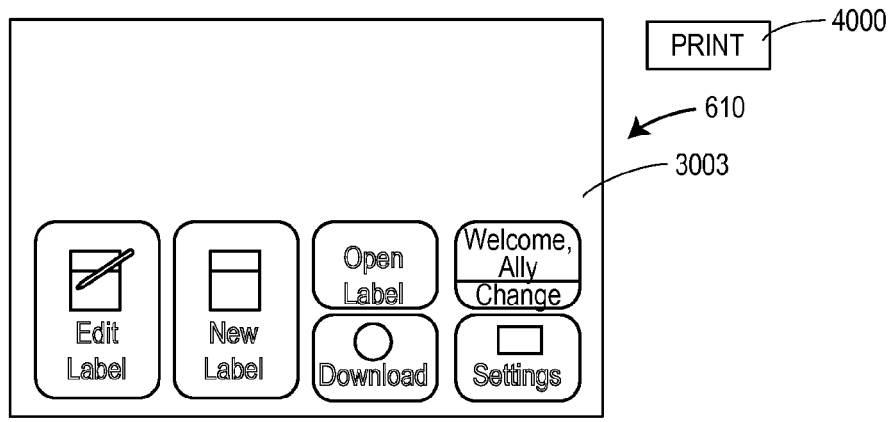
Figure 11C:
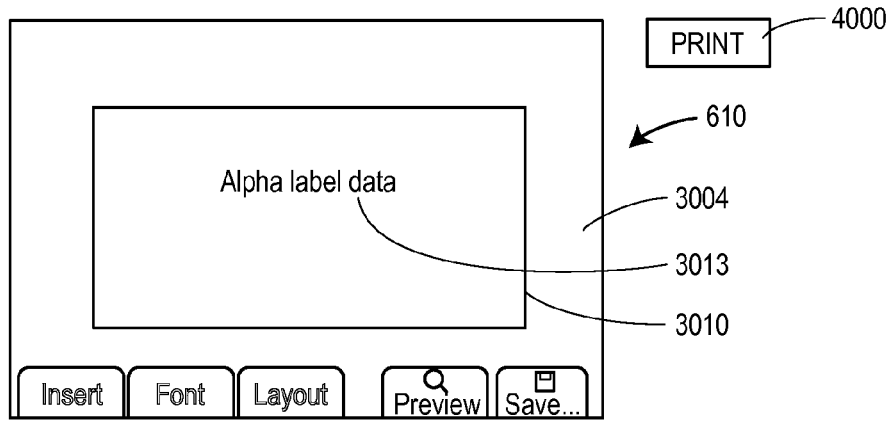
Figure 12:
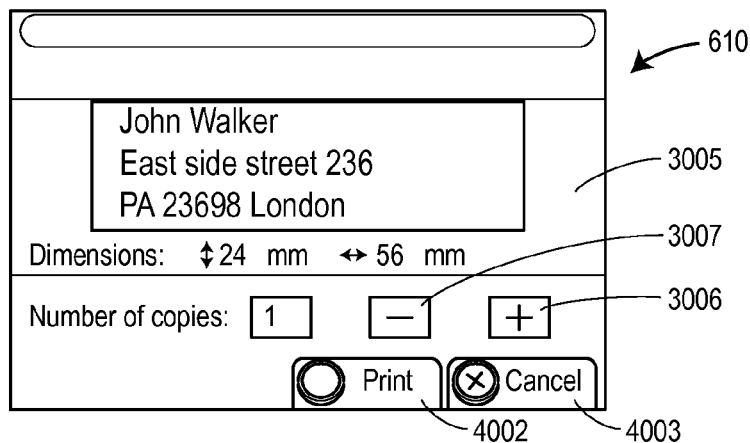
FIG. 12 shows another display of a label printer that is an embodiment of the present invention.

FIGS. 11*a*-11*c* illustrate a further embodiment of the present invention. FIGS. 11*a*-11*c* illustrate parts of a label printer that comprises a controller 600, a memory, a display 610, and a print instructor 4000 in the form of a hardware print key. The hardware print key 4000 is not a portion of the display 610, but is instead a key separate from the display and mounted on the label printer. In the embodiment illustrated in FIGS. 11*a*-11*c*, the display 610 may be comprised in a touch screen or may be a non-touchscreen display.

Figure 29:
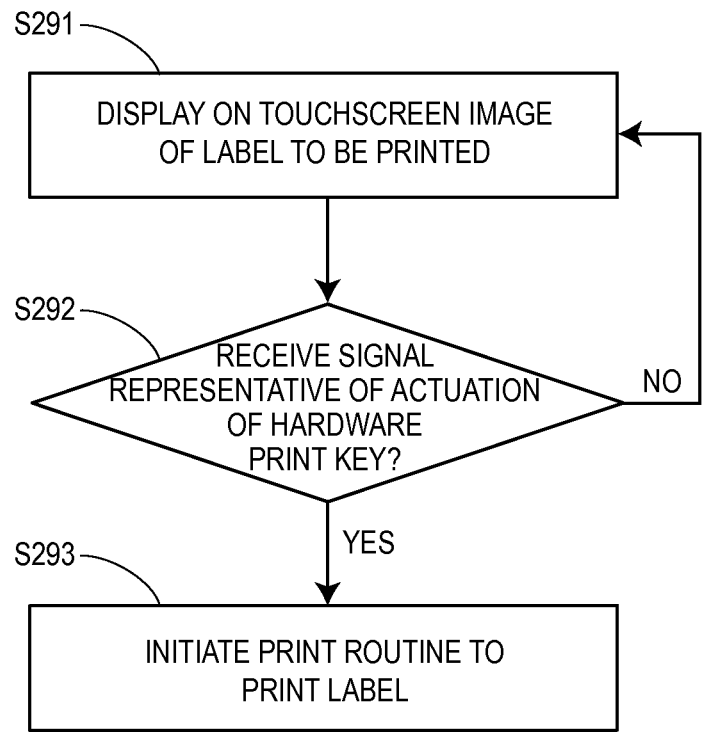
FIG. 29 shows a flow diagram illustrating a further method of controlling a label printer according to an embodiment of the present invention.

Operation of the embodiment illustrated in FIGS. 11*a*-11*c* is similar to that of the embodiment illustrated in FIGS. 10*a*-10*c*, and so like numerals are used to refer to like elements of the two embodiments. The controller 600 of the embodiment illustrated in FIGS. 11*a*-11*c* is configured to control the display 610 to display either a screen 3002, 3003 excluding data associated with a label stored in the memory (as discussed above) (step s281 in FIG. 28) or a screen 3004 including data associated with the label stored in the memory (again as discussed above) (step s291 in FIG. 29). While one of these screens 3002, 3003, 3004 is displayed, the controller 600 is configured to initiate a print routine (step s283 in FIG. 28 or step s293 in FIG. 29) in response to receiving a signal representative of an operation of the print hardware key 4000 by the user (step s282 in FIG. 28 or step s292 in FIG. 29).

The print routine of the embodiment illustrated in FIG. 11a-11c may comprise the controller 600 controlling a printhead of the label printer to print the label onto a label medium. Alternatively or additionally, the print routine may comprise the controller 600 controlling the display 610 to display a screen via which the user is able to view attributes relating to how the label is to be printed. Such a screen could be similar that to that illustrated in FIG. 12, but without the buttons 3006, 3007, 4002 and 4003 selectable by touching the screen.

Thus, in some embodiments of the present invention, the controller 600 may be configured to initiate a print routine in response to receiving a signal representative of an operation of print instructing means (which may either be a hardware key or a portion of a touch panel 608 selectable by a user) while a screen excluding data associated with the label to be printed and stored in memory is displayed on the display. In some embodiments, the print routine for printing the label stored in memory may be initiated through operation of the print instructing means, regardless of the content of the screen displayed on the display at the time.

With reference to FIGS. 13-17, further features of some embodiments of the present invention will be described.

Figure 13:
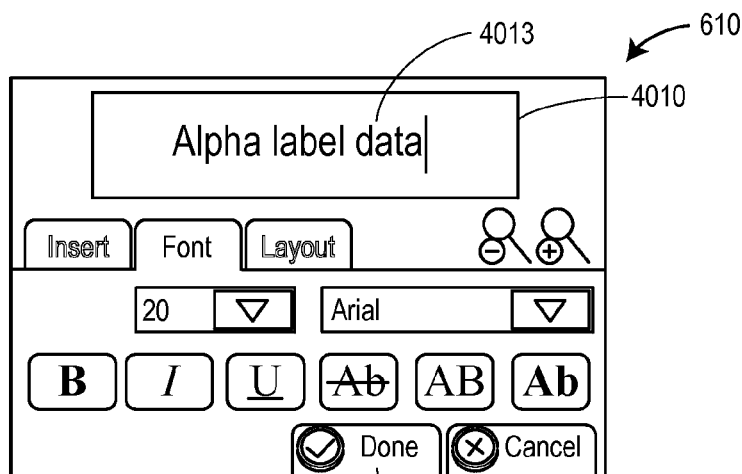
FIG. 13 shows a further display of a label printer that is an embodiment of the present invention.

As can be seen in FIG. 13, the user of the label printer has entered text label data 4013 into a label they are creating. The entered label data 4013, and an image 1010 representative of the label medium onto which the label data 4013 will be printed, are shown on the display 610 of the printer. The user has entered the label data 4013 by way of a hardware keyboard of the printer, but in other embodiments the user may have used a representation of a keyboard shown on a display 610 of a touchscreen 612 to enter the label data 4013.

When the user is happy with the label they have created (shown in FIG. 13), the user can optionally select a print instructor of the printer to cause the label data to be printed onto a label medium. The printed label has substantially the same appearance as the image shown on the display 610 of FIG. 13, i.e. the displayed image is a WYSIWYG (what you see is what you get) image representative of a label to be printed. In other embodiments, the user may choose not to print the label.

A buffer (such as the volatile memory 604 illustrated in FIG. 3) of the label printer stores label data defining the appearance of the label being created. In this embodiment, the label data comprises data defining the content of the label to be printed (i.e. data defining the characters selected by the user, and in other embodiments the images or symbols or barcodes entered by a user), and also data defining the layout of the label being created to be printed. The data defining the layout may comprise data defining the position of various entered characters relative to a reference point of a label medium or another point. In some embodiments, the label data defining the appearance of the label may comprise only one of data defining the content and data defining the layout of a label to be printed.

Figure 14:
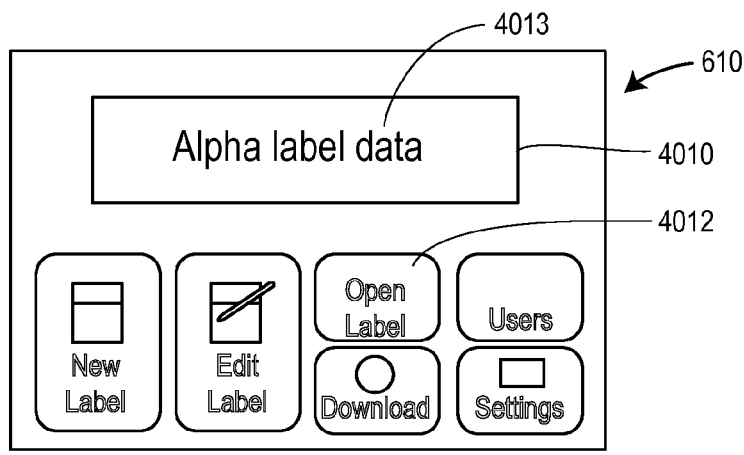
FIG. 14 shows a further display of a label printer that is an embodiment of the present invention.

If the user then decides to create a new label, the user can return to the home page display shown in FIG. 14 by selecting the "Done" button 4004 shown in FIG. 13. When the user is presented with the display 610 shown in FIG. 14, the user can choose to create a new label by selecting the "new label" region 4101 shown on the display 610. The user's touching of the touch panel 608 at a portion overlying this region 4101 causes a signal representative of a request to create a new label to be sent to the controller 600 of the label printer. In response to this, the controller 600 causes a comparing process to be initiated. In this comparing process, the label data defining the appearance of the label the user has just created (which is also shown in FIG. 14) that is stored in the buffer memory region is compared to label data stored in at least one non-volatile memory location of a plurality of non-volatile memory locations. The label data stored in the non-volatile memory locations may define the appearance of at least one respective label.

Figure 15:
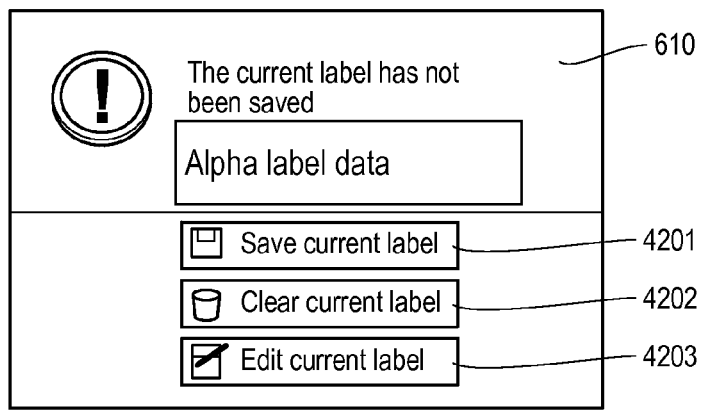
FIG. 15 shows a further display of a label printer that is an embodiment of the present invention.

If, as a result of this comparison process, it is determined that the label data defining the current label differs from the label data stored in any of the label memory locations, then the display shown in FIG. 15 is presented to the user. The user is therefore provided with a prompt to store the current label, such that it is not lost when the buffer is cleared in the future. If the user wishes to store the label data defining the appearance of the current label, then by selecting the "save current label" region 4201 shown on the display 610 of FIG. 15, then the user is presented with a user interface for choosing a label memory location in which to store the label data defining the appearance of the current label. For simplicity, this interface is not shown herein.

The label data defining the appearance of the current label that is stored in the buffer memory region is thus stored in one of the plurality of label memory locations when the label data stored in the buffer differs from the label data stored in said at least one label memory location.

In this embodiment, the comparing process comprises comparing the label data defining the appearance of the current label to label data stored in each label memory location of the plurality of label memory locations. However, in alternative embodiments, the process of comparing may comprise comparing the label data stored in the buffer only to label data stored in those label memory locations in which label data is stored.

It is to be noted at this point that the non-volatile memory may comprise the non-volatile memory 602 illustrated in FIG. 3, which is part of the label printer, or may alternatively be a form of memory which is not part of the label printer as such, but is accessible via an interface of the label printer.

Figure 16:
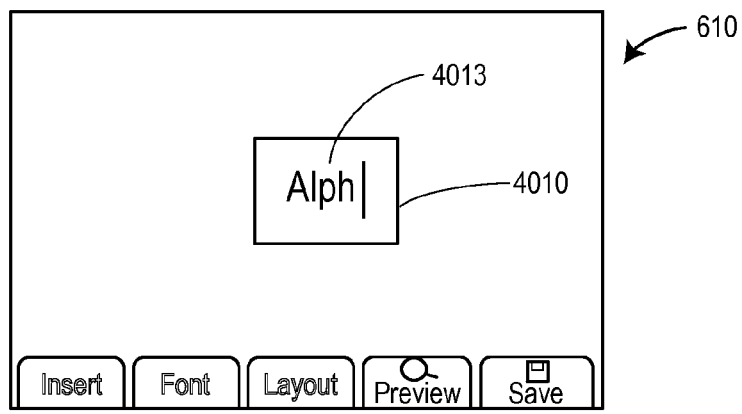
FIG. 16 shows a further display of a label printer that is an embodiment of the present invention.
Figure 17:
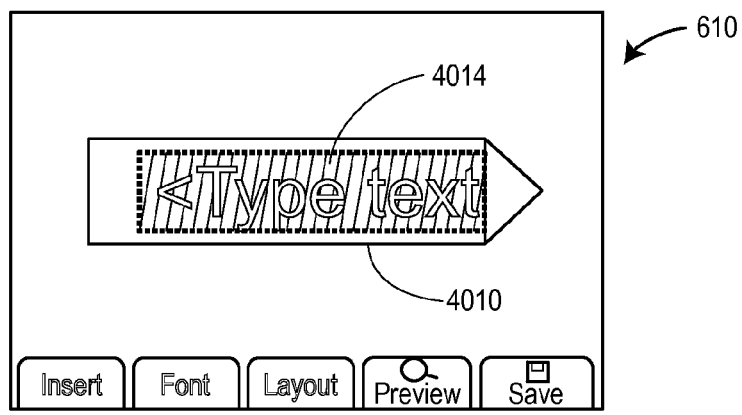
FIG. 17 shows a further display of a label printer that is an embodiment of the present invention.

Alternatively to this process, if the user wishes not to save the label data defining the appearance of the current label, then by selecting the "clear current label" region 4202 displayed on the display 610 of FIG. 15, the controller 600 controls the display 610 to display the image shown in FIG. 17 (discussed below). Alternatively still, if the user decides that they wish to continue working on the current label, then by selecting the "edit current label" region 4203 shown on the display 610 of FIG. 15, then the edit screen of FIG. 13 is presented to the user, and the user can edit the label data such as in the manner shown in FIG. 16.

In this embodiment, after either selecting the region 4202 displayed on the display 610 in FIG. 15, or saving the label data defining the appearance of the current label to a label memory location via the interface discussed above, the user is presented with a display similar to that shown in FIG. 13 which includes an image 4010 representative of a label medium and the label data 4013 of the label just created. By deleting this label data 4013, as shown in FIG. 16, the user is able to enter new label data to create a new label. In alternative embodiments, after having selected the region 4202 shown in FIG. 15 or saving the current label via the interface discussed above, the buffer memory region is cleared to remove the label data defining the appearance of the current label. The user may then be presented with the display 610 shown in FIG. 17. In FIG. 17, the controller 600 of the label printer has controlled the display 610 to display an image 4010 representative of a label medium and a prompt 4014 to the user to enter label data at a position relative to the image 4010 representative of the label medium. In alternative embodiments still, the prompt 4010 may be omitted. In that case, only the image 4010 representative of the label medium may be displayed in the display 610 shown in FIG. 17.

With reference to FIGS. 13-18, further features of some embodiments of the present invention will be described.

After having created (and optionally printed) a current label, such as discussed above with reference to FIG. 13, the user can press a home key such that the controller 600 is caused to control the display 610 to display the screen shown in FIG. 14, again as discussed above. Again, it is to be noted that the label data defining the appearance of the current label (i.e. the data defining the text "alpha label data" and its position relative to the image 4010 representative of the label medium) is stored in a volatile memory region (such as a buffer) of the label printer.

The process of retrieving label data defining the appearance of an alternative label from a non-volatile label memory location into the volatile buffer will now be discussed with reference to FIGS. 14, 15 and 18. When the user wishes to retrieve a saved label, they select the "open label" region 4102 displayed on the display 610 shown in FIG. 14 (step s0 in FIG. 18). The label data defining the appearance of the current label and stored in the buffer is then compared with label data stored in each of the plurality of non-volatile label memory locations (which, as discussed above, may comprise the non-volatile memory 602 illustrated in FIG. 3, or some other non-volatile memory external to the label printer).

If it is determined that the label data defining the current label differs from all of the label data stored in the non-volatile memory (step s1 in FIG. 18), then the controller 600 controls the display 610 to display the display shown in FIG. 15 in order to give the user the opportunity to initiate storing of the label data held in the buffer to one of the non-volatile label memory locations.

Figure 18:
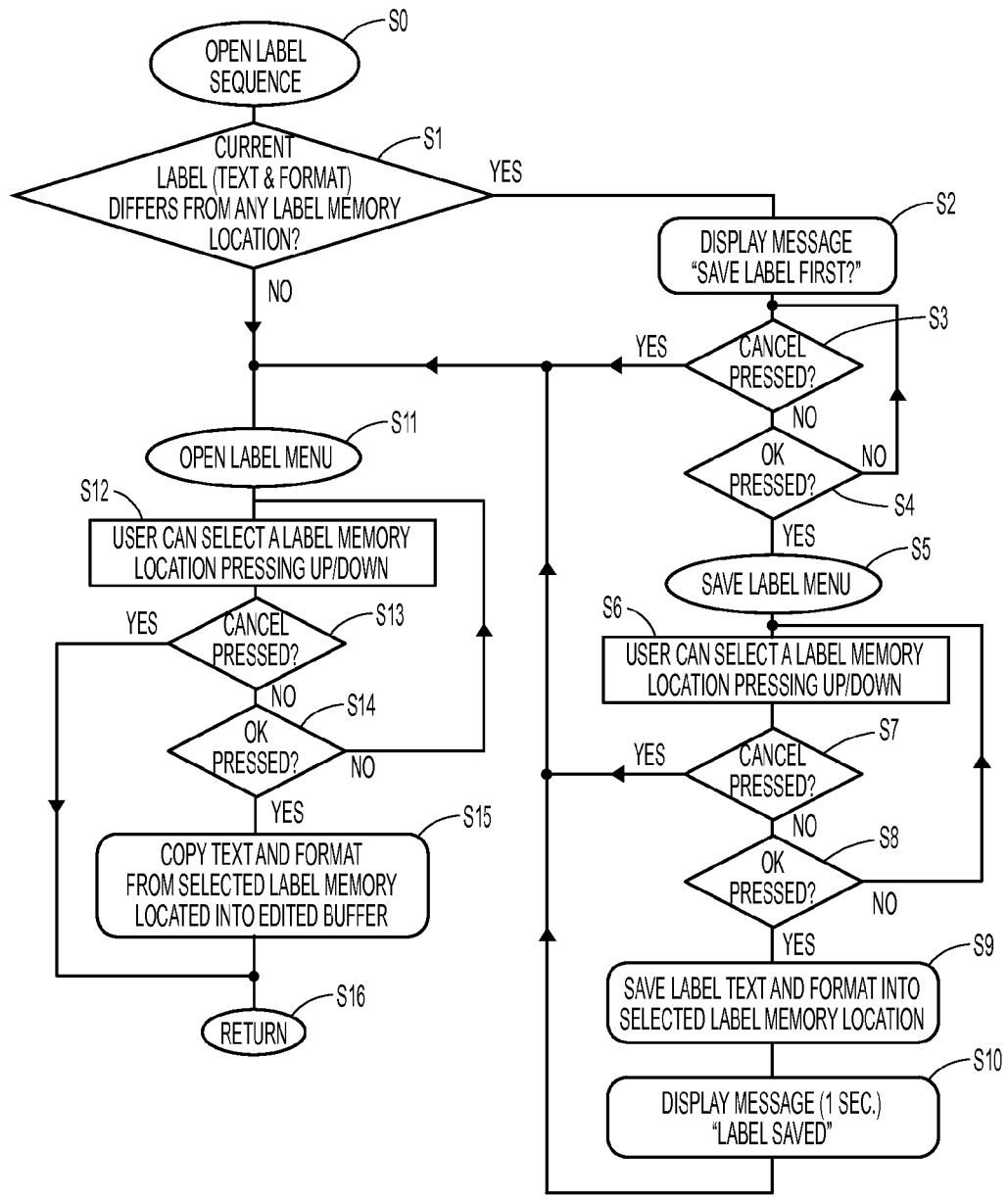
FIG. 18 shows a flow diagram illustrating a method of controlling a label printer according to an embodiment of the present invention.

So long as the user does not select region 4202 shown in FIG. 15 (step s3 in FIG. 18) and the user does select region 4201 shown in FIG. 15 (step s4 in FIG. 18), then the interface (not shown) for saving the label data to the non-volatile memory is displayed on the display 610 (step s5 in FIG. 18). Via this interface, the user can select a label memory location (step s6 in FIG. 18). So long as the user does not cancel the save operation (step s7) and provides confirmation of an indicated label memory location as being the desired memory location to which the label data is to be stored (step s8), then the label data defining the appearance of the current label is saved at the desired non-volatile label memory location (step s9).

The controller 600 then controls the display 610 to display a message to the user to notify them that the label data defining the appearance of the current label has been stored at the non-volatile memory (step s10), and then a menu (not shown) via which the user is able to select a previously-stored label is shown (step s11).

Alternatively, if in step s1 it is determined that the label data defining the appearance of a current label is the same as label data stored in one of the non-volatile label memory locations, then the process skips steps s2-s10 to arrive at step s11, in which the menu (not shown) via which the user can select a previously-saved label is displayed. With this menu displayed, the user can select one of the plurality of non-volatile memory locations (step s12). So long as the user does not cancel the open label process (step s13), and enters a command to confirm that an indicated label memory location is the label memory location holding a desired pre-saved label (step s14), then the label data defining that pre-stored label is copied from the selected label memory location into the buffer memory region (step s15). The user may then be presented with a display such as that shown in FIG. 17, except that the prompt 4014 is replaced by the label data retrieved from the selected non-volatile label memory location (step s16). If, alternatively, the user cancels the open label process (step s13), then the user would be presented with the display shown in FIG. 13 (step s16), in which the current label is displayed.

It will be understood by the reader that when the user wishes to create a new label, when data defining another label is stored in the volatile memory, then that process can be represented by way of a flow chart like that shown in FIG. 18, but with step s0 comprising "New label sequence" instead of "Open label sequence", and with steps s11 to s15 replaced by step s11 of "Clear edit buffer" and step s12 of "Display page in which user can create a new label".

With reference to FIGS. 13-15 and 19, further features of some embodiments of the present invention will be described.

As discussed above, when a user is creating a current label, label data defining the appearance (i.e. content and/or layout) of the current label may be stored in a volatile buffer of the label printer. Also as discussed above, the controller 600 of the label printer may be arranged to control the display 610 such that it displays an image representative of the label data stored in the buffer. Examples of such a displayed image are shown in FIGS. 13 and 14, in which the label data stored in the buffer memory region is represented by the label data image 4013 shown at a position relative to the image 4010 representative of a label medium.

In this embodiment, if the user chooses to turn off the label printer, then they may press a hardware and/or a software "on/off" key. The pressing of this key causes a signal representative of an instruction to turn off the label printer to be sent to the controller 600. This causes a power-off sequence (step s20 in FIG. 19) to be initiated.

After having received this signal, the controller 600 causes a comparison process to be initiated. In this comparison process, the label data that defines the appearance of the current label and that is stored in the buffer memory region is compared to label data stored in at least one of a plurality of non-volatile memory locations (as discussed above). This is step s21 in FIG. 19. If it is determined that the label data stored in the buffer is the same as some label data stored in the non-volatile memory, then the controller 600 causes the buffer to be cleared (step s22) and the printer is then turned off (step s23).

Figure 19:
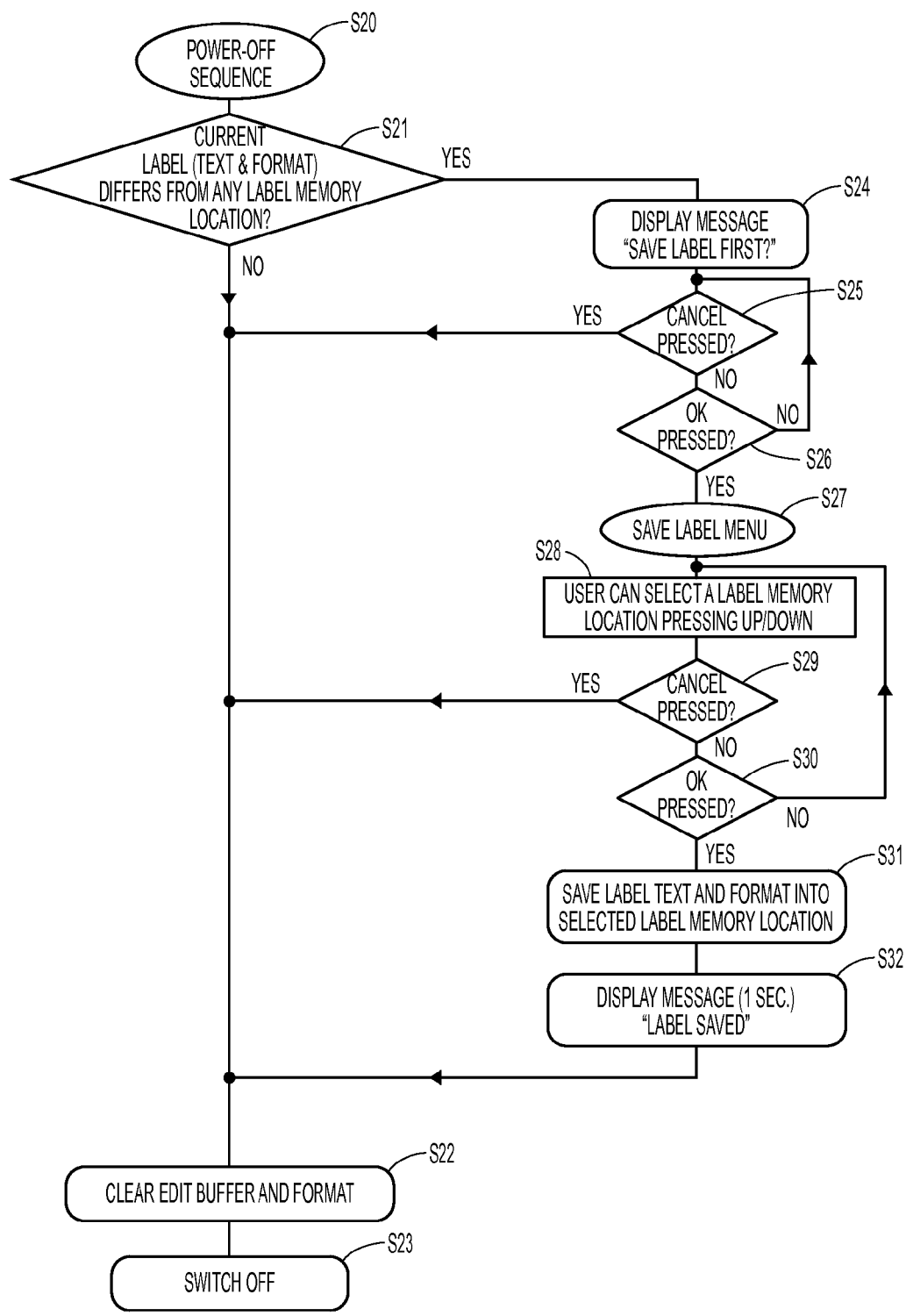
FIG. 19 shows a flow diagram illustrating a method of controlling a label printer according to an embodiment of the present invention.

Alternatively, if it is determined in the comparison process that the label data stored in the buffer differs from any label data stored in the non-volatile memory (step s21), then the controller 600 controls the display 610 to display the screen shown in FIG. 15 (step s24 of FIG. 19). The label printer therefore provides the user with a choice as the whether or not to save the label data stored in the buffer to a non-volatile label memory location before the buffer is cleared and the label printer is switched off.

The process of saving label data to a non-volatile label memory location, including selecting a desired label memory location and displaying a confirmation message to the user, is substantially as discussed above with reference to steps s2-s10 inclusive. Indeed, steps s24-s32 of FIG. 19 are identical to steps s2-s10 of FIG. 18. For conciseness, these steps will not be further described herein.

Embodiments of the present invention therefore provide a label printer which may provide a user with the opportunity for saving, to non-volatile memory, label data defining the appearance of a label stored in a volatile buffer before any or all of the following processes: switching off the label printer, beginning creation of a new label, and retrieving to the buffer label data defining the appearance of a label that is stored in a non-volatile memory.

Further features of some embodiments of the present invention will now be described with reference to FIGS. 20a, 20b and 20c.

Figure 20A:
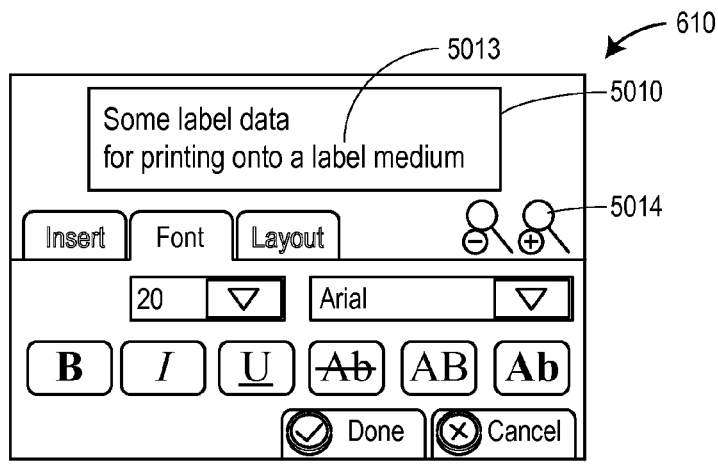
FIGS. 20a-20c show further displays of a label printer that embodies the present invention.

FIG. 20a shows the screen the controller 600 controls the display 610 to display when the user of the label printer is creating a label including the text "Some label data for printing onto a label medium". The process of creating a label for printing is discussed in more detail above, and so is not further described herein for conciseness.

The label printer includes memory means for storing label data which defines content for printing onto the resultant label. As discussed above, this memory may comprise one or both or the volatile memory 604 and the non-volatile memory 602, or further memory external to the label printer. In FIG. 20a, the controller 600 is controlling the display 601 to display an image 5010 representative of a label medium onto which content is to be printed, and an image 5013 of the content (i.e. in this case the text) to be printed onto the label medium.

Figure 30:
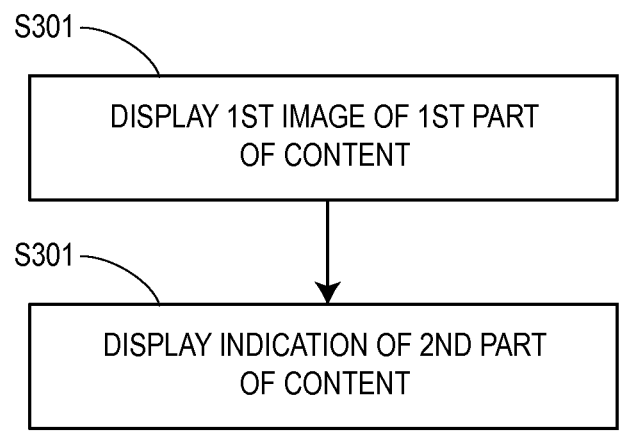
FIG. 30 shows a flow diagram illustrating a further method of controlling a label printer according to an embodiment of the present invention.

The user is provided with the facility to "zoom in" to the image representative of the label to be printed, such that the use can more clearly view the content. In the present invention, by selecting the positive magnifying glass symbol 5014, the controller 600 receives a signal representative of an instruction by the user to zoom in to the image representative of the content 5010. As a result, the controller 600 controls the display 610 to display the screen shown in FIG. 20b, in which only an image 5013a representative of a first part of the content is shown and enlarged with respect to the rest of the display, and a second part of the total content is omitted on the right hand side of the display 610 (step s301 in FIG. 30). Because the second part of the content is omitted from the display 610 after the step of magnification, further space is available on the display 610 for the controller 600 to control the display 610 to display the image 5013a representative of the first part of the content in a magnified or enlarged state.

In order to notify the user that the total content includes a further second part of the content, an indication 5020 (in this case in the form of an arrow) is displayed at a display position on the display 610 (step s302 in FIG. 30) concurrently with the image 5013a representative of the first part of the content. The indication 5020 comprises an indication that the content comprises a second part of the content, and also indicates the position on a resultant printed label of the second part of the content with respect to the first part of the content. In other words, in this embodiment the indication 5020 notifies the user that the further second part of the content will be printed onto the label to the right hand side of the first part of the content.

In this particular embodiment, the indication itself is displayed on the display 610 at a display position which corresponds to said position on the label of the second part relative to the first part. In other words, the indication is displayed to the right hand side of the image 5013a representative of the first part of the content. In alternative embodiments, the indication 5020 may be displayed elsewhere on the display 610.

If the user wishes to zoom in further to the image representative of the label to be printed, then the user can again select the positive magnifying glass region 5014. This causes a signal representative of an instruction to zoom into the image to be sent to the controller 600, which causes the controller 600 to control the display 610 to display the screen shown in FIG. 20c.

Figure 20B:
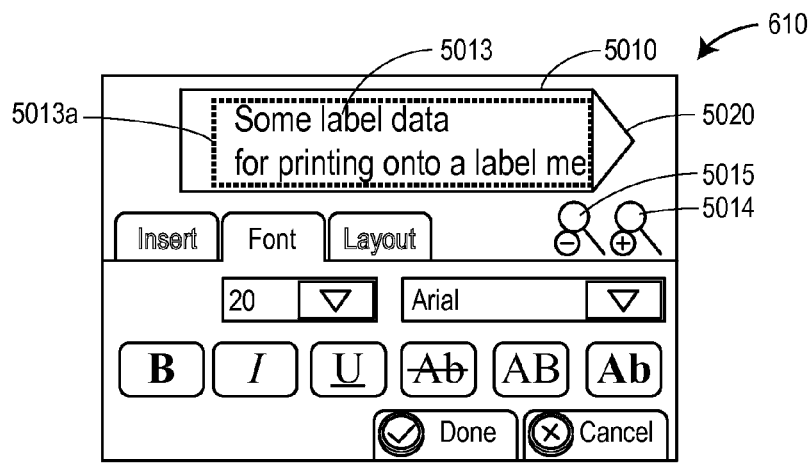
Figure 20C:
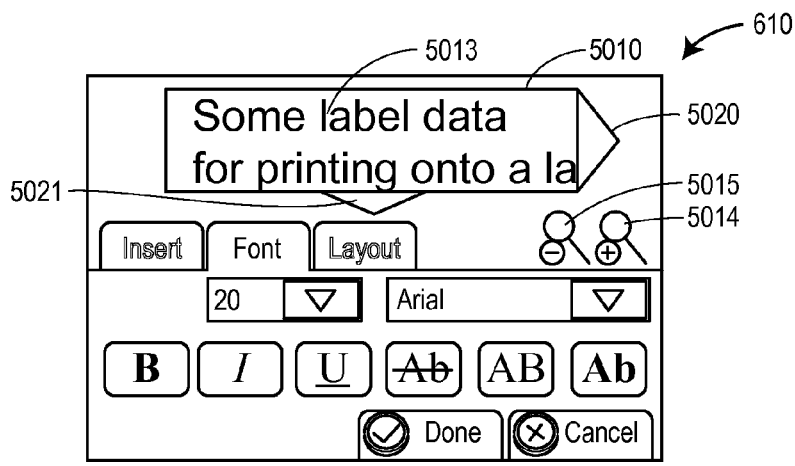

As can be seen in FIG. 20c, the display 610 now displays an image representative of a smaller part of the total content to be printed. Because images representative of more of the content are omitted from the display 610, more space is available for displaying the smaller part of the total content. Therefore, the smaller part of the total content can be displayed in a further enlarged format. The indication 5020 discussed above is again displayed on the display 610, to indicate that the total content includes further content that would be printed to the right of the displayed smaller part of the content. The controller 600 further controls the display 610 to display a second indication 5021 that indicates that the total content includes still further content that would be printed onto the label at a position below the smaller part of the total content. In this embodiment, the second indication 5021 is displayed at a display position relative to the image representative of the smaller part of the content to be printed, which display position corresponds to the position on the resultant label of the still further content relative to the smaller part of the total content. Thus, the second indication 5021 is displayed beneath the image representative of the smaller part of the total content to be printed, to indicate that still further content will be printed onto the label beneath the displayed smaller part of the total content.

When the user views the screen shown in FIG. 20c, if the user chooses to select the negative magnifying glass region 5015, the controller 600 receives an instruction representative of the user's selection to zoom out of the label. The controller 600 therefore controls the display 610 to display the screen shown in FIG. 20b, in which a larger proportion of the total content for printing onto the label is displayed on the display 610. Similarly, if the user selects the negative magnifying glass region 5015 displayed on FIG. 20b, the controller 600 causes the display 610 to display the screen shown in FIG. 20a, in which the whole of the label to be printed (and its content) is displayed on the display 610.

Thus, embodiments of the present invention enable a user to enlarge a portion of an image representative of a label to allow them to inspect in closer detail the content to be printed. Embodiments of the present invention also provide the user with an indication that the resultant printed label will include content printed onto the label at a certain position relative to the displayed portion of the total content. Thus, the user is provided with a clearer indication of where the portion of the total content displayed on the display will be printed on the resultant label in relation to the total content to be printed onto the label. The user can therefore better appreciate how the resultant label will appear.

Further features of some embodiments of the present invention will now be discussed with reference to FIGS. 21a and 21b.

As discussed above with reference to FIG. 8b, by selecting button 1122 included in the graphical control panel 1112, the user is able to create a vertical label in which a text string extends along the longitudinal length of the label, but individual characters of the string are printed such that they each extend from their leading side (or edge or end) to their tail (or trailing) side (or edge or end) across the width of the tape. Thus, the characters are viewable the correct way up when the user holds the tape such that its longitudinal direction extends vertically and its width direction extends in a horizontal direction.

Figure 21A:
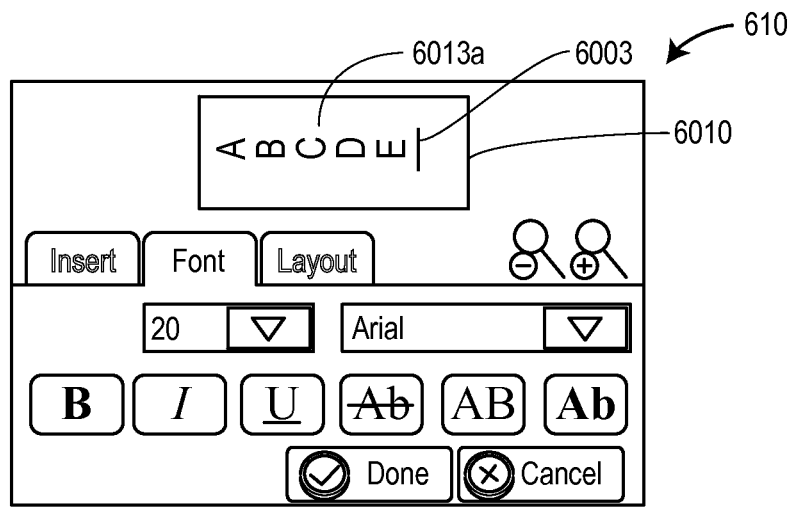
FIGS. 21a and 21b show displays of a further label printer that is an embodiment of the present invention.
Figure 21B:
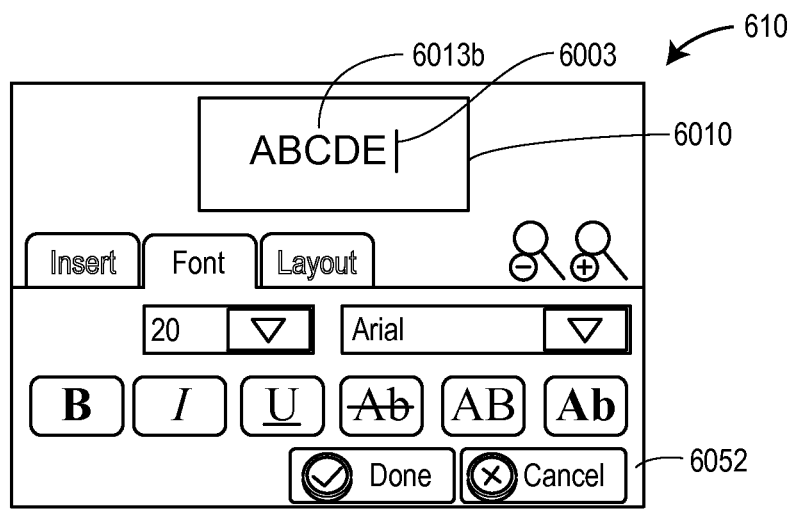

With reference to FIG. 21a, the user has entered the plural characters "A" "B" "C" "D" "E" to form a character string for printing onto a label medium. The user has also selected the button 1122 shown in FIG. 8b in order to rotate each of the plural characters of the character string through 90 degrees with respect to the image 1010 representative of the label medium of the label to be printed. The user has then pressed the font tab/header 1006 shown in FIG. 8b, in order to arrive at the screen showed on the display 610 in FIG. 21a.

FIG. 21a shows the screen which is displayed on the display 610 when the controller 600 is operating in a display mode. When operating in this mode, the controller 600 sends a signal to the display controller to cause the display 610 to display the plural characters of the character string 6013a in a display format (step s311 in FIG. 31). When operating in this display mode, the controller 600 also causes the display 610 to display an image 6010 representative of the label medium onto which the plural characters of the character string 6013a are to be printed.

The plural characters of the character string 6013a are displayed on the display 610 in an orientation relative to the image 6010 representative of the label medium corresponds to the arrangement that the plural characters will take when printed onto the label medium in real life. In other words, when printed, the character string will extend along the longitudinal direction of the label or tape, and individual ones of the plural characters of the character string will be most easily readable when the user holds the tape such that its longitudinal direction extends vertically and its width extends in a horizontal direction. In other words, each of the characters is printed such that they extend from their leading side to their trailing side across the width of the tape. In FIG. 21a, the controller 600 is controlling the display 610 to display the plural characters in a corresponding display orientation relative to the screen 610, with the plural characters being displayed along a path extending horizontally across the screen 610, with each of the characters displayed such that they extend from their leading side to their tail trailing side in a direction parallel to a height direction of the display 610. Also shown on the display 610 in FIG. 21a is a cursor 6003 located at the right-hand end of the character string 6013a.

In this particular embodiment, the display 610 forms part of a touchscreen 612 comprising the display 610 and a touch panel 608, as discussed above. When the user wishes to edit the character string, such as to delete or add characters to the character string, the user touches a part of the touch panel 608 overlying the character string 6013a. This causes the touch screen 612 to send a signal to the controller 600, which signal is representative of the selection by the user to edit the character string (step s312 in FIG. 31). The controller 600 then switches to operate in an edit mode, and the controller 600 sends a signal to the display 610 to cause the display 610 to display the plural characters in a character string 6013b in an edit format (step s313 in FIG. 31), as shown in FIG. 21b.

In the edit format, the plural characters of the character string 6013b are displayed along the same path as the character string 6013a in FIG. 21a, with each character of the plural characters rotated through 90 degrees relative to a respective corresponding character of the character string 6013a arranged in the display orientation of FIG. 21a. In other words, in this embodiment, each of the characters forming the character string 6013b shown in FIG. 21 is located at a point along the path which is the same as the point along a path at a respective corresponding character is located in the character string 6013a displayed in the display format of FIG. 21a, but each of the characters is displayed such that they extend from their leading side (or edge or end) to their tail (or trailing) side (or edge or end) in a direction parallel to a width direction of the display 610 and parallel to the path.

In addition to the character string 6013b, when the controller 600 is operating in the edit mode, the controller 600 sends a signal to the display 610 to cause the display 610 to display information associated with editable characteristics of the characters of the character string 6013b. Thus, in this embodiment, a font graphical control panel 6052. This font graphical control panel 6052 is substantially the same as the font graphical control panel 1052 shown in FIG. 7a, and thus will not be described in any further detail here, other than to say that the user may select various ones of the buttons comprised in the font graphical control panel 6052 in order to change various characteristics of the plural characters making up the character string 6013b.

Figure 31:
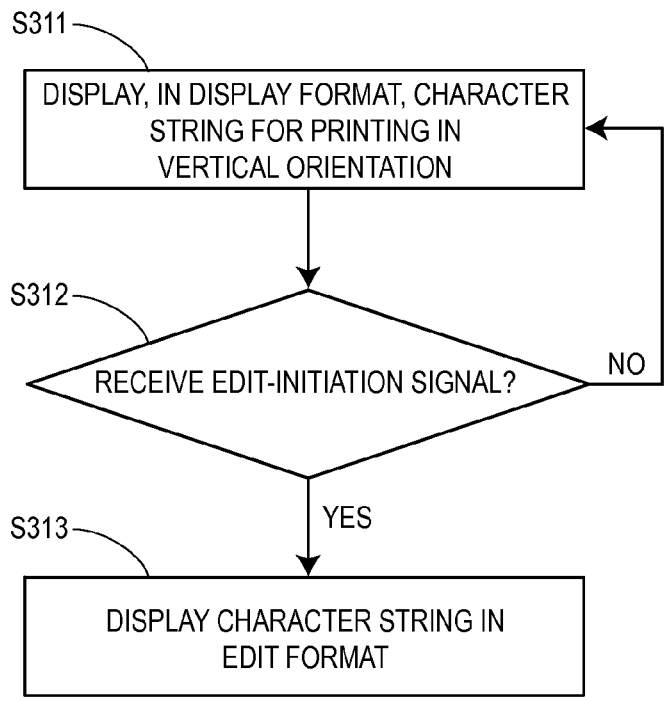
FIG. 31 shows a flow diagram illustrating a further method of controlling a label printer according to an embodiment of the present invention.

When the controller 600 is operating in the edit mode, the plural characters making up the character string 6013b are displayed in the edit format, in which the plural characters are displayed in an upright orientation (step s313 in FIG. 31). This is in contrast to the orientation of the characters making up the character string 6013a orientated in the display format shown in FIG. 21a, in which the plural characters are displayed on their sides when the user views the display 610 in a normal manner (step s311 in FIG. 31).

This feature of the present invention therefore provides the advantage that, when a user wishes to edit character(s) making up a character string for printing in a vertical orientation, the character(s) making up the character string are rotated such as to be more easily read by the user. This makes editing and reading the resultant character string much easier for the user.

When the character string is shown in the edit format, the curser 6003 indicates a position at which a new character may be added to the character string by the user operating letter selection keys provided in input means of the label printer. These input means may comprise either a portion of the touch panel 608, or hardware keys of the label printer. The cursor 6003 also provides an indication of which of the existing characters of the character string 6013b would be deleted, should the user operate a "delete" key. In the present case illustrated in FIG. 21b, the user's operation of the delete key would delete the character "E" shown in FIG. 21b, as is well known in the art.

In this present embodiment, the display 610 is part of a touch screen 612. In alternative embodiments, the display 610 may not form part of a touch screen 612. In such an alternative embodiment, the label printer includes input means in the form of hardware keys and/or input device (such as a mouse, or mouse pad, or tracker ball) in order to make the selection of the character string 6013a shown in FIG. 21a in order to edit the character string.

Further features of some embodiments of the present invention will now be discussed with reference to FIGS. 22a-22l.

In some embodiments of the present invention, the controller 600 of the label printer is operable selectively in one of a plurality of modes of operation. Two of these modes are a normal mode of operation and a user-defined mode of operation, respectively.

In the normal mode of operation, commands entered by a user via input means of the label printer (such as a touch panel 608 of a touch screen 612, or hardware input keys, or a mouse or other input device) are used by the controller 600 in accordance with general printer configuration settings stored in the non-volatile memory 602 to define a label to be printed. These general printer configuration settings define a general method by which the commands entered by a user are used to define the label. The general printer configuration settings may be predetermined settings which are set at the factory before the label printer is dispatched to a customer for use. Alternatively, the general printer configuration settings may be configured by a user with administrator rights for configuring the general settings, which administrator rights other users of the label printer do not hold. In any case, the general printer configuration settings are to be considered the default printer configuration settings used by the controller 600 to define a label to be printed in accordance with command input by a user, rather than settings defining default formats of label data to be added to a label.

In the user-defined mode of operation, commands entered by a user via the input means are used by the controller 600 in accordance with user-defined printer configuration settings stored in the non-volatile memory 602 or in the volatile memory 604 to define a label to be printed. The user-defined printer configuration settings define a user-defined method by which the commands entered by a user are used to define a label to be printed, rather than settings defining default formats of label data to be added to a label.

User-defined printer configuration settings (and/or the general printer configuration settings) in some embodiments comprise a setting which dictates whether metric or imperial units are used in information (such as label dimension information) or messages displayed on the display 610 of the label printer. Additionally or alternatively, the printer configuration settings can include a setting which dictates which language the label printer operates in, in other words which language information or messages displayed on the display 610 are presented in. Additionally or alternatively, the printer configuration settings may comprise a setting which dictates whether or not an "auto complete" function is activated. When the auto complete function is activated, an element of the label printer, such as the controller 600, is able to predict a word or phrase that a user wants to type in, without the user having to type in the full word or phrase. For example, the auto complete function may enable the label printer to add a full commonly-used word into label data to be printed, when the user has only entered part of that word. For example, when the user has entered the letters "fi" the controller 600 may then be arranged to "auto complete" the word being entered such that the display 610 displays the full word "file". An auto complete function can therefore speed up human/printer interactions to compile label data for inclusion in a label to be printed more quickly.

Figure 22A:
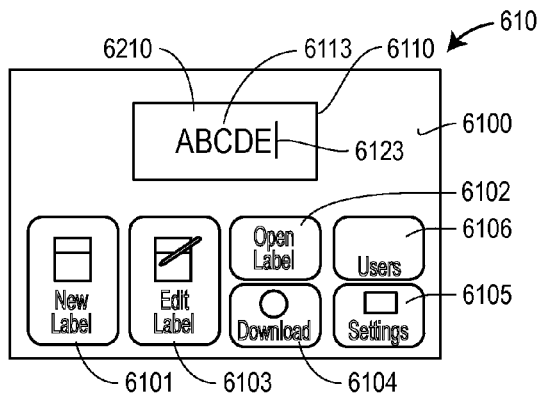

The normal and user-defined modes of operation will now be discussed in more detail. FIG. 22a illustrates what is shown on the display 610 when the user is presented with a homepage 6100. The user may be presented with this homepage 6100 when the label printer is first switched on, or when the user actuates a "home" button provided somewhere on the label printer. This "home" button may be a hardware key, or may be comprised in a portion of a touch panel 608 when the display 610 forms part of a touchscreen 612.

The homepage 6100 includes an image representative of a label stored in memory of the label printer, including an image 6110 representative of the label medium of the label and an image 6113 representative of the label data to be printed onto the label medium. The homepage 6100 includes a series of regions which, when selected by the user, present the user with different screens on the display 610.

By selecting the "new region" region 6101, the controller 600 is caused to begin an operation to allow the user to configure a new label to be printed. As discussed above, this operation may include prompting the user for an instruction as the whether they wish to save to memory data defining the label shown on the display 610 in the homepage 6100.

If the user instead selects the "open label" region 6102 shown in FIG. 22a, then the controller 600 is caused to being an open label process, such as that described above with reference to FIGS. 14, 15 and 18.

If the user alternatively selects the "edit label" region 6103 shown in FIG. 22a, then the controller 600 is caused to control the display 610 to display a label edit screen, similar to that shown in FIG. 5 discussed above.

If the user alternatively selects the "download" region 6104 shown in FIG. 22a, then the controller 600 is caused to attempt to initiate a connection with a personal computer for receiving information from the personal computer. This information may be information defining one or more labels, software update for updating the software running in the printer, or other information.

If the user alternatively selects the "settings" region 6105 shown in FIG. 22a, then the controller 600 is caused to display a settings menu on the display 610. Via the settings menu the user is able to configure some or all of the general printer configuration settings discussed above. In some embodiments, only users with sufficient administrator rights are able to adjust the general printer configuration settings. These general printer configuration settings are the default printer configuration settings to which the label printer adheres when using commands entered by a user to define a label to be printed.

Some users may find that they need to define one or more labels for printing in such a way that commands they enter into the label printer to define the label are used by the controller 600 in a different manner to the way the commands would be used by the controller 600 according to the general method dictated by the general printer configuration settings. In some cases, some users may find that they need to adjust a plurality of the printer configuration settings before they begin to defining a label to be printed. For example, some users of the label printer may not understand the English language and, if the general printer configuration settings include a setting dictating that the English language is to be used in information displayed on the display 610, then before defining a label to be printed that user would need to adjust that setting such that information displayed on the display 610 is presented to him or her in a language they can understand.

Some users may understand the imperial system of measurement more so than the metric system. If the general printer configuration settings dictate that, by default, the metric system is used in information displayed on the display, then that user may need to adjust the relevant setting such that displayed information adheres to the imperial system of measurement before then can begin defining a label to be printed.

It could be time-consuming for a user to adjust several of the general printer configuration settings before they begin to define a label to be printed. Therefore, some embodiments of the present invention allow the user to set and store alternative printer configuration settings, which herein will be termed "user-defined printer configuration settings".

In some embodiments, only one set of user-defined printer configuration settings may be configured and stored. In alternative embodiments, plural different sets of user-defined printer configuration settings can be configured by plural different users and stored by the controller 600 in the memory as plural different sets of user-defined printer configuration settings. After having configured and stored a set of user-defined setting, in the future a user can select to use the user-defined settings, rather than the general printer settings, and then from that point on the controller 600 adheres to the method defined by the user for using commands entered by the user in defining a label to be printed.

In FIG. 22a, a "users" region 6106 is included in the homepage 6100 on the display 610. The display of the word "Users" in the region 6106 is an indication that the controller 600 is currently operating in the normal mode of operation in which it adheres to the general printer configuration settings. By selecting this region 6106, the controller 600 receives an instructing signal which instructs the controller 600 to begin operating in a personalisation mode of operation. In this personalisation mode of operation, the user is able to configure user-defined printer configuration settings using input means (such as a touch panel 608 of a touch screen 612, hardware input keys of the label printer, or other input device), and to cause the user-defined printer configuration settings to be sent by the controller 600 to memory to be stored in the memory. Preferably this memory is non-volatile memory.

Figure 22B:
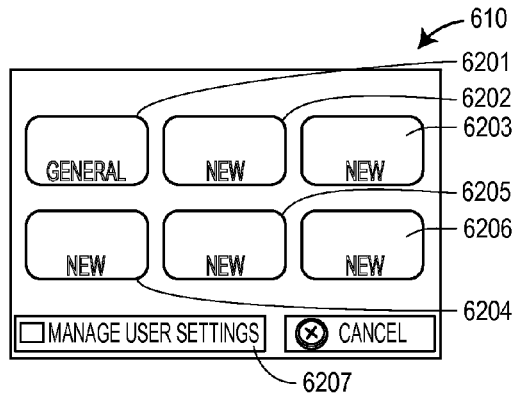

Receipt of the instructing signal at the controller 600 causes the controller 600 to control the display 610 to shown the screen shown in FIG. 22b. The screen shown in FIG. 22b includes a "general" region 6201 which, when selected by the user, causes the controller 600 to operate in the normal mode of operation and to cause the display 610 to show the screen shown in FIG. 22a.

Each of regions 6202-6206 shown in FIG. 22b is assignable to a respective set of user-defined printer configuration settings. In the scenario shown in FIG. 22b, none of these regions 6202-6206 has been assigned to a set of user-defined settings, and thus each of the regions is labelled with the word indication "New". Assignments of these regions with user-defined settings will be discussed in more detail below. However, in brief, once one of the regions 6202-6206 is assigned to a set of user-defined settings, then selection of that region causes the controller 600 to operate in the user-defined mode of operation in which commands entered by a user are used by the controller 600 in accordance with user-defined printer configuration settings configured by a user.

Figure 22C:
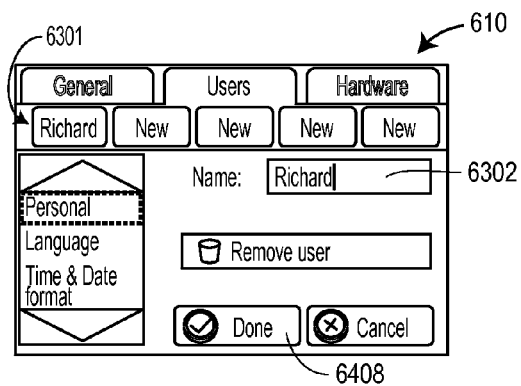

In the present case, since none of these regions 6202-6206 is assigned to a set of user-defined settings, the user instead selects the "manager user settings" region 6207 shown in FIG. 22b, which causes the controller 600 to display the screen shown in FIG. 22c on the display 610.

When presented with the screen shown in FIG. 22c, the user selects one of the icons in row 6301 towards the top of the screen. Each of these icons is associated with a region of memory reserved for the storage of a set of user-defined printer configurations settings. Having selected the top left icon, the user enters their name in the box 6302 shown in FIG. 22c. This name later becomes comprised in an indication as to the identity of the user that has configured user-defined printer configuration settings.

Figure 22D:
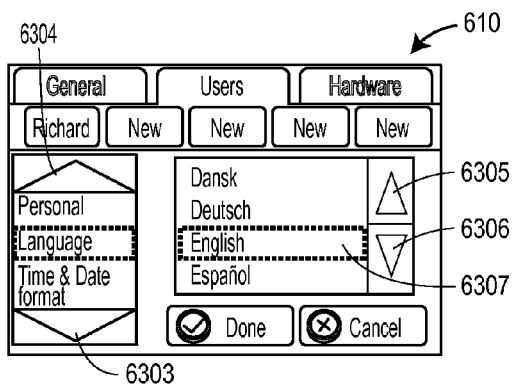

By selecting the "down arrow" 6303 shown in FIG. 22c, the controller 600 receives a signal to cause it to cause the display 610 to show the screen shown in FIG. 22d. When presented with the screen of FIG. 22d, the user can select up and down arrows 6305, 6306, respectively, to configure a setting that dictates which language is used in information displayed on the display 610, which information is not label data. Selection of the up and down scroll arrows 6305, 6306 causes the bar 6307 to highlight a different one of the languages in the list. The list illustrated in FIG. 22d is not exhaustive, and so repeated selecting of the down arrow 6306 would cause the list to scroll downwards and the bar 6307 to highlight different available languages. Whichever language is highlighted by the bar 6307 is determined to be the language which will be used in the information displayed on the display 610.

If the user wishes to return to the screen shown in FIG. 22c, then they may select the up scroll arrow 6304 to the left of the display 610. However, selection of the down arrow 6303 causes a signal to be sent to the controller 600 to cause the controller to cause the display 610 to display the screen shown in FIG. 22e. Via the interface or menu shown in FIG. 22e, the user is able to configure a label setting (rather than a printer configuration setting) which dictates the format in which temporal data fields for addition to a label adhere. By selecting dropdown arrow 6308, the user is presented with the screen shown in FIG. 22f which includes a list from which the user can select the format to which the temporal data fields will adhere. Selection from such a format of list is known in the art, and therefore will not be discussed any further. In a similar manner, by selecting the dropdown arrow 6309 shown in FIG. 22e, the user is able to dictate whether temporal data fields comprising a time are formatted according to the 24-hour clock or the 12-hour clock.

Figure 22E:
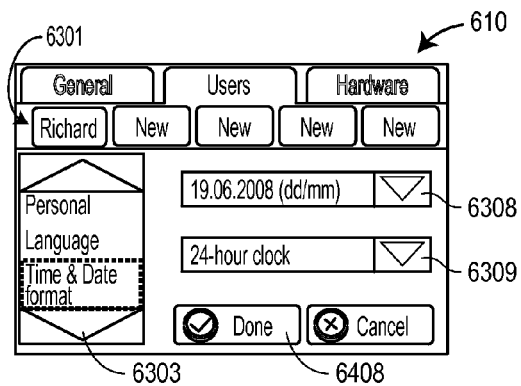
Figure 22F:
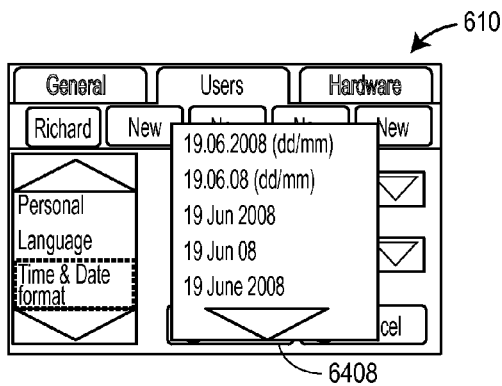

By selection of the down scroll arrow 6303 shown in FIG. 22e, the user is presented with the screen shown in FIG. 22g. Via the menu or interface shown in FIG. 22g, the user is able to configure a user-defined printer configuration setting which dictates whether metric or imperial units are to be employed in information displayed on the display 610, which information is not label data. The user selects the top radio 6401 to ensure that the metric units are used, and selects the lower radio 6402 to ensure that imperial units are used.

By selection of the down scroll arrow 6303, the user is presented with the screen shown in FIG. 22h. When the display 610 is caused by the controller 600 to display the screen shown in FIG. 22h, the controller 600 is operating in a mode of operation in which the user is able to configure label settings comprising settings relating to attributes of label data for printing onto a label medium. Thus, via the menu or interface shown in FIG. 22h, the user is able to configure label settings which dictate default attributes of label data for printing onto a label medium, such as whether the label data would, by default, be emboldened, italicised, underlined, struckthrough, or shaded (by selection of appropriate once of the buttons 6403), and to configure label settings which dictate the default size and font of label data to be added to a label being designed through use of the dropdown menus 6404, 6405, respectively.

It is to be noted that label settings are different from printer configuration settings. On the one hand, label settings comprise settings relating to at least one of attributes of a label medium on which label data is to be printed, and attributes of the label data for printing onto the label medium. In other words, the label settings relate to features of labels being designed themselves. In contrast, printer configuration settings are associated with the manner in which the controller 600 interprets commands input by the user to the label printer to define a label to be printed. Thus, the printer configuration settings relate to the way in which the label printer itself is configured, rather than the way that a way label medium or label data is configured.

By selection of the down scroll arrow 6303 shown in FIG. 22h, the controller 600 receives a signal which causes it to cause the display 610 to display the screen shown in FIG. 22i. Via this screen the user is able to configure a user-defined printer configuration setting which dictates whether or not an auto complete function is activated. By selecting the "on" radio 6406 the auto complete function is activated, and by selecting the "off" radio 6407 the auto complete function is deactivated. Selection by the user of the "done" button 6408 shown in any of FIGS. 22c-22i causes a signal to be sent to the controller 600 to cause the controller to cause the display 610 to display the homepage, as shown in FIG. 22*j*.

FIG. 22*j* is similar to FIG. 22*a*, but differs in that the region 6106 includes an indication that the user "Richard" is "logged in". In other words, the presentation of the name of the user in region 6106 is an indication of the identity of the user that has configured the user-defined printer configuration settings, in accordance with which the controller 600 will use commands entered by the user to define a label to be printed. When such an indication is provided in the region 6106, the controller 600 is operating in the user-defined mode of operation.

Following the same steps as discussed above with reference to FIGS. 22*b*-22*j*, a further user is able to define a set of user-defined printer configuration settings which are separate from the user-defined printer configuration settings configured by the first user, "Richard". For conciseness, these steps are not shown herein or discussed further.

Once two users have defined respective sets of user-defined printer configuration settings, then selection by a user of the region 6106 shown in FIG. 22*j* causes the screen shown in FIG. 22*k* to be displayed on the display 610. Selection by a user of the "general" region 6201 shown in FIG. 22*k* causes an instruction signal to be sent to the controller to instruct the controller 600 to operate in the normal mode of operation. Alternatively, selection by a user of the "Richard" region 6202 shown in FIG. 22*k* causes an instructing signal to be sent to the controller 600 to instruct the controller to operate in a user-defined mode of operation in which commands entered by a user are used by the controller 600 in accordance user-defined settings dictating a method defined by the user "Richard" to define a label to be printed. The controller 600 also causes the display 610 to show the screen shown in FIG. 22*j*, in which the region 6106 includes an indication that the user "Richard" is logged in.

Similarly, selection by a user of the "Frank" region 6203 shown in FIG. 22*k* causes the controller 600 to operate in a user-defined mode of operation in which commands entered by a user are used by the controller 600 in accordance with user-defined settings dictating a method defined by the user "Frank". The controller 600 is also caused to cause the display 610 to display the screen shown in FIG. 22*l*, in which the region 6106 includes an indication that the user "Frank" is logged in.

Thus, some embodiments of the present invention allow plural different sets of user-defined printer configuration settings to be configured by plural different users and stored in memory for future recollection. A first user is able to instruct the controller 600 to operate in a user-defined mode of operation in which entered commands are interpreted by the controller 600 in accordance with a method defined by that first user, or alternatively the first user can instruct the controller 600 to operate in a user-defined mode of operation in which entered commands are interpreted by the controller 600 in accordance with a method defined by a second different user. In some embodiments, a user may only instruct the controller 600 to operate either in a normal mode of operation or in a user-defined mode of operation in which commands entered by the user are interpreted by the controller 600 in accordance with user-defined printer configuration settings configured by that user.

Further features of some embodiments of the present invention will now be discussed with reference to FIG. 23*a*-23*f*.

Some embodiments of the present invention allow a user to define a set of plural labels by only designing one of the plural labels. In order to do this, the user makes use of an "auto field" function, which was discussed above with reference to FIGS. 6*b* and 6*c*. Some embodiments of the present invention allow a user to preview plural ones of the plural labels of the set of labels, before printing of one or more or all of the plural labels is performed.

Figure 23A:
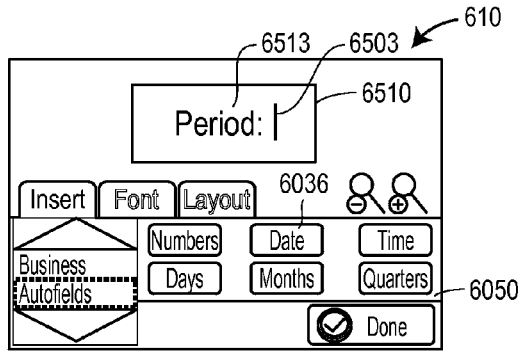
FIGS. 23a to 23f show displays of a further label printer that is an embodiment of the present invention.
Figure 23B:
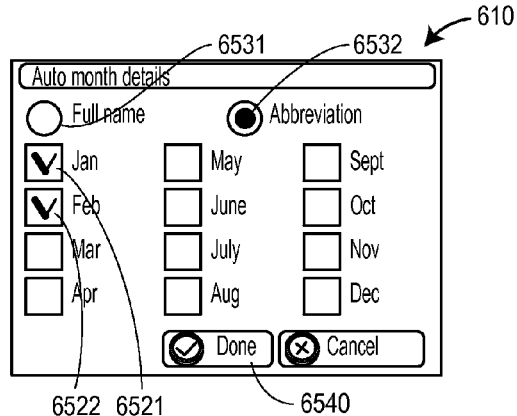

With reference to FIG. 23*a*, the controller 600 causes the display 610 to display an edit screen including an image 6510 representative of a label medium, and a cursor 6503 indicating a data input point. A user has used input means (such as hardware letter selection keys of the label printer, or respective portions of a touch panel 608 corresponding to respective letter selection keys) to enter the label data "Period:" 6513 shown on the display 610. The characters making up the label data 6513 are entered in order from left to right on the screen, and thus the cursor 6503 is shown at the right-hand end of the label data 6513.

In this scenario, the user wishes to create a set of two labels to be printed where the first label is to include label data "Period: Jan." and the second label is to include the label data "Period: Feb.". These labels may be, for example, to be adhered to the end of first and second respective lever-arch files, which include information relating to the respective periods of January and February. The user is able to define these two labels by only going through the steps necessary to create a single label on the display 610.

With the cursor 6503 in the position shown in FIG. 23*a*, the user selects the "Date" button 6036, which causes the controller 600 to receive a signal indicative of a selection of the "Date" button 6036 by the user. In response, the controller 600 causes the display 610 to display the screen shown in FIG. 23*b*.

The user wishes only to create labels for the two periods of January and February, and is currently not interested in creating labels for the months of the rest of the year. Therefore, the user only selects checkboxes 6521 and 6522 shown on the display 610 in FIG. 23*b*, and leaves the remainder of the checkboxes for the months March-December unchecked. The user also wishes for the labels only to include an abbreviation of the months of January and February, rather than the full name. Therefore, the user selects the right-hand radio 6532, rather than the left-hand radio 6531. Having carried out these steps, the user then selects the "Done" button 6540, which causes the controller 600 to receive a signal which causes the controller 600 to cause the display 610 to display the screen shown in FIG. 23*c*.

Figure 23C:
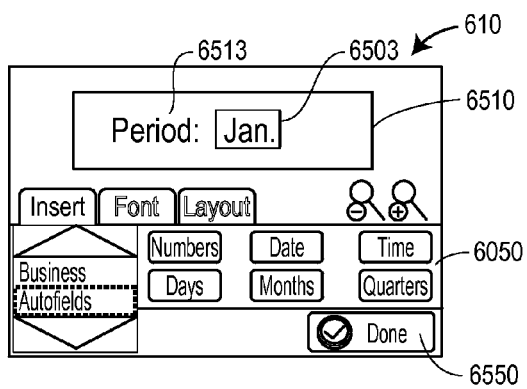

As can be seen in FIG. 23*c*, the label data 6513 displayed on the display 610 now includes the first of the two bits if label data defined by an auto field. Therefore, the label data 6513 includes text label data "Period:", which will be common label data to be included in each of the first and second labels, and an auto field populated by a value which is different in each of the plural labels.

The entry by the user of the label data intended to be label data which is common to each of the plural labels can be considered to comprise the steps of receiving at the controller 600, from the input means (which may be the hardware letter selection keys or portions of a touch panel), a signal representative of the common label data to be included in the first label of the set of plural labels to be printed. In response to receipt of this signal at the controller 600, the controller 600 is arranged to cause the common label data to be included in both the first label and the second label data of the set.

On the other hand, at least part of the operation by the user to define the auto field to be used can be considered to include the steps of sending from the input means, to the controller 600, a signal representative of a first value to be included in the first label. In response to receiving this signal at the controller 600, the controller 600 is arranged to determine a second value to be included in the second label. Evidence of this step of determining will be shown below.

Figure 23D:
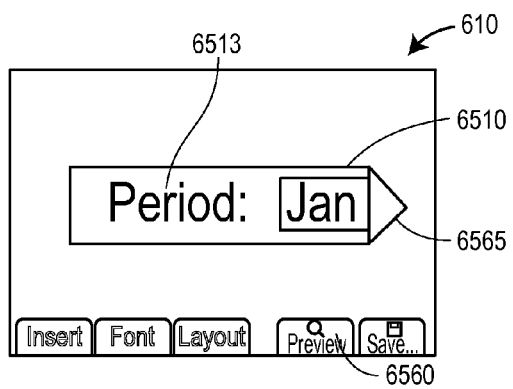

Once the user is happy with the layout and content of the labels to be printed, the user selects the "Done" button 6550 shown in FIG. 23c, which causes the controller 600 to cause the display 610 to show the screen shown in FIG. 23d. Effectively selection of the "Done" button 6450 has caused the auto field graphical control panel 6050 to become hidden from view, and for the image 6510 representative of the label medium and the image 6513 representative of the label data to be printed to become enlarged on the display 610.

Selection of the arrow 6565 shown in FIG. 23d by the user causes a different portion of the label to be printed to be displayed on the display 610. When the user is ready to print the set of plural labels, the user selects the "Preview" button 6560 shown in FIG. 23d, which may cause the controller 600 to cause the display 610 to display the screen shown in FIG. 23e.

Figure 23E:
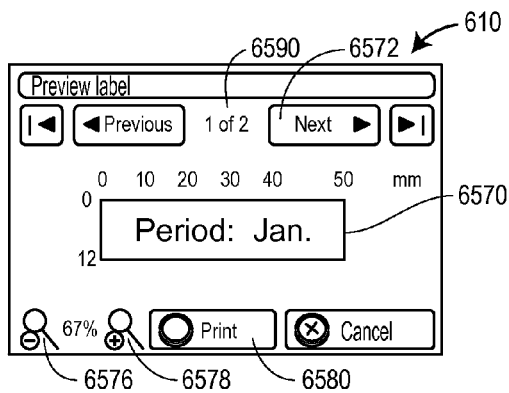
Figure 32:
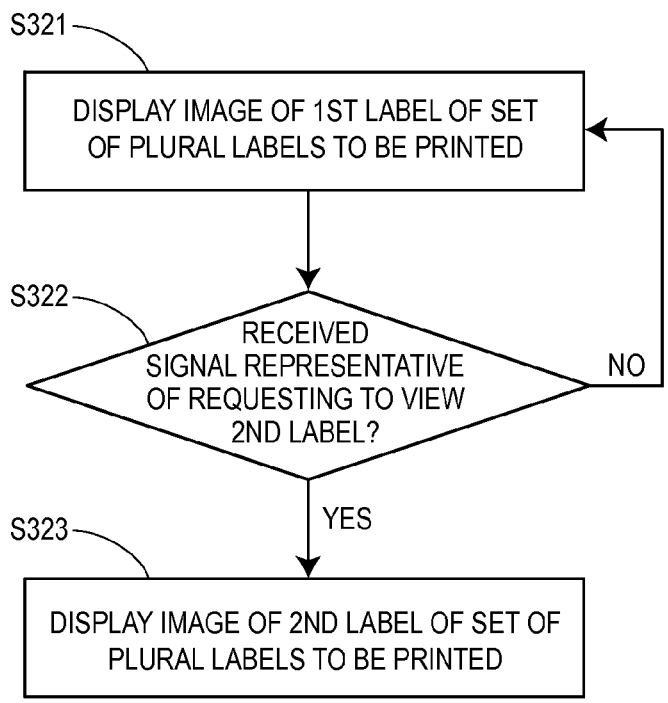
FIG. 32 shows a flow diagram illustrating a further method of controlling a label printer according to an embodiment of the present invention.

With reference to FIG. 23e, an image 6570 representative of the first label of the set of plural labels to be printed is displayed on the display 610 (step s321 in FIG. 32). By selecting the negative magnifying glass symbol 6576 the controller 600 receives a magnification instructions which causes the controller 600 to cause the display 610 to display a revised image 6570 representative of the first label, in which revised image the first label is reduced in size on the screen. Similarly, by selecting the positive magnifying glass symbol 6578, the controller 600 receives a magnification instruction which causes the controller 600 to cause a display 610 to display a revised image representative of the first label, in which revised image the first label is enlarged in comparison to that shown in FIG. 23e.

At the top of the screen displayed by the display 610 is an indication 6590 of which label of the set of plural labels is currently displayed on the display 610. In this case, the indication indicates that the first of the two labels is currently displayed. By selecting the "Next" button 6572, the controller 600 receives from the input means a signal representative of an operation of the input means by the user to view the next label of the set of plural labels to be printed (step s322 in FIG. 32). In response, the controller 600 sends a signal to the display 610 to cause the display 610 to display the screen shown in 23f, in which the image 6570 representative of the first label is replaced by an image 6582 representative of the second label (step s323 in FIG. 32).

Figure 23F:
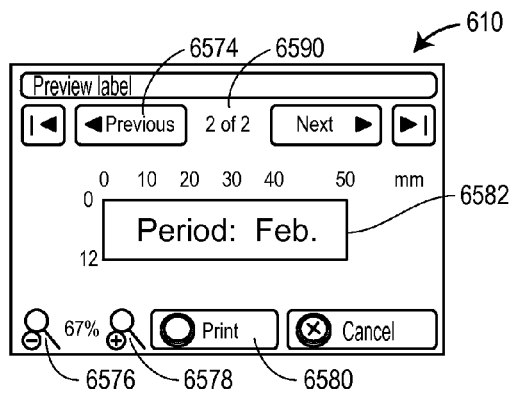

In FIG. 23f, the indication 6590 now provides an indication that the label currently displayed is the second of the two plural labels of the set of labels. In order to view the previous (first) label of the set of labels, the user selects the "previous" button 6574 which causes the controller 600 to cause the display 610 to display the screen shown in FIG. 23e again. The image 6582 representative of the second label can be enlarged and decreased in size again by selection of the positive and negative magnifying glass symbols 6578, 6576, respectively, as discussed above.

Figure 33:
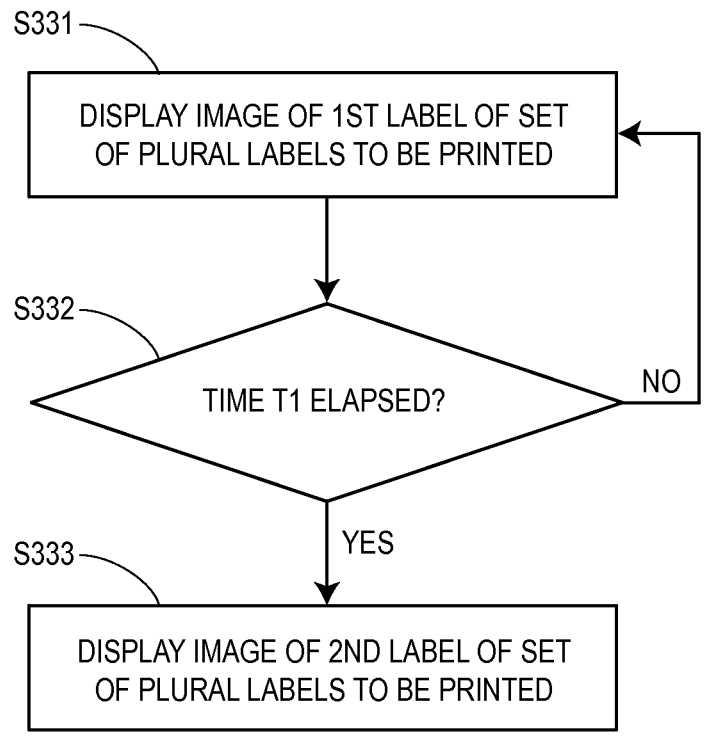
FIG. 33 shows a flow diagram illustrating a further method of controlling a label printer according to an embodiment of the present invention.
Figure 34:
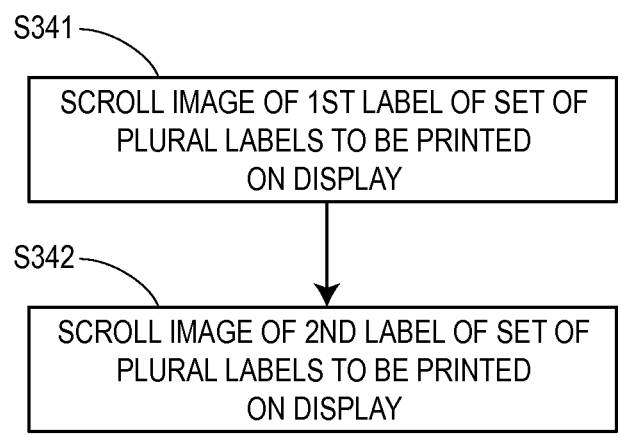
FIG. 34 shows a flow diagram illustrating a further method of controlling a label printer according to an embodiment of the present invention.

In other embodiments, the user does not need to select either of buttons 6572, 6574 to view different labels in the set from the label currently displayed. In some embodiments, after a period of time "t1" has elapsed (step s332 in FIG. 33) (during which period a first label of the set is displayed (step s331 in FIG. 33)), the controller 600 causes the display 610 to display a second label of the set (step s333 in FIG. 33). In other embodiments, the first and second labels of the set (and indeed all labels of a set when the set comprises more than two labels) may be scrolled along a path across the display 610, which path may be in a horizontal or a vertical direction on the display 610 or a path in a different direction (steps s341 and s342 in FIG. 34).

When the user is happy with the format and content of the multiple labels, they select the "Print" button 6580 shown on the display 610 when either of the first and second labels is displayed, and a print operation is initiated for printing the set of labels in one print operation (i.e. wherein only one print instruction is required to cause the set of labels to be printed). In other embodiments, the set of labels is not printed in one print operation.

Further features of some embodiments of the present invention will now be discussed with reference to FIGS. 22a and 24.

The homepage shown in FIG. 22a has been discussed above. The homepage displayed is a first page including a link ("edit label" region 6103) to a second page in which the user is able to edit the label represented by the combination of images 6110 and 6113 in FIG. 22a (step s351 in FIG. 35). The image 6110 is an image representative of a label medium, and the image 6113 in an image representative of label data for printing onto the label medium. This combination of images can be considered an image 6210 representative of a label stored in memory of the label printer.

Figure 35:
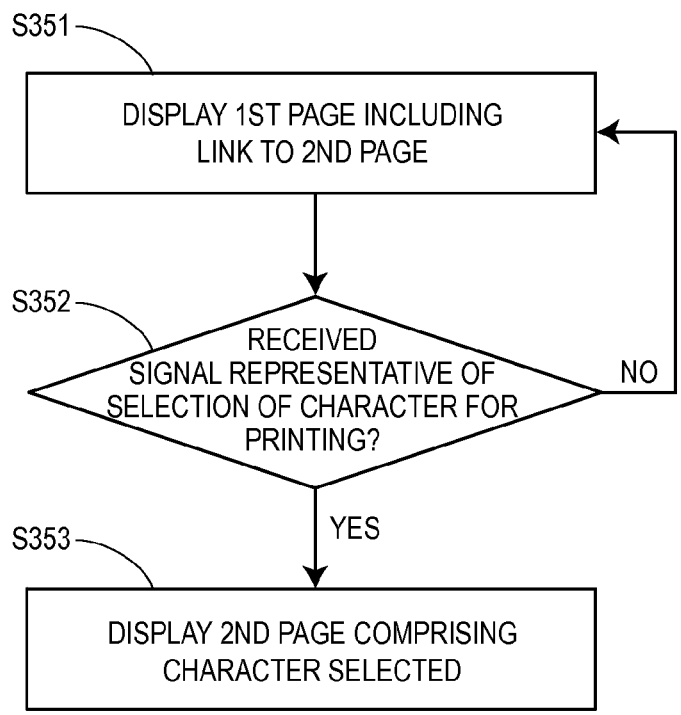
FIG. 35 shows a flow diagram illustrating a further method of controlling a label printer according to an embodiment of the present invention.

As discussed above, the homepage 6100 may be displayed at various times, such as when the user hits a dedicated "home" key (which may be a hardware key or a portion of a touch panel of a touch screen display) (step s351 in FIG. 35), or when (or shortly after) the label printer is switched on (step s351 in FIG. 35).

In some embodiments, input means operable by the user to perform selection operations comprise one or more portions of a touch panel of a touch screen display, and the input means are operable to cause a signal to be sent to the controller 600 by the user touching an appropriate portion of the touch panel. In other embodiments, the input means may comprise a series of hardware keys that are actuatable by a user to perform selection operations.

Regardless of their embodiment, the input means may be operated by a user to select a character for printing onto a label medium. In response to receiving at the controller 600 a signal representative of such an operation of the input means by the user (step s352 in FIG. 35), the controller 600 is arranged to send a signal to means for controlling the display 610 to cause the display 610 to display the second page (step s353 in FIG. 35). The second page comprises the character selected for printing, as shown in FIG. 24.

By way of example, it is considered that the user has operated the input means to select a letter "F". The edit page 6600 includes (at a position in an image 6210 representative of the label stored in the storage means and displayed on the homepage) the character 6220 selected. In this embodiment, the character 6220 has been added to the end of the character string forming the label data 6113 to be printed onto the label. In alternative embodiments, the character selected may be added to the character string at a different place in the character string.

Figure 24:
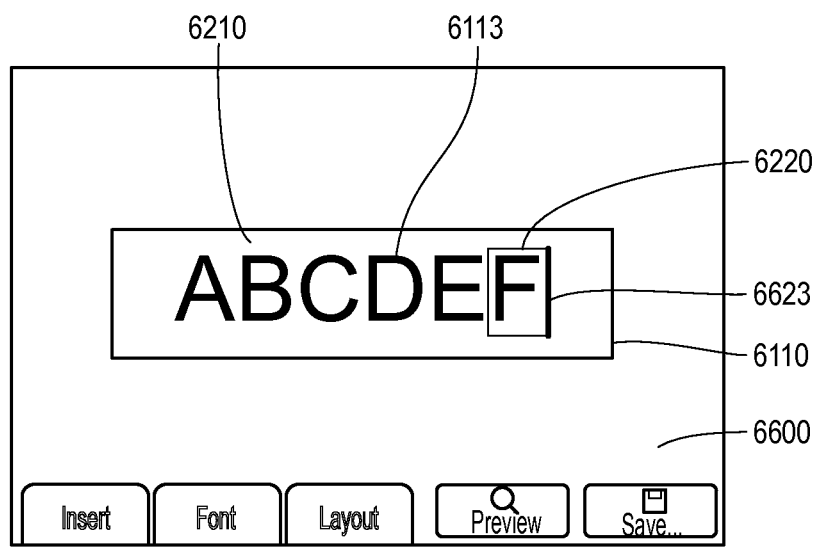
FIG. 24 shows a display of a further label printer that is an embodiment of the present invention.

In some embodiments, such as that illustrated in FIGS. 22a and 24, the homepage 6100 includes a cursor 6123 at a position in the image 6210 representative of the label stored in the storage means. In some embodiments, no such cursor is displayed. When a cursor is displayed, the position of the character selected 6220 included in the image 6210 representative of the label stored in the storage means (shown in the edit page 6600) is the same as the position of the cursor 6123 in the image 6210 representative of the label stored in the storage means and displayed in the homepage 6100. Thus, the user is provided, by way of the cursor 6123, with an indication as to where a selected character would be added or inserted to a character string, when they operate an appropriate input key to select the character.

Although the user would be able to edit the label 6210 displayed in the homepage by way of selecting the "edit label" region 6103 of the homepage 6100 shown in FIG. 22*a*, embodiments of the present invention provide a quicker method of editing a label to be printed. If the user selected the "edit label" region 6103, then they would be presented with a second page 6600 similar to that shown in FIG. 24*a*, except without the additional selected character 6220 being added to the character string. However, by merely selecting a character (step s352 in FIG. 35), the user is presented with the edit page 6600 shown in FIG. 24*a* in which the selected character 6220 is added to the character string (step s353 in FIG. 35). Thus, the user is able to add a character to a label to be printed without necessarily having to select the "edit label" region 6103.

While the embodiment discussed relates to editing a label that already includes some label data, in other embodiments selection of the character selection key causes a new label to be created whereby a character is added to an image representative of a label medium that, beforehand, included no label data.

Further features of some embodiments of the present invention will now be discussed with reference to FIGS. 6*a*, 6*b*, 7, 8*a*-8*c*, 13, 20*a*-20*c*, and 21*a*-21*b*.

Figure 36:
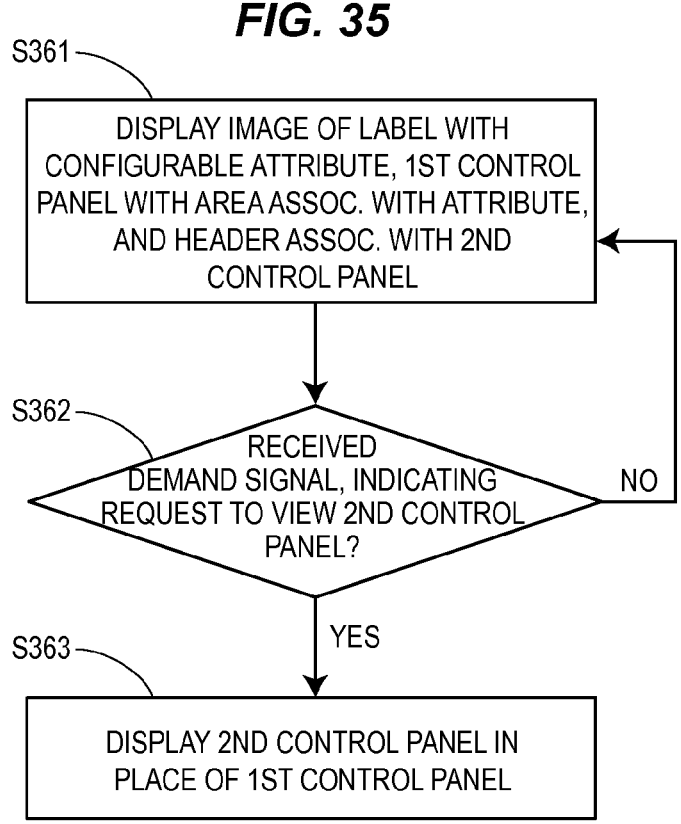
FIG. 36 shows a flow diagram illustrating a further method of controlling a label printer according to an embodiment of the present invention.

With reference to these figures, it will be noted that some embodiments of the present invention have a controller 600 which is arranged to cause the display 610 to display an image representative of a label (such as a label to be printed) with at least one configurable attribute (step s361 in FIG. 36). For example, in FIG. 6*a*, the arrangement of the barcode included in the image representative of the label can be considered an attribute which can be configured (i.e. the barcode can be placed at a different position on the label). The image 1010 representative of the label in FIG. 6*b* comprises an image representative of a label medium, and the label medium has a certain length (an attribute) which is configurable. In FIG. 7, the image 1010 is representative of a label including label data with a font attribute set such that the data is given the type face "Times New Roman". This attribute may be changed to give the data a different type face. In FIG. 8*a*, the image 1010 is representative of a label without a border. The attribute of whether or not a label has a border is configurable, i.e. it can be set to a value resulting in there being no border or a value resulting in there being a border.

Other characteristics of a label which could be considered a configurable attribute include font characteristics such as type face, font size, font style; label characteristics such a label background colour, label width, label length, and whether the label includes a border; layout attributes such as alignment of label data in horizontal and/or vertical directions relative to the label medium forming the label; and label data characteristics such as type of label data (e.g. text, barcode, symbol, picture).

The controller 600 of these embodiments of the present invention includes access to memory. This memory can either be on-board the label printer, or accessible by the controller 600 via an interface. The memory stores a plurality of different graphical control panels, as discussed above, which include regions or buttons selectable by a user to alter one or more of these configurable attributes. However, the controller 600 of some embodiments of the present invention cause the display 610 to only display one first graphical control panel selected from the plurality of different graphical control panels stored in the memory (step s361 in FIG. 36). This first graphical control panel can be considered to include a first input area which is associated with the configurable attributes.

When a user selects the first input area, the controller 600 receives an attribute-setting signal representative of an instruction by the user to alter the configurable attribute. In response, the controller 600 causes the display 610 to display a modified image representative of the label, in which modified image the configurable attribute is shown in a different state, in dependence on the attribute-setting signal received at the controller 600. Therefore, for example, the user may select an input area associated with emboldening some text included on the label. The modified image representative of the label will then include the text in its second state, i.e. emboldened. Of course, emboldening is only one configurable attribute which can be in first or second states. The process is similar for adjusting each of the configurable attributes listed above.

The first graphical control panel comprises only a limited number (sometimes only one) input area associated with a configurable attribute. In order to adjust other configurable attributes of the label, the user is able to select one of the displayed (step s361 in FIG. 36) headers (labelled as 1004, 1006, and 1008 in most of these figures) and/or regions (labelled as 1084, 1086, and 1088 in several of the figures) in order to cause the controller 600 to demand that the display 610 displays a different one of the plurality of graphical control panels in the place of the first graphical control panel (step s362 in FIG. 36).

One of these displayed headers or regions can be considered a second input area associated with a second graphical control panel of the plurality of control panels (step s361 in FIG. 36), and when the user selects the second input area, a demand signal is received at the controller 600, which demand signal is representative of an instruction by the user to demand that the second graphical control panel be displayed in place of the first graphical control panel (step s362 in FIG. 36). The controller 600 processes this demand signal, and causes the display 610 to display the second graphical control panel in place of the first graphical control panel (step s363 in FIG. 36). With the second graphical control panels displayed on the display 610 the user is then able to modify different configurable attribute(s) of the label represented by the image shown on the display.

Therefore, some embodiments of the present invention, which may include displays with a relatively small area (such as equal to or less than 50 cm$^2$), make optimum use of the available space on the display 610 by limiting the amount of information displayed. By ensuring that only one graphical control panel of a plurality of graphical control panels is displayed on the display at once, both the image representative of the label and the graphical control panel can be displayed larger than if more than one graphical control panel was displayed. Therefore, the user is able to more clearly read and comprehend what is shown on the display, thus facilitating their creation of a label.

In some embodiments, only one image representative of a label is displayed on the display 610 at a time, as shown in FIGS. 6*a*, 6*b*, 7, 8*a*-8*c*, 13, 20*a*-20*c*, and 21*a*-21*b*. Thus, the image representative of the label and the single displayed graphical control panel can be displayed larger than if more than one image and more than one graphical control panel was displayed.

In some embodiments of the present invention, the controller 600 is configured to control the display 610 to display only the single image representative of a label and the first graphical control panel and the second input area associated with a second graphical control panel on the display (step s361 in FIG. 36). In other words, no other information is displayed on the display. In other embodiments, some limited additional information may also be displayed, such as arrow indications 5020, 5021 discussed above, and/or means for hiding the first graphical control panel, such that the display does not include an image representative of one of the plurality of graphical control panels and/or such as means for magnifying the image representative of the label.

For example, with reference to FIGS. 20a and 20b (discussed above), a positive magnifying glass symbol 5014 and a negative magnifying glass region 5015 are displayed underneath the image representative of the label and above the graphical control panel. Use of these regions 5014, 5015 has been discussed in detail above, and thus further discussion will not be included here. Of course, in other embodiments, these regions 5014, 5015 may be displayed at another position on the display 610, and in some embodiments may be replaced by equivalent hardware key(s).

Herein several references are made to a user "selecting" a desired area, part or region of a display or a button or similar shown on a display. When the display is comprised in a touchscreen (see FIG. 3), this selecting comprises the user touching the touch panel of the touchscreen at a location overlying the area, part, region or button or similar shown on the display of the touchscreen that it is desired to select. When the display is not comprised in a touchscreen, the selecting may comprise the user operating an input device (such as a mouse or a hardware key) to position a cursor over the area, part, region or button or similar that it is desired to select, and then operating a selector of the input device (such as a button on a mouse).

It is advantageous for the label printer of the present invention to be portable and/or capable of being held in the hand of an operative, i.e. to be handheld. The label printer may be powered by one or more batteries or by a mains source of energy.

In the illustrated embodiments, the various images representative of the appearance of labels or label media each comprise an outline of the label or label media. In alternative embodiments, one or more of the images representative of the appearance of labels or label media comprises an image of a label or media with an appearance different from that of an appearance of a background within which the image is located. So, the image may be white and the background may be shaded, or vice versa, or the image may be plain coloured and the background patterned, or vice versa, for example.

The term "image representative of the appearance of . . . " used in this application is preferably intended to mean that the image has the same proportions and possibly the same colouring or rendering as the real life label medium or label that it represents. The images are preferably sufficiently representative for a user of the label printer to be able to visualise what the label medium or label would look like in reality.

Apparatuses that may be used to input data to the label printer for printing include an integral keyboard, an integral touch panel of a touchscreen, a mouse, or a digital camera or a mobile phone connected to the label printer. Images may alternatively be stored in, and input by using, a smart card, chip card, memory card or the like.

While references are made above to the label printer storing data in (or retrieving data from) memory, this memory may form an integral part of the label printer. Alternatively, the memory may not be integral with the label printer. In that case, the label printer is arranged to communicate with the memory via one or more ports or interfaces of the label printer.

In contrast to embodiments of the present invention (which concern stand-alone label printers, as discussed above), a label printer system comprises a printer connected to a PC or other computer. The printer of such a label printer system may not have a display, and/or may not have input means for selecting characters to be printed, and/or may not have input means for selecting something shown on a display. However, in some cases the printer of such a label printer system will additionally have the display and/or suitable input means.

Figure 37:
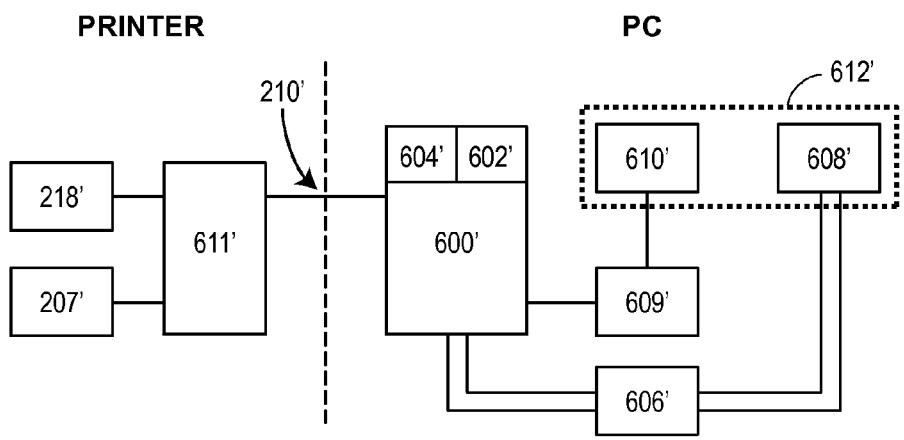
FIG. 37 is a diagrammatic sketch showing the control circuitry in a label printing system.

FIG. 37 illustrates a label printer system in which a printhead 218' and tape feeding motor 207' are included in a printer connected via a link 210' to a PC, and a display 610' of a touchscreen 612', touchscreen display driver 609', touch panel 608' of the touchscreen 612', touch controller 606', controller 600', non-volatile memory 602', and volatile memory 604' are part of the PC. The printer may include a further controller or control means (illustrated as 611') for facilitating communication between the controller 600' of the PC and the printhead 218' and motor 207' of the printer. The link 210' may be a wired link, e.g. involving a parallel or serial connection or a USB interface, or a wireless link, e.g. involving Bluetooth technology or an infrared link. The printer and the PC together form a label printer system.

Figure 38:
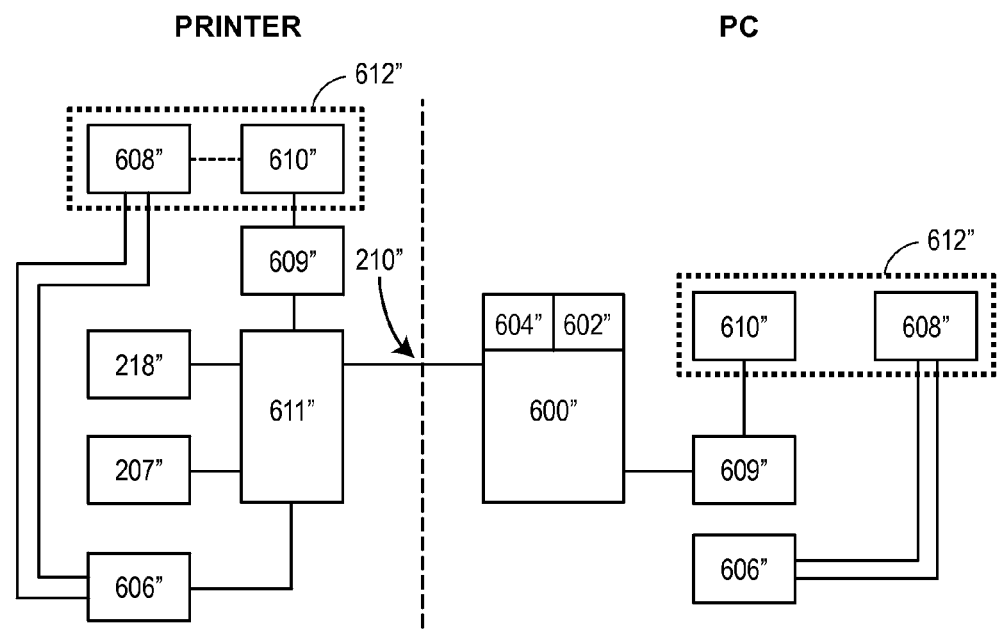
FIG. 38 is a diagrammatic sketch showing the control circuitry in a further label printing system.

FIG. 38 illustrates a variation of the system shown in FIG. 37, in which variation the printer and the PC (together forming a label printer system) both include a display 610" of a touchscreen 612", touchscreen display driver 609", touch panel 608" of the touchscreen 612", and touch controller 606".

While the term "controller" has been used extensively throughout this description, it is to be appreciated that different types of apparatus may be used as a controller. Such apparatus includes a processor, a chip, a set of chips (i.e. a chip set), or other form of control means. Such a controller or control means may be configurable to output data to a display driver (for driving a display) on the same chip as the controller or on a chip separate from the controller. Thus the term "output" in this respect is intended to mean transferring the data from the controller to the display driver. Even when the display driver is comprised in the same chip as the controller, some degree of communication or "output" is carried out between the controlling part and the display driving part of the chip. This data is for causing the display driver to drive the display to display a certain image or images. The controller or control means may generate this data, or it may be generated elsewhere (e.g. on another chip or in a different part of a chip) and then provided to the controller for outputting to the display driver.

The display discussed in this description and illustrated in the accompanying figures is one example of display means. The display means may comprise one of an LCD display, a plasma display, a cathode ray tube, an OLED display or other form of display.

The skilled person would appreciate that any of the methods described herein may be implemented using a computer program embodied on a computer readable medium (such as a CDROM or memory within a stand-alone printer) for controlling a controller (or other similar apparatus as discussed above).

Embodiments of the invention may be used with continuous tape or die cut labels. Die cut labels are provided on a continuous backing layer but are discrete, pre-cut labels. The tape or die cut labels may be provided in a cassette or simply on a roll.

The foregoing merely illustrates the principals of the invention. Modifications and alterations to the described embodiments will be apparent to those skilled in the art in view of the teaching herein. It will thus be appreciated that those skilled in the art would be able to device numerous techniques which although not explicitly described herein, embody the principals of the invention and are thus within the scope of the invention, as defined by the claims.

The invention claimed is:

1. A label printer, comprising:
   an input operable by a user;
   a display;
   a controller connected to the input and the display; said controller being configured to control the display to first display a header and, in a first portion of the display, a first image representative of a label;
   wherein, in response to receiving at the controller a signal indicative of an operation of the input by a user to select the header, the controller is configured to control the display to then display
   a second image representative of the label in the first portion of the display, which first portion of the display is reduced in size; and
   in a second portion of the display, a graphical control panel associated with said header,
   such that the second portion of the display occupies at least a part of the display previously occupied by the first portion of the display comprising said first image representative of a label, the second image representative of the label is of a size smaller than the first image representative of the label, and wherein the header is positioned between said first portion of the display and said second portion of the display.

2. A label printer as claimed in claim 1, wherein the graphical control panel comprises at least one input area; and,
   in response to receiving at the controller a signal indicative of an operation of the input by a user to select the input area,
   the controller is configured to control the display to then display a modified version of the second image representative of the label.

3. A label printer as claimed in claim 2, wherein the modified version of the second image representative of the label comprises label data for printing onto a label medium, which label data is not comprised in said second image representative of the label.

4. A label printer as claimed in claim 3, wherein the label data comprises at least one of text, an image, a barcode, a symbol, a shape, and a decorative element.

5. A label printer as claimed in claim 4, wherein the second image is representative of a label with an attribute in a first state; and wherein the modified version of the second image is representative of the label with the attribute in a second state.

6. A label printer as claimed in claim 5, wherein the attribute comprises a characteristic of label data to be printed onto a label medium.

7. A label printer as claimed in claim 5, wherein the attribute comprises a characteristic of a label medium onto which label data is to be printed.

8. A label printer as claimed in any one of claim 1 wherein, in response to receiving at the controller the signal indicative of the operation of the input by a user to select the header, the controller is configured to control the display to then display said header in addition to said second image representative of the label and said graphical control panel associated with said header.

9. A label printer as claimed in any one of claim 1, wherein the display is comprised in a touchscreen.

10. A label printer as claimed in claim 9, wherein the input comprises a portion of a touch panel of the touchscreen, and the input is operable to cause the signal to be sent to the controller by the user touching the portion of the touch panel.

11. A method of operating a controller of a label printer, the method comprising:
    controlling a display of the label printer to first display a header and, in a first portion of the display, a first image representative of a label; and,
    in response to receiving at the controller a signal indicative of an operation of an input of the label printer by a user to select the header,
    controlling the display to then display
    a second image representative of the label in the first portion of the display, which first portion of the display is reduced in size; and
    in a second portion of the display, a graphical control panel associated with said header,
    such that the second portion of the display occupies at least a part of the display previously occupied by the first portion of the display comprising said first image representative of a label, the second image representative of the label is of a size smaller than the first image representative of the label, and wherein the header is positioned between said first portion of the display and said second portion of the display.

12. A computer program embodied on a non-transitory computer readable medium, said computer program configured to control a controller of a label printer to:
    control a display of the label printer to first display a header and, in a first portion of the display, a first image representative of a label; and,
    in response to receiving at the controller a signal indicative of an operation of an input of the label printer by a user to select the header,
    control the display to then display
    a second image representative of the label in the first portion of the display, which first portion of the display is reduced in size; and
    in a second portion of the display, a graphical control panel associated with said header,
    such that the second portion of the display occupies at least a part of the display previously occupied by the first portion of the display comprising said first image representative of the label, the second image representative of the label is of a size smaller than the first image representative of the label, and wherein the header is positioned between said first portion of the display and said second portion of the display.

* * * * *

UNITED STATES PATENT AND TRADEMARK OFFICE
CERTIFICATE OF CORRECTION

PATENT NO.        : 8,681,372 B2                                      Page 1 of 1
APPLICATION NO. : 13/121134
DATED             : March 25, 2014
INVENTOR(S)       : De Munck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this

Twenty-ninth Day of September, 2015

Michelle K. Lee
*Director of the United States Patent and Trademark Office*